(12) United States Patent
Helou, Jr.

(10) Patent No.: US 10,967,973 B2
(45) Date of Patent: Apr. 6, 2021

(54) MODULAR CONTAINER TRANSPORT SYSTEMS

(71) Applicant: Biosphere Aerospace, LLC, Carpinteria, CA (US)

(72) Inventor: Elie Helou, Jr., Santa Barbara, CA (US)

(73) Assignee: Biosphere Aerospace, LLC, Carpinteria, CA (US)

( * ) Notice: Subject to any disclaimer, the term of this patent is extended or adjusted under 35 U.S.C. 154(b) by 427 days.

(21) Appl. No.: 15/867,557

(22) Filed: Jan. 10, 2018

(65) Prior Publication Data

US 2018/0194470 A1   Jul. 12, 2018

Related U.S. Application Data

(60) Provisional application No. 62/445,193, filed on Jan. 11, 2017.

(51) Int. Cl.
| | |
|---|---|
| B65D 88/14 | (2006.01) |
| B65D 88/02 | (2006.01) |
| B64C 1/06 | (2006.01) |
| B64D 9/00 | (2006.01) |
| B64C 1/22 | (2006.01) |
| B65D 90/08 | (2006.01) |
| B65D 90/00 | (2006.01) |

(52) U.S. Cl.
CPC ............... *B64D 9/003* (2013.01); *B64C 1/22* (2013.01); *B64D 9/00* (2013.01); *B65D 88/022* (2013.01); *B65D 88/14* (2013.01); *B65D 90/0013* (2013.01); *B65D 90/0026* (2013.01); *B65D 90/08* (2013.01); *B64C 1/061* (2013.01); *B65D 2585/686* (2013.01); *B65D 2585/687* (2013.01)

(58) Field of Classification Search
CPC .. B65D 88/12; B65D 88/14; B65D 2585/686; G06F 17/00; G06F 17/40
USPC ........................................................ 244/118.1
See application file for complete search history.

(56) References Cited

U.S. PATENT DOCUMENTS

| | | | | |
|---|---|---|---|---|
| 2,387,527 | A | * 10/1945 | Nagamatsu | ............. B64C 39/02 244/118.2 |
| 2,407,774 | A | * 9/1946 | Fowler | .................... B64C 39/02 244/118.2 |

(Continued)

FOREIGN PATENT DOCUMENTS

| | | |
|---|---|---|
| CN | 101092205 | 12/2007 |
| CN | 101234695 | 8/2008 |

(Continued)

*Primary Examiner* — Christopher P Ellis
(74) *Attorney, Agent, or Firm* — Sheppard, Mullin, Richter & Hampton LLP

(57) ABSTRACT

A cargo transport system comprising a spine assembly and a container assembly. The spine assembly comprises a rigid spine and a plurality of mounts arranged on the rigid spine in a plurality of mount rows. The container assembly comprises a plurality of containers and is secured to the spine assembly using at least a subset of the plurality of mounts. Each container of the plurality of containers comprises a plurality of fittings for securing the container to the spine assembly and/or another container of the container assembly. Each mount row extends along a width of the spine assembly, and the plurality of mount rows are spaced apart at regular distance intervals along a length of the spine.

20 Claims, 50 Drawing Sheets

(56) References Cited

U.S. PATENT DOCUMENTS

| | | | |
|---|---|---|---|
| 2,776,146 A | | 1/1957 | Marino |
| 2,876,969 A | * | 3/1959 | Tydon .................. B64C 1/22 244/118.3 |
| 2,967,061 A | | 1/1961 | Schwab |
| 3,028,130 A | * | 4/1962 | Burton .................. B64D 9/00 244/137.1 |
| 3,132,883 A | | 5/1964 | Tantlinger |
| 3,174,634 A | | 3/1965 | Peck |
| 3,243,193 A | | 3/1966 | Fulmer |
| 3,280,931 A | | 10/1966 | Cahill |
| 3,378,276 A | | 4/1968 | Fulmer |
| 3,381,921 A | * | 5/1968 | McDonough .......... B64D 9/003 410/79 |
| 3,392,857 A | | 7/1968 | Tantlinger |
| 3,631,999 A | | 1/1972 | Walerowski |
| 3,788,683 A | | 1/1974 | Rumell |
| 3,795,336 A | | 3/1974 | Acker |
| 3,826,322 A | | 7/1974 | Williams |
| 3,834,111 A | | 9/1974 | Acker |
| 3,869,168 A | | 3/1975 | Matheson |
| 4,362,458 A | | 12/1982 | Jantzi |
| 4,431,368 A | | 2/1984 | Katz |
| 4,452,555 A | | 6/1984 | Calabro |
| 4,527,486 A | | 7/1985 | Baird |
| 4,570,733 A | | 2/1986 | Star |
| 4,712,966 A | | 12/1987 | Gross |
| 4,863,334 A | | 9/1989 | Girerd |
| 4,936,733 A | | 6/1990 | Girerd |
| 4,993,125 A | * | 2/1991 | Capron ............... B65D 90/0006 24/287 |
| 5,006,031 A | | 4/1991 | Fossing |
| 5,050,897 A | | 9/1991 | Stroemberg |
| 5,324,160 A | | 6/1994 | Smith |
| 5,380,029 A | | 1/1995 | Portilla |
| 5,618,151 A | | 4/1997 | Rosenkranz |
| 5,800,114 A | | 9/1998 | Secondi |
| 5,893,692 A | * | 4/1999 | Asanuma ............... B60P 7/132 410/82 |
| 6,138,783 A | | 10/2000 | Chene |
| 6,210,088 B1 | * | 4/2001 | Crosby ................. B60P 7/132 410/35 |
| 6,237,795 B1 | * | 5/2001 | Buckley ................. B64G 1/641 220/1.5 |
| 6,308,131 B1 | * | 10/2001 | Fox ..................... B64D 9/00 701/124 |
| 6,363,586 B1 | * | 4/2002 | Neufingerl ........... B65D 88/005 220/1.5 |
| 6,390,742 B1 | | 5/2002 | Breeden |
| 6,439,131 B1 | | 8/2002 | Higgins |
| 6,450,522 B1 | | 9/2002 | Yamada |
| 6,494,404 B1 | * | 12/2002 | Meyer .................. B64C 39/02 244/118.1 |
| 6,537,015 B2 | | 3/2003 | Lim |
| 6,557,800 B2 | * | 5/2003 | Medina ................. B64D 9/00 193/35 R |
| D480,857 S | | 10/2003 | Wareham |
| 6,634,658 B2 | | 10/2003 | Larouche |
| 6,749,388 B1 | | 6/2004 | Schmidt |
| 6,817,579 B2 | * | 11/2004 | van der Velden ...... B64C 37/02 244/118.5 |
| 6,884,018 B1 | | 4/2005 | Dugan |
| 6,945,832 B2 | | 9/2005 | Roycroft |
| 7,093,798 B2 | | 8/2006 | Whelan et al. |
| D535,454 S | | 1/2007 | Wareham |
| 7,320,289 B1 | | 1/2008 | Clarke |
| 7,344,109 B1 | * | 3/2008 | Rezai ................... B64D 11/00 244/118.2 |
| 7,997,623 B2 | | 8/2011 | Williams |
| 8,118,523 B2 | | 2/2012 | Pedersen |
| 8,118,532 B2 | | 2/2012 | Phillips |
| 8,240,495 B2 | * | 8/2012 | Ronci ................. B65D 90/008 220/4.33 |
| 8,282,110 B2 | | 10/2012 | Schubert |
| 8,646,753 B2 | | 2/2014 | Ross |
| 8,794,190 B1 | | 8/2014 | Evers |
| 9,126,644 B2 | | 9/2015 | Banwart |
| 9,205,910 B1 | * | 12/2015 | Campbell ............... B64C 39/02 |
| 9,242,523 B2 | | 1/2016 | Teppig |
| 9,511,702 B2 | | 12/2016 | Ross |
| 9,586,513 B2 | | 3/2017 | Ellis |
| 9,914,467 B2 | | 3/2018 | Nyce |
| 10,023,252 B1 | * | 7/2018 | Bjone ................... B62D 61/12 |
| 10,207,552 B2 | | 2/2019 | Brummel |
| 10,351,344 B2 | | 7/2019 | Gebhardt |
| 2003/0010550 A1 | | 1/2003 | Prucher |
| 2003/0175089 A1 | | 9/2003 | Almind |
| 2003/0190221 A1 | | 10/2003 | Whitley |
| 2003/0214143 A1 | * | 11/2003 | Walker .................... B66C 1/663 294/81.53 |
| 2004/0028495 A1 | * | 2/2004 | Tomkins ............... B65D 88/129 410/46 |
| 2004/0135031 A1 | * | 7/2004 | Stupakis ............... B64C 39/024 244/120 |
| 2004/0245378 A1 | * | 12/2004 | Nonami ................. A63H 30/04 244/17.13 |
| 2005/0247824 A1 | * | 11/2005 | Allison, Sr. ............... B64F 1/31 244/137.2 |
| 2006/0022090 A1 | * | 2/2006 | McCoskey ............. B64F 1/305 244/137.1 |
| 2006/0038077 A1 | * | 2/2006 | Olin ....................... B64D 9/00 244/137.1 |
| 2006/0108477 A1 | * | 5/2006 | Helou, Jr. ................. B64C 1/10 244/137.1 |
| 2007/0025832 A1 | * | 2/2007 | Rawdon ................. B64D 9/00 414/401 |
| 2007/0276619 A1 | * | 11/2007 | Sugahara ............... B66C 13/16 702/82 |
| 2008/0054580 A1 | | 3/2008 | Glaser |
| 2010/0116932 A1 | | 5/2010 | Helou, Jr. |
| 2010/0192998 A1 | | 8/2010 | Villers |
| 2010/0276538 A1 | * | 11/2010 | Helou, Jr. ............... B64C 39/02 244/118.1 |
| 2010/0308180 A1 | * | 12/2010 | Helou, Jr. ................. B64C 1/22 244/35 R |
| 2011/0017630 A1 | | 1/2011 | Lee |
| 2011/0155614 A1 | | 6/2011 | Szeglin |
| 2012/0098243 A1 | | 4/2012 | Diaz |
| 2012/0298935 A1 | | 11/2012 | Ross |
| 2013/0156532 A1 | | 6/2013 | Hemphill |
| 2013/0341124 A1 | | 12/2013 | Robinson |
| 2014/0125501 A1 | | 5/2014 | Baade |
| 2014/0217230 A1 | | 8/2014 | Helou |
| 2014/0305769 A1 | | 10/2014 | Eiden, III |
| 2016/0023614 A1 | | 1/2016 | Leanna |
| 2016/0275440 A1 | | 9/2016 | Vladimirov |
| 2017/0066490 A1 | | 3/2017 | Fauroux |
| 2018/0118542 A1 | | 5/2018 | Shelagowski |

FOREIGN PATENT DOCUMENTS

| | | |
|---|---|---|
| CN | 101559862 | 10/2009 |
| CN | 103552733 | 2/2014 |
| EP | 1199259 | 4/2002 |
| EP | 2275361 | 1/2011 |

* cited by examiner

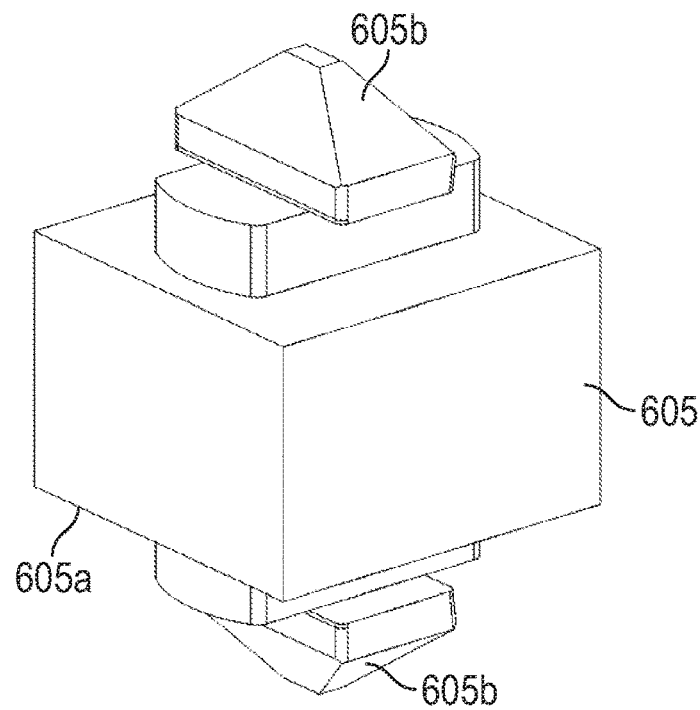
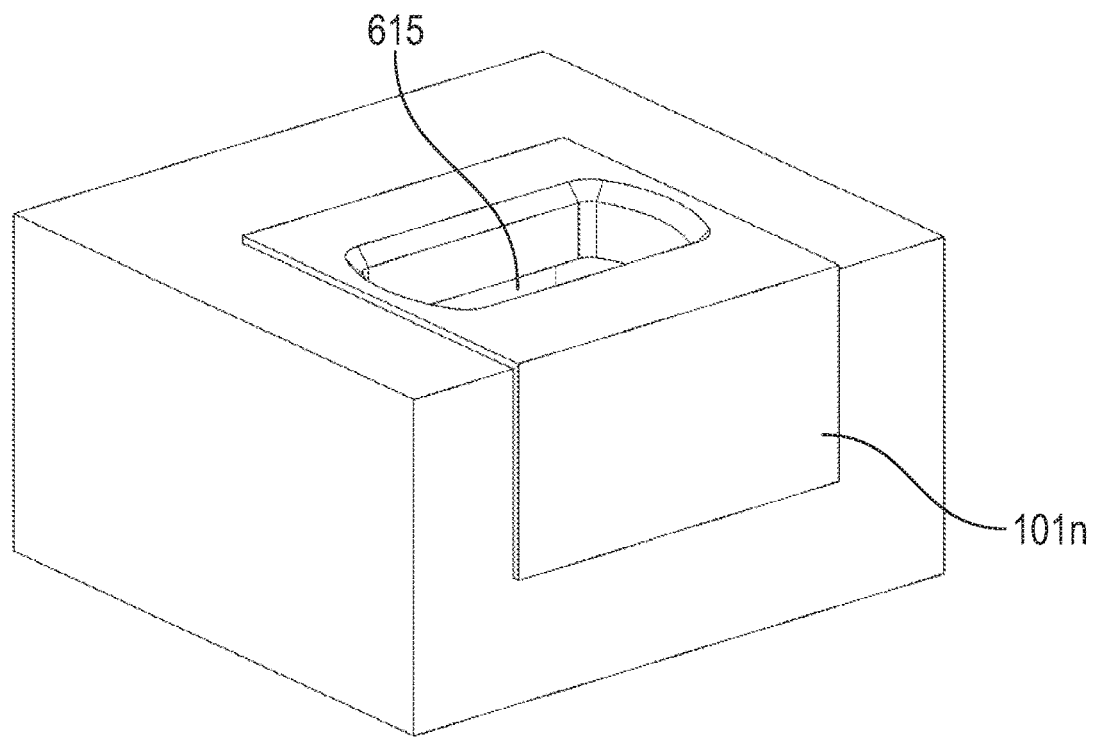
FIG. 6

| Container | ISO 6343 EXTERNAL DIMENSIONS | | | DISCLOSURE EXTERNAL DIMENSIONS | | |
|---|---|---|---|---|---|---|
| | Width | Length | Height | Width | Length | Height |
| 5' | N/A | N/A | N/A | 8' | 4'9.375" | 8'6" |
| 5' High Cube | N/A | N/A | N/A | 8' | 4'9.375" | 9'6" |
| 10' | 8' | 9'9.75" | 8'6" | 8' | 9'9.75" | 8'6" |
| 10' High Cube | N/A | N/A | N/A | 8' | 9'9.75" | 9'6" |
| 20' | 8' | 19'10.5" | 8'6" | 8' | 19'10.5" | 8'6" |
| 20' High Cube | 8' | 19'10.5" | 9'6" | 8' | 19'10.5" | 9'6" |
| 40' | 8' | 40' | 8'6" | 8' | 40' | 8'6" |
| 40' High Cube | 8' | 40' | 9'6" | 8' | 40' | 9'6" |
| 50' | N/A | N/A | N/A | 8' | 50'0.75" | 8'6" |
| 50' High Cube | N/A | N/A | N/A | 8' | 50'0.75" | 9'6" |

FIG. 7

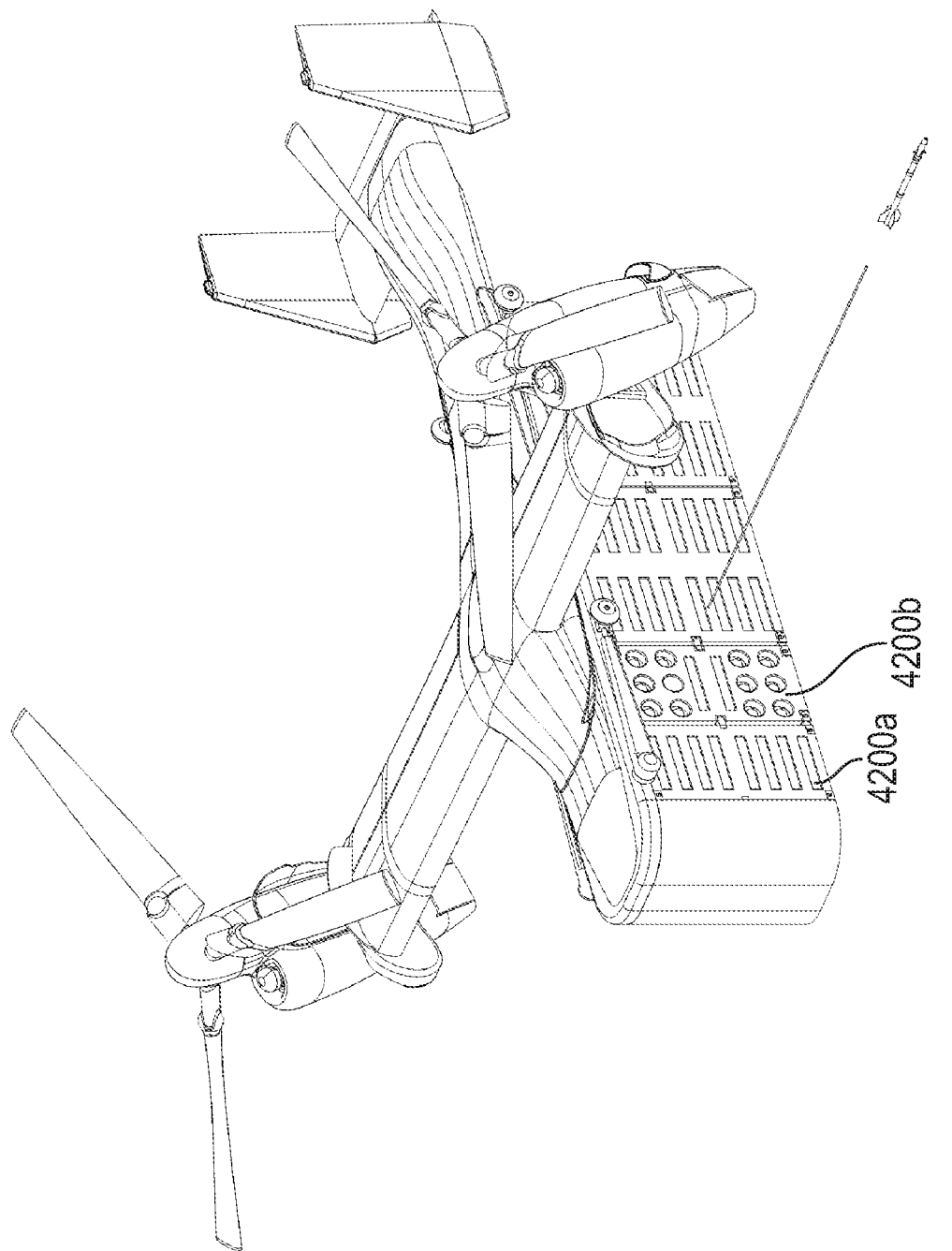

MODULAR CONTAINER TRANSPORT SYSTEMS

CROSS-REFERENCE TO RELATED APPLICATIONS

This application claims priority to U.S. Provisional Patent Application No. 62/445,193, filed Jan. 11, 2017 and entitled "MODULAR CARGO SYSTEMS AND METHODS," which is incorporated by reference herein in its entirety as if fully set forth herein.

FIELD OF THE INVENTION

The present technology relates to the field of cargo transport systems. More particularly, the present technology relates to systems, apparatus, and methods for transporting modular containers, including intermodal containers.

BACKGROUND

The basic unit for transporting goods has been the truck. Being the basic unit, the truck has defined limitations on intermodal containers that may typically be transported by, for example, ships, trains, and trucks. Much of commerce today for which intermodal containers are most convenient are high volume, low weight products. Thus, volume, instead of weight, typically creates the limiting factor in the design of intermodal containers.

The aforementioned intermodal containers have greatly facilitated and lowered the cost of cargo transportation. However, air cargo, such as airplane and helicopter cargo, has generally been excluded from participation in intermodal cargo systems. Aircraft of a size capable of carrying substantial cargo have typically been designed first as passenger aircraft. Cylindrical fuselages and lack of large access ports thereto in such passenger aircraft limit the use of such aircraft for truly intermodal cargo systems. In addition, the weight of intermodal cargo systems often reduce the payload an aircraft is able to carry. In such conventional systems, the aircraft becomes the basic unit with odd shaped and smaller sized containers. As a result, even with containerized cargo, a truck must often be loaded with multiple individual containers for efficient distribution of air cargo. Military transports are also not particularly compatible with conventional intermodal cargo systems, as they are designed for oversized cargo such as rolling equipment (e.g., tanks and trucks), and palletized, irregularly shaped cargo. Most aircraft specifically designed for the military are often mission-directed and overall efficiency for competitive cargo transportation is not a first priority.

The inability of aircraft to practically participate in intermodal container cargo systems has been disadvantageous to international commerce. Business principals such as just-in-time supply and changing business environments including rapid global internet communication have created a demand for much more rapid international shipping than can be provided by conventional ships or ground transport. However, air cargo systems remain both expensive and inconvenient to intermodal shipping. Furthermore, even with respect to ground and water transport, size restrictions and other restrictions imposed by conventional intermodal cargo systems severely limit the ability of conventional intermodal cargo systems to maximize the efficiency and interchangeability that could be offered by such systems.

SUMMARY

The present disclosure may be embodied in a cargo transport system comprising a spine assembly and a container assembly. The spine assembly comprises a rigid spine and a plurality of mounts arranged on the rigid spine in a plurality of mount rows. The container assembly comprises a plurality of containers and is secured to the spine assembly using at least a subset of the plurality of mounts. Each container of the plurality of containers comprises a plurality of fittings for securing the container to the spine assembly and/or another container of the container assembly. Each mount row extends along a width of the spine assembly, and the plurality of mount rows are spaced apart at regular distance intervals along a length of the spine.

In an embodiment, the plurality of mount rows are spaced apart at a regular distance interval of approximately 10 feet along the length of the spine.

In an embodiment, the plurality of mount rows are spaced apart at a regular distance interval of approximately 5 feet along the length of the spine.

In an embodiment, each mount of the plurality of mounts comprises a rotating member rotatable between a locked position and an unlocked position. In the unlocked position, the rotating member can be inserted into a fitting of a container, and in the locked position, the rotating member, when inserted into a fitting of a container, secures the fitting to the mount.

In an embodiment, for each container of the plurality of containers, the plurality of fittings comprises a set of corner fittings positioned at each corner of the container.

In an embodiment, each corner fitting comprises three openings for securing the corner fitting in three directions.

In an embodiment, for each container of the plurality of containers, the plurality of fittings further comprises a first set of intermediate fittings positioned between the corner fittings in a width-wise direction, and a second set of intermediate fittings position between the corner fittings in a height-wise direction.

In an embodiment, each fitting in the first and second sets of intermediate fittings comprises one opening for securing the fitting in a single direction.

In an embodiment, for at least a subset of containers of the plurality of containers, the plurality of fittings further comprises a third set of intermediate fittings positioned between the corner fittings in a length-wise direction and along a bottom surface of the container, and a fourth set of intermediate fittings positioned between the corner fittings in the length-wise direction and along a top surface of the container.

In an embodiment, each container of the subset of containers satisfies a minimum length threshold.

In an embodiment, each fitting in the third set of intermediate fittings comprises two openings for securing the fitting in two directions, and each fitting in the fourth set of intermediate fittings comprises one opening for securing the fitting in a single direction.

In an embodiment, each fitting in the first and second sets of intermediate fittings comprises one opening for securing the fitting in the length-wise direction, each fitting in the third set of intermediate fittings comprises a first opening for securing the fitting in the width-wise direction and a second opening for securing the fitting in the height-wise direction, and each fitting in the fourth set of intermediate fittings comprises one opening for securing the fitting in the height-wise direction.

In an embodiment, the spine assembly comprises a data transmission system for electronic communications with the container assembly.

In an embodiment, the data transmission system comprises a plurality of data probes and the container assembly comprises a plurality of data receptacles for receiving the plurality of data probes.

In an embodiment, the plurality of data probes are retractable into the spine assembly such that the plurality of data probes can be selectively inserted into the plurality of data receptacles.

In an embodiment, the spine assembly comprises a power distribution system for transmitting power to the container assembly.

In an embodiment, the power transmission system comprises a plurality of power probes and the container assembly comprises a plurality of power receptacles for receiving the plurality of power probes.

In an embodiment, the plurality of power probes are retractable into the spine assembly such that the plurality of power probes can be selectively inserted into the plurality of power receptacles.

The present disclosure can also be embodied in a spine assembly comprising a rigid spine; a plurality of mounts arranged on the rigid spine in a plurality of mount rows; a data transmission system comprising a plurality of data probes for electronic communications with a container assembly secured to the spine assembly; and a power transmissions system comprising a plurality of power probes for transmitting power to a container assembly secured to the spine assembly. Each mount row extends along a width of the spine, and the plurality of mount rows are spaced apart at regular distance intervals along a length of the spine.

The present disclosure can also be embodied in a container assembly comprising a plurality of containers secured together. Each container of the plurality of containers comprises a plurality of fittings for securing the container to a spine assembly and/or another container of the container assembly. The plurality of containers are secured together using a plurality of fitting connectors securing a subset of the plurality of fittings together. For each container of the plurality of containers, the plurality of fittings comprises a set of corner fittings positioned at each corner of the container, each corner fitting comprising three openings for securing the corner fitting in three directions; a first set of intermediate fittings positioned between the corner fittings in a width-wise direction, each fitting of the first set of intermediate fittings comprising one opening for securing the fitting in a length-wise direction; a second set of intermediate fittings positioned between the corner fittings in a height-wise direction, each fitting of the second set of intermediate fittings comprising one opening for securing the fitting in the length-wise direction; a third set of intermediate fittings positioned between the corner fittings in a length-wise direction along a bottom surface of the container, each fitting of the third set of intermediate fittings comprising two openings for securing the fitting in the width-wise direction and the height-wise direction; and a fourth set of intermediate fittings positioned between the corner fittings in a length-wise direction along a top surface of the container, each fitting of the fourth set of intermediate fittings comprising one opening for securing the fitting in the height-wise direction.

BRIEF DESCRIPTION OF THE DRAWINGS

FIG. 6 is a perspective view of an example upper length-wise intermediate fitting for a cargo container and corresponding fitting connectors, according to an embodiment of the present disclosure.

FIG. 7 is a table comparing external dimensions of existing ISO containers to cargo containers according to various embodiments of the present disclosure.

FIGS. 42A-42D depict perspective views of a container assembly secured to various aircraft spines, according to various embodiments of the present disclosure.

Figure 1A:
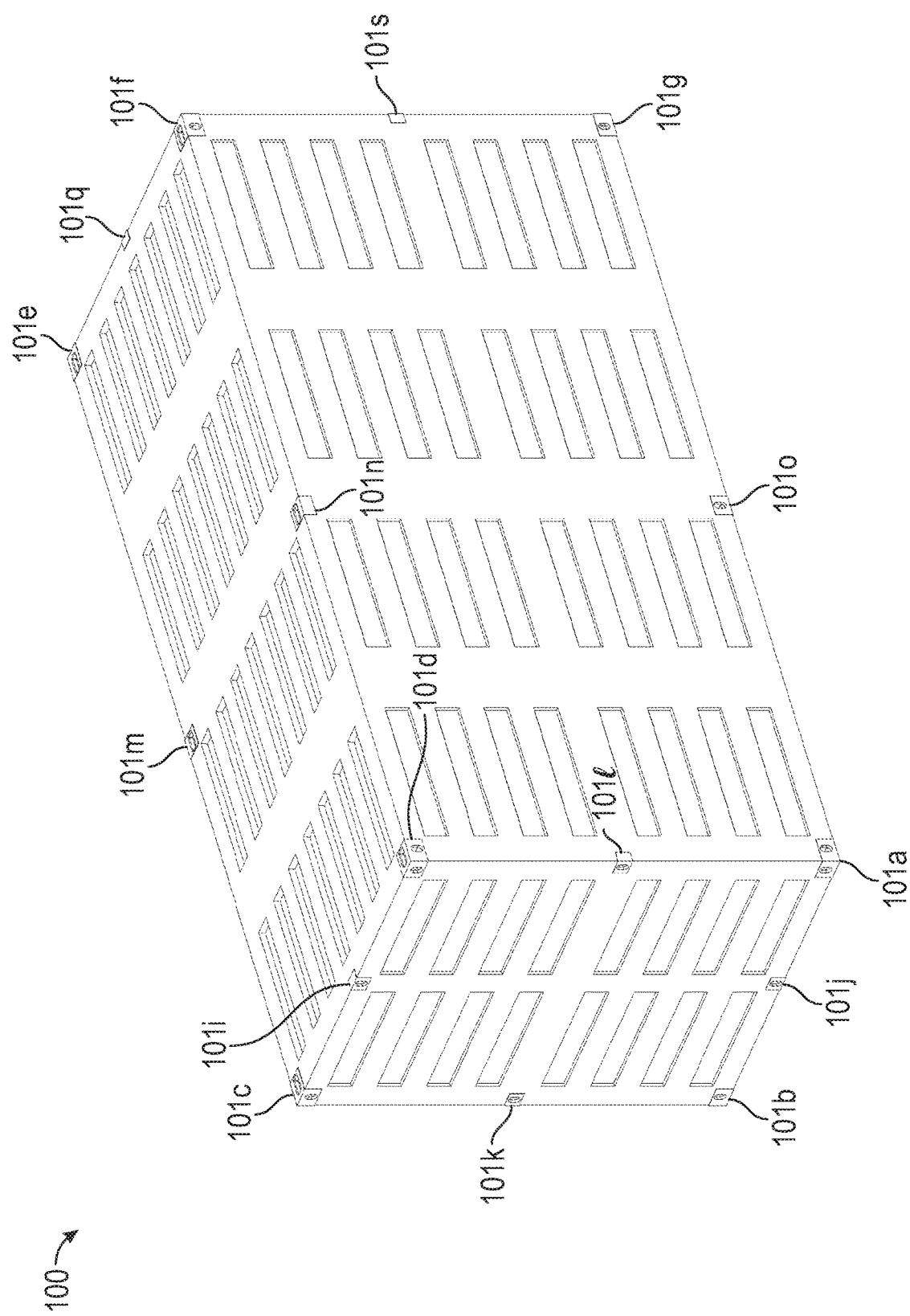
FIGS. 1A and 1B are perspective views of an example cargo container according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Specific, non-limiting embodiments of the present disclosure will now be described with reference to the drawings. It should be understood that such embodiments are by way of example only and merely illustrative of but a small number of embodiments within the scope of the present disclosure. Various changes and modifications obvious to one skilled in the art to which the present disclosure pertains are deemed to be within the spirit, scope and contemplation of the present disclosure as further defined in the appended claims.

In various embodiments, the present disclosure provides for systems and methods that include various sized containers and sub containers that fit together onto matching spine systems, and, in certain embodiments, defines spines and containers that would conform to ISO 636 and/or ISO 668 intermodal equipment. Various embodiments of the present disclosure exclude lifting hooks on the top fittings where the system may standardize the upper corner fittings to be similar to the lower corner fittings.

In addition, various embodiments of the present disclosure include spines that can have additional fittings to allow payloads to be shifted (e.g., from front to back) and better match center of gravity requirements of an aircraft system rather than having to shift the payload within the containers. In certain embodiments, spines can have sliding fittings to accommodate relocating the containers to match center of gravity requirements. In various embodiments, spines can include individual sliding fittings to account for thermal expansion differences and geometrical tolerance differences between spines and individual containers. In other embodiments, the spine can have heaters and/or coolers so that it can be brought to a similar temperature as attached containers. This may be useful, for example, when containers have been exposed to hot weather conditions.

Certain embodiments of the present disclosure also demonstrate how containers can be assembled into a carrying space that is double wide and/or double high to accommodate oversize cargo. In certain embodiments, the assembled containers can still fit onto existing intermodal infrastructures and can be assembled prior to loading onto an aircraft.

Figure 1B:
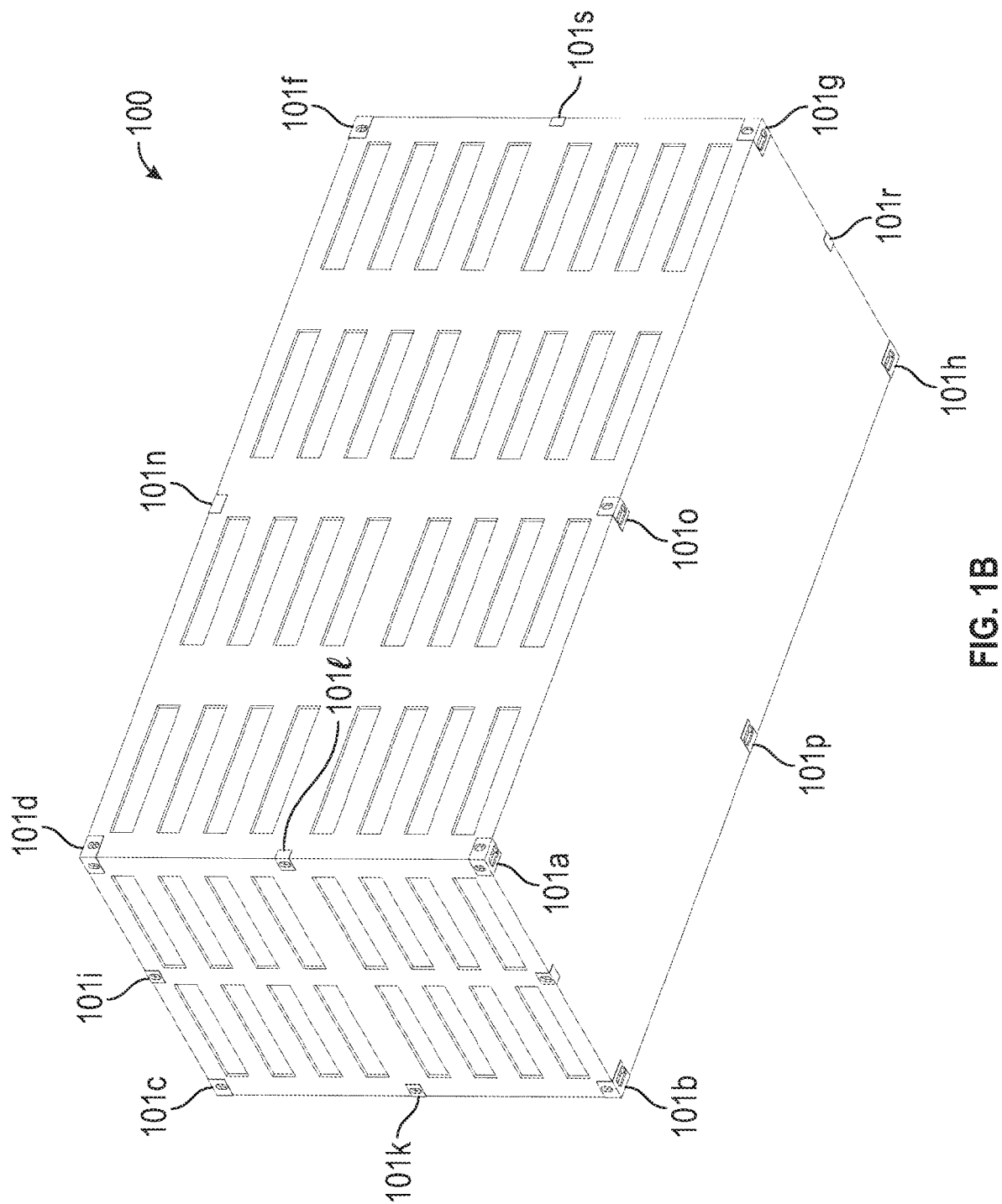

FIG. 1A provides a perspective view of an example cargo container 100 according to an embodiment of the present disclosure. FIG. 1B provides a bottom-up perspective view of the cargo container 100. In various embodiments, the cargo container 100 may be used as a container in a spine cargo transport system. Various embodiments of spine cargo transport systems are described in U.S. Pat. No. 7,261,257, issued on Aug. 28, 2007 and entitled CARGO AIRCRAFT; U.S. Pat. No. 7,699,267, issued on Apr. 20, 2010 and entitled CARGO AIRCRAFT; U.S. Pat. No. 8,608,110, issued on Dec. 17, 2013 and entitled CARGO AIRCRAFT SYSTEM; U.S. Pat. No. 8,708,282, issued on Apr. 29, 2014 and entitled METHOD AND SYSTEM FOR UNLOADING CARGO ASSEMBLY ONTO AND FROM AN AIRCRAFT; U.S. Pat. No. 9,493,227, issued on Nov. 15, 2016 and entitled METHOD AND SYSTEM FOR UNLOADING CARGO ASSEMBLY ONTO AND FROM AN AIRCRAFT; and U.S. Patent Publication No. 2014/0217230, filed on Feb. 5, 2013 and entitled DRONE CARGO HELICOPTER, each of which are incorporated by reference as if fully set forth herein. In the depicted embodiment, the cargo container 100 includes connection locations that do not exist on standard ISO containers. The cargo container 100 includes eight corner fittings 101a-h. In various embodiments, each corner fitting on a container may mirror at least one other corner fitting on the container. For example, a lower left front corner fitting 101a is the mirror image of a lower right front corner fitting 101b and an opposite mirror of a lower left rear corner fitting 101g. In various embodiments, the lower left front corner fitting 101a is also a mirror of an upper left front corner fitting 101d. In certain embodiments, certain or all corresponding lower fittings and upper fittings may differ, such that they do not mirror one another, as will be described in greater detail herein. A lower left rear corner fitting 101g is the mirror image of lower right rear corner fitting 101h (shown in FIG. 1B), and the opposite mirror of the lower left front corner fitting 101a. An upper left front corner fitting 101d is the mirror of an upper right front corner fitting 101c, and the opposite direction mirror of the lower left front corner fitting 101a. An upper right rear corner fitting 101e is the mirror image of an upper left rear corner fitting 101f and the opposite direction mirror of the lower right rear corner fitting 101h (shown in FIG. 1B). In various embodiments, the corner fittings 101a-h and additional fittings can be designed to transfer flight loads from one container to another and to attached spine systems, as will be described in greater detail herein.

As aircraft loads may be substantial, and may require additional fittings to transfer loads, the cargo container 100 is shown with additional connection fittings on the front and rear faces of the cargo container 100 as well as along the length of the cargo container 100. According to the depicted embodiment, intermediate fittings are included in a width-wise direction. A front upper width-wise intermediate fitting 101i is the mirror image of a front lower width-wise intermediate fitting 101j and in the opposite direction is the mirror of a rear upper width-wise intermediate fitting 101q, which is the mirror image of a rear lower width-wise intermediate fitting 101r (shown in FIG. 1B). Intermediate fittings are also included in a height-wise direction. A front left height-wise intermediate fitting 101l is the mirror of a front right height-wise intermediate fitting 101k and is also the opposite direction mirror of a rear left height-wise intermediate fitting 101s which in turn is the mirror of a rear right height-wise intermediate fitting 101t (not shown). Although not shown, in certain embodiments, the container corner fittings can also meet current ISO Intermodal requirements which may require additional types of connection fittings.

The cargo container 100 has additional intermediate connection fittings in the length-wise direction with an upper left length-wise intermediate fitting 101n being the mirror of an upper right length-wise intermediate fitting 101m. A lower left length-wise intermediate fitting 101o is the mirror image of a lower right length-wise intermediate fitting 101p. In certain embodiments, fitting 101n may not be the mirror of fitting 101o and, similarly, fitting 101m may not be the mirror of fitting 101p. This design attempts to minimize the number of required structural connections and will be depicted and described in greater detail herein, for example, with reference to various connected cargo containers.

Figure 2:
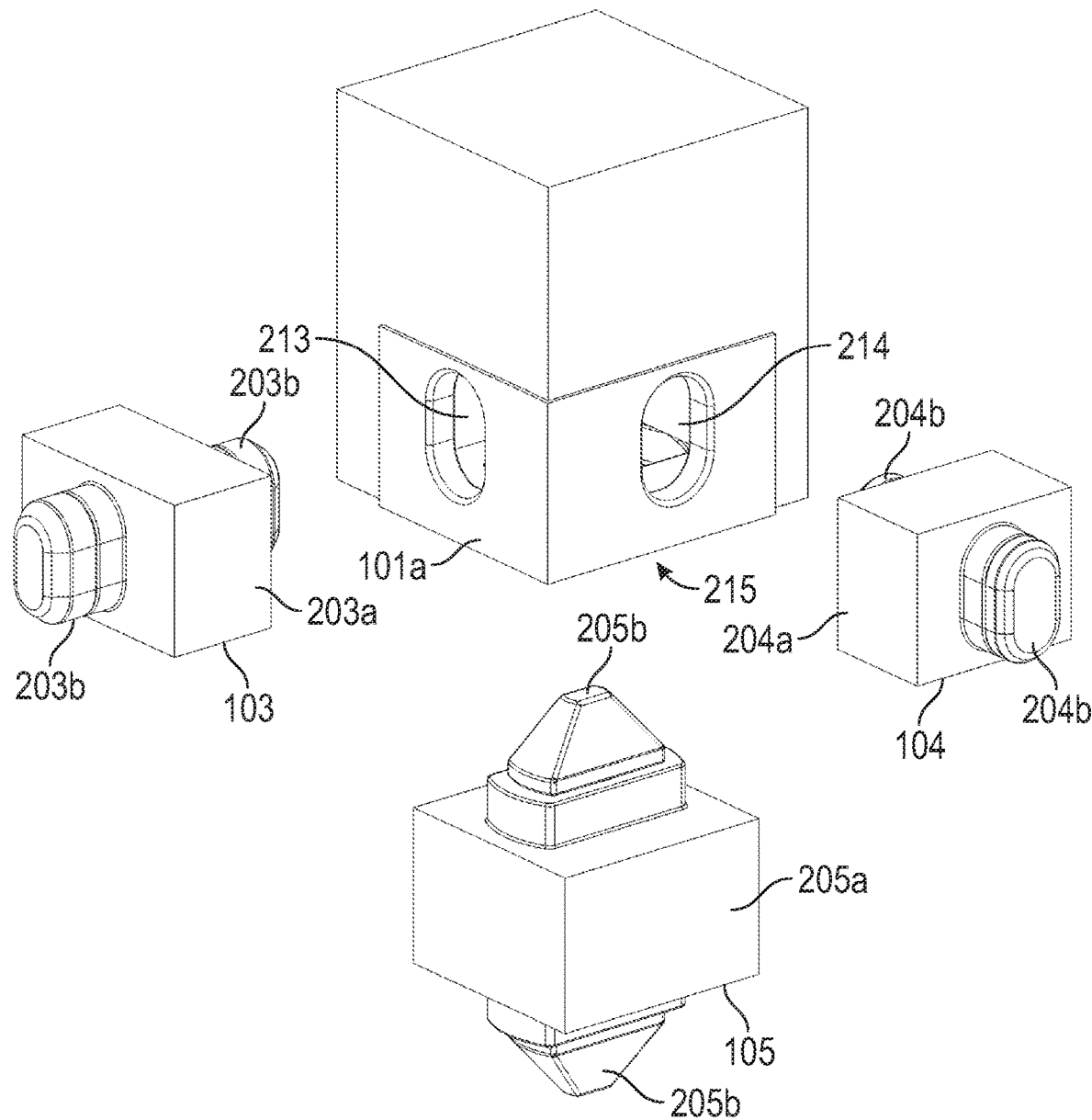
FIG. 2 is a perspective view of an example corner fitting for a cargo container and corresponding fitting connectors, according to an embodiment of the present disclosure.

FIG. 2 depicts an example embodiment of the lower left front corner fitting 101a depicted in FIG. 1A, according to an embodiment of the present disclosure. In one embodiment, the lower left front corner fitting 101a, or a mirror image thereof, may be used for any of the corner fittings 101a-h of FIGS. 1A-1B. The lower left front corner fitting 101a is designed to connect structurally to a corresponding fitting on another container in the left-to-right direction (i.e., a width-wise direction) via a fitting connector 104 and a first opening 214, in the front-to-back direction (i.e., a length-wise direction) via a fitting connector 103 and a second opening 213, and in the up-and-down direction (i.e., a height-wise direction) via a fitting connector 105 and a third opening 215 (not shown). The fitting connector 103 includes a central body 203a, and two rotating members 203b on either end of the central body 203a. The two rotating members 203b can be rotated between an unlocked position and a locked position. The two rotating members 203b, when in the unlocked position, are designed to be inserted into corresponding fitting openings in two cargo containers, and, once inserted, can be rotated into a locked position to secure the corresponding fittings to one another. Similarly, the fitting connectors 104, 105 also include central bodies 204a, 205a, respectively, and each fitting connector 104, 105 also includes two rotating members 204b, 205b, which operate substantially similarly to the rotating members 203b. The fitting 101a is designed in such a way that all three fitting connectors 103, 104, and 105 can be attached at the same time. In the depicted embodiment, the fitting connectors 103, 104, and 105 are quarter-turn type fitting connectors. These fitting connectors can, in an unlocked position, be placed to mate with their corresponding fitting openings and then rotated approximately 90 degrees into a locked position. The fitting connectors 103, 104, 105 shown in FIG. 2 can be configured to mate with all corner fittings on a cargo container, e.g., fittings 101a-h of FIGS. 1A-1B. In certain embodiments, the fitting connectors can be configured to individually rotate such that the fitting connector can lock onto one container prior to locking onto a second container.

Figure 3:
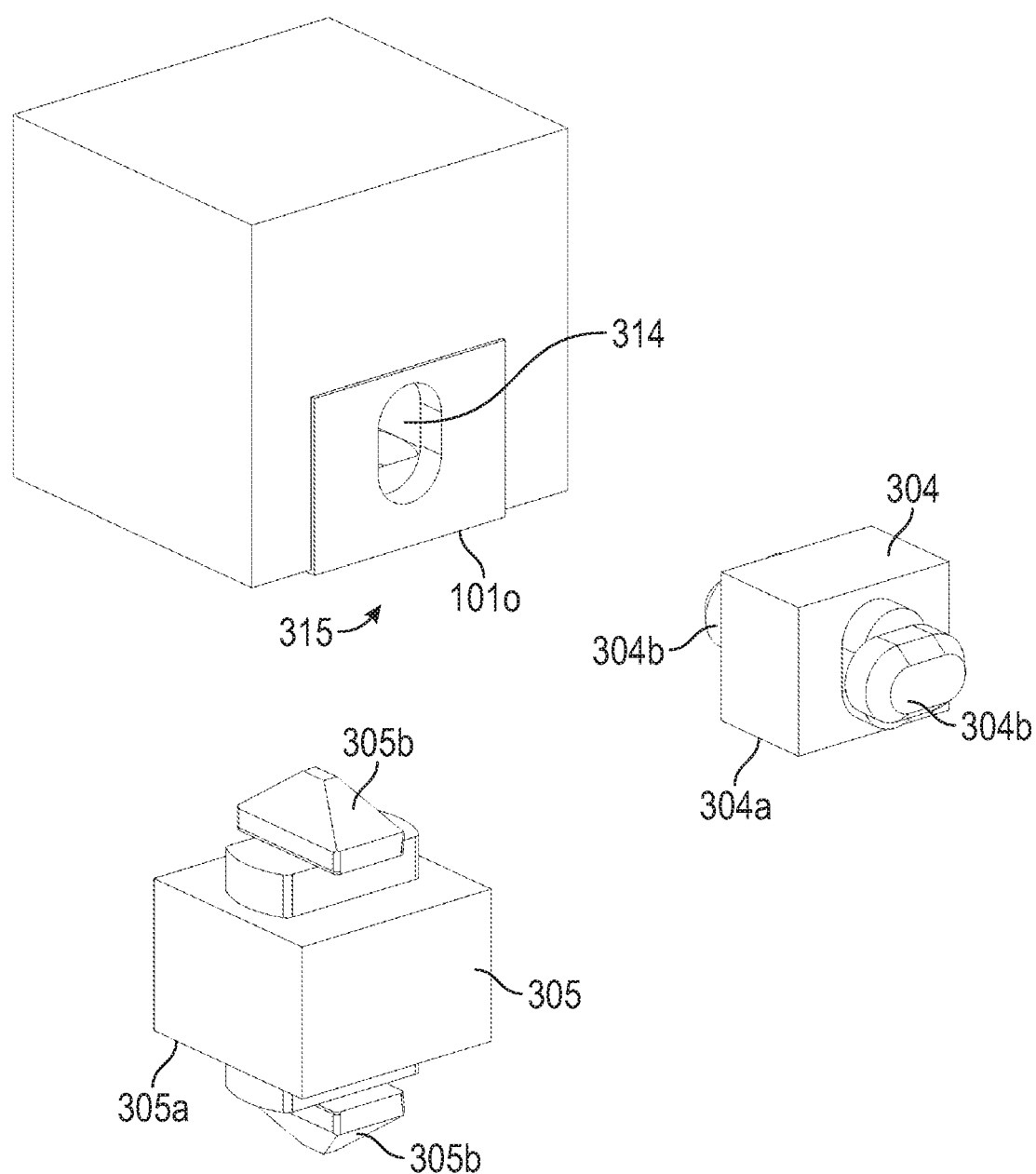
FIG. 3 is a perspective view of an example lower length-wise intermediate fitting for a cargo container and corresponding fitting connectors, according to an embodiment of the present disclosure.

FIG. 3 depicts an example embodiment of the lower left length-wise intermediate fitting 101o of FIGS. 1A-1B, according to an embodiment of the present disclosure. In one embodiment, the lower left length-wise intermediate fitting 101o, or a mirror image thereof, can be used for any of the length-wise intermediate fittings 101m, 101n, 101o, 101p of FIGS. 1A-1B. The lower left length-wise intermediate fitting 101o is designed to connect structurally to a corresponding fitting on another container in the left-to-right (i.e., width-wise) direction via a fitting connector 304 and a first opening 314, and in the up-and-down (i.e., height-wise) direction via a fitting connector 305 and a second opening 315 (not shown). It can be seen that the fitting connector 304 may be identical to the fitting connector 104 of FIG. 2, and the fitting connector 305 may be identical to the fitting connector 105 of FIG. 2. Similar to the fitting connectors 104, 105, the fitting connectors 304, 305 have a central body 304a, 305b, and two rotating members 304b, 305b which can rotate between an unlocked position and a locked position. The rotating members 304b, 305b of fitting connectors 304, 305 are shown in the "locked" position, whereas the rotating members 204*b*, 205*b* of fitting connectors 104, 105 of FIG. 2 are shown in the "unlocked" position. The fitting 1010 is designed in such a way that the two fitting connectors 304 and 305 can be attached at the same time.

Fitting connectors 104, 304, which go left to right (i.e., in a width-wise direction), can be configured to connect with fittings 1010 and 101*p* as well as the left to right directions of the corner fittings 101*a-h*. Fitting connectors 105, 305, which go up and down (i.e., in a height-wise direction), can be configured to connect with fittings 101*o* and 101*p*, as well as the up and down directions of the corner fittings 101*a-h*.

Figure 4:
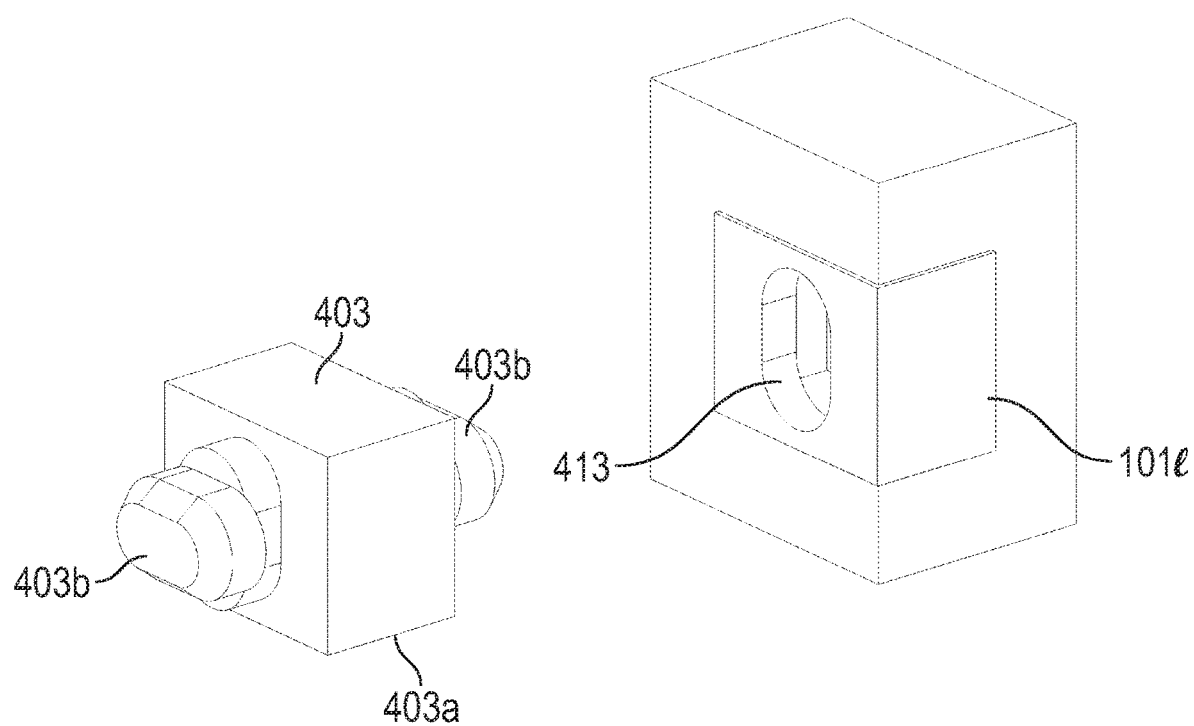
FIG. 4 is a perspective view of an example height-wise intermediate fitting for a cargo container and corresponding fitting connectors, according to an embodiment of the present disclosure.

FIG. 4 depicts an example embodiment of the front left height-wise intermediate fitting 101*l* of FIGS. 1A-1B. In one embodiment, the front left height-wise intermediate fitting 101*l*, or a mirror image thereof, can be used for any of the height-wise intermediate fittings 101*k*, 101*l*, 101*s*, 101*t* of FIGS. 1A-1B. The front left height-wise intermediate fitting 101*l* is designed to connect structurally to a corresponding fitting on another container in the front-to-back (i.e., length-wise) direction via a fitting connector 403 and an opening 413. Fitting connector 403 may be configured to correspond to additional fittings on a cargo container, such as front right height-wise intermediate fitting 101*k*, rear right height-wise intermediate fitting 101*t* and rear left height-wise intermediate fitting 101*s*. In certain embodiments, fitting connector 403 may have slightly different outer dimensions than fitting connector 103. In other embodiments, both fittings 103, 403 may be made to the same size to reduce the number of various fitting connectors. Similar to the fitting connector 103, the fitting connector 403 has a central body 403*a* and two rotating members 403*b* that can rotate between a locked position and an unlocked position.

Figure 5:
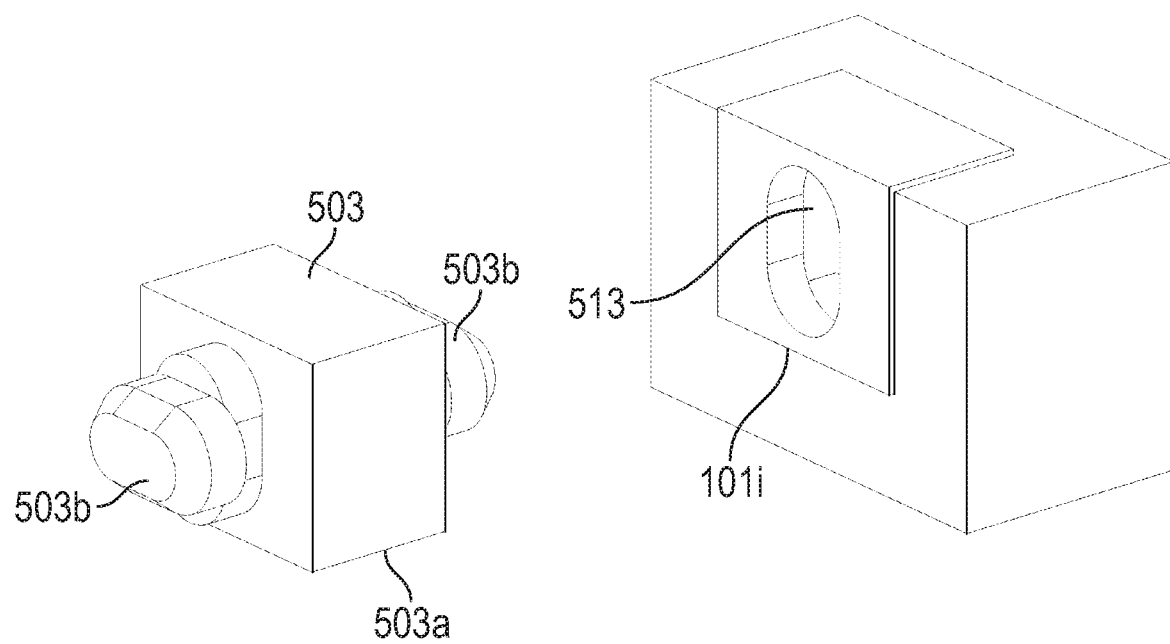
FIG. 5 is a perspective view of an example upper width-wise intermediate fitting for a cargo container and corresponding fitting connectors, according to an embodiment of the present disclosure.

FIG. 5 depicts an example embodiment of the front upper width-wise intermediate fitting 101*i* of FIGS. 1A-1B. In one embodiment, the front upper width-wise intermediate fitting 101*i* is a mirror image of the rear upper width-wise intermediate fitting 101*q*. The front upper width-wise intermediate fitting 101*i* is designed to connect structurally to a corresponding fitting on another cargo container in the front-to-back (i.e., length-wise) direction via a fitting connector 503 and an opening 513. The fitting connector 503 may be configured to correspond to additional fittings on a cargo container, such as the rear upper width-wise intermediate fitting 101*q*. In certain embodiments, the fitting connector 503 may have slightly different outer dimensions than fitting connectors 103 or 403. In other embodiments, each of the fitting connectors 103, 403, 503 may be identical to one another so as to reduce the number of various fitting connectors. Similar to the fitting connector 103, the fitting connector 503 includes a central body 503*a* and two rotating members 503*b* that can rotate between a locked position and an unlocked position.

In certain embodiments and scenarios, cargo containers can connect to one another in the front-to-back (i.e., length-wise)direction using only the corner fittings (e.g., fittings 101*a*, 101*b*, 101*c*, 101*d* and/or fittings 101*d*, 101*e*, 101*f*, 101*g* connected to corresponding corner fittings on another cargo container). Fittings 101*k*, 101*l*, 101*i*, 101*j*, 101*q*, 101*r*, 101*s*, and 101*t* may optionally be utilized in applications that may need additional connections in the front-to-back direction.

FIG. 6 depicts an example embodiment of the upper left length-wise intermediate fitting 101*n* of FIGS. 1A-1B. In one embodiment, the upper left length-wise intermediate fitting 101*n* is a mirror image of the upper right length-wise intermediate fitting 101*m*. The upper left length-wise intermediate fitting 101*n* is designed to connect structurally to a corresponding fitting on another cargo container or a spine in the up-and-down (i.e., height-wise) direction via a fitting connector 605 and an opening 615. In certain embodiments, the fitting connector 605 may be identical to the fitting connector 105, and can be configured to mate with any other fittings on the cargo container 100 that is configured to connect in the up-and-down direction. Similar to the fitting connector 105, the fitting connector 605 can include a central body 605*a*, and two rotating members 605*b* that can rotate between a locked position and an unlocked position.

FIG. 7 is a table comparing existing ISO container external dimensions versus various embodiments of the presently disclosed cargo container external dimensions. The dimensions shown in FIG. 7 are based on the front-to-back fitting connectors 103, 403, and 503 having a connected thickness between two connected cargo containers of approximately three inches, the side-to-side fitting connectors 104, 304 having a thickness of approximately three inches after mating two cargo containers, and the vertical dimension of the fitting connectors 105, 305, 605 having a baseline thickness of approximately four inches when two cargo containers are connected. The thickness of fitting connectors 105, 305, 605 may be used to define dimensions and/or a height of an outer aerodynamic fairing. The external fitting connectors 103, 403, 503 may be defined by ISO standards as they would dictate the size of two 20' containers connected to fit in the same space as a 40' container. In certain embodiments, the size of any fitting connectors may be determined based on the access space required for automated or manual reach actuation systems to lock and/or unlock these fitting connectors. It should be understood that the dimensions of any of the fitting connectors can be modified as appropriate. In certain embodiments, based on the cargo container dimensions found in FIG. 7 and the number of fittings defined for this configuration of connections, a family of cargo containers can be developed. It should be understood that while various exemplary dimensions and sizes are discussed herein, any appropriate dimensions can be used. For example, two containers that are ½ width and/or ½ height of ISO standards can be combined to create a combination container that is a standard height and/or width.

Figure 8:
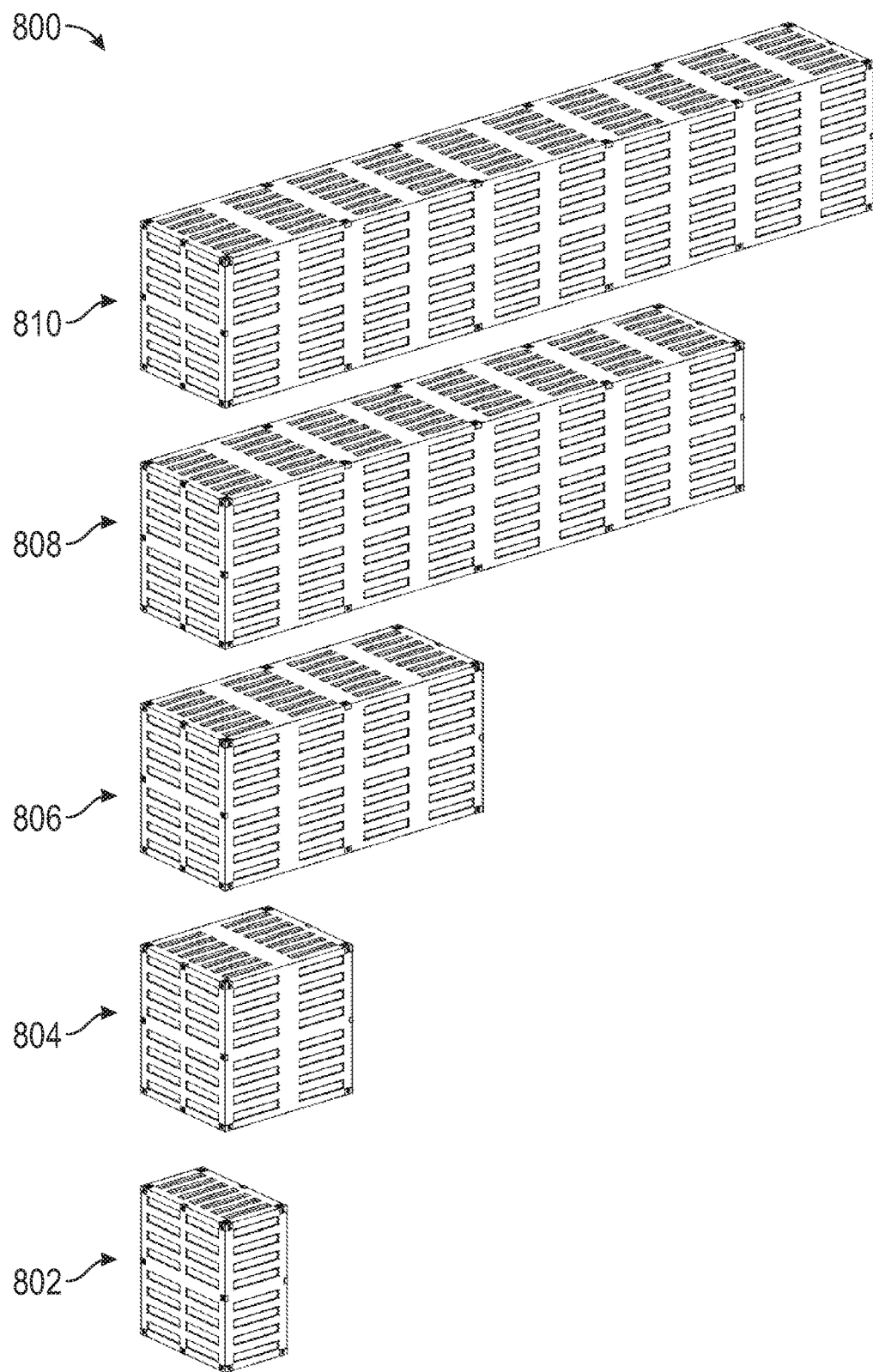
FIG. 8 depicts perspective views of a family of cargo containers, according to an embodiment of the present disclosure.
Figure 9:
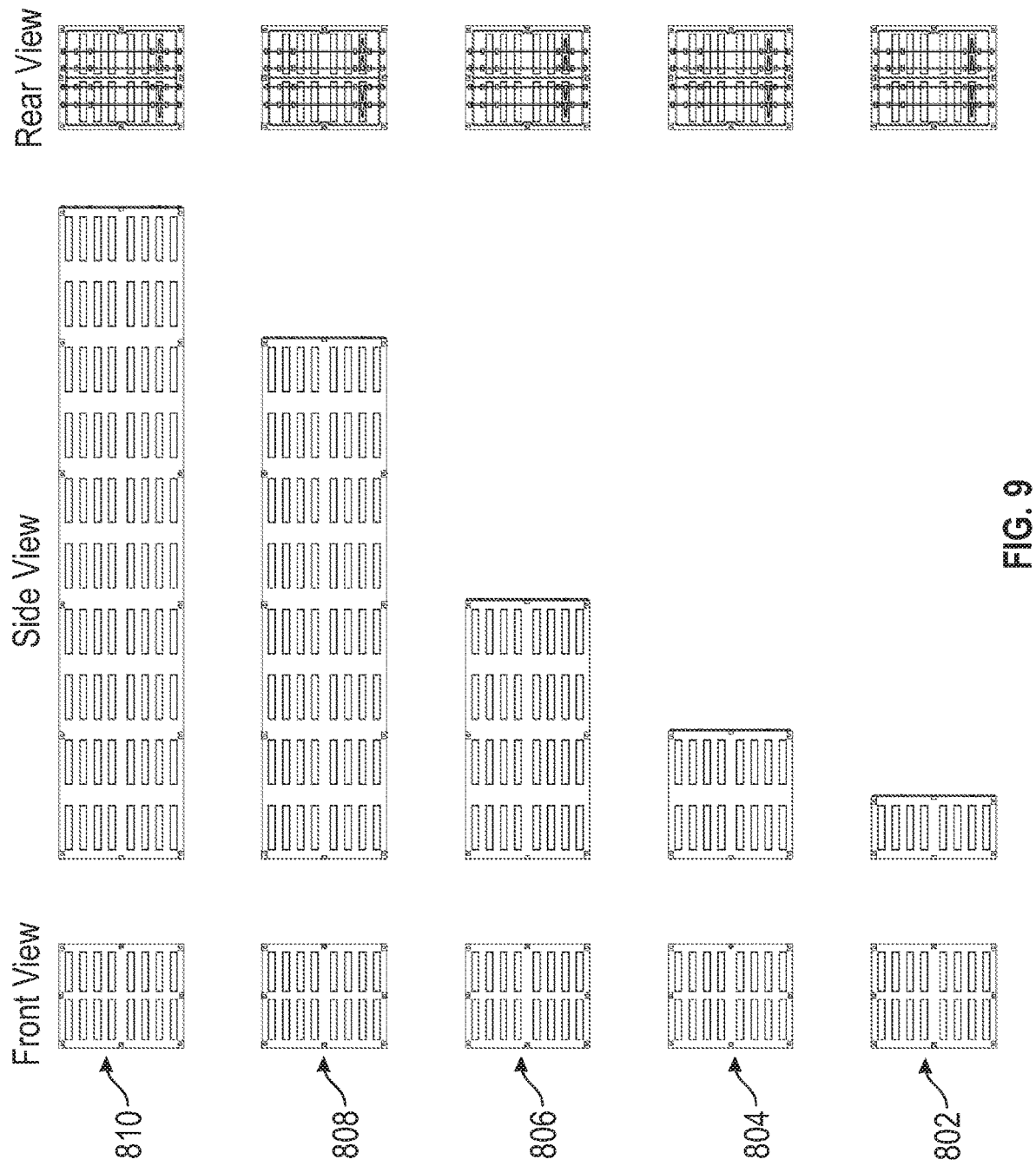
FIG. 9 depicts front, side, and rear plan views of the family of cargo containers of FIG. 8.

FIG. 8 depicts a family of cargo containers 800 according to an embodiment of the present disclosure. FIG. 9 provides, front, side, and rear views of the family of containers 800 of FIG. 8. The family of cargo containers 800 includes a 5' container 802, a 10' container 804, a 20' container 806, a 40' container 808, and a 50' container 810. The 50' container 810 could, in certain embodiments, be designed to fit on a 40' truck chassis with some cargo weight loading restrictions.

It can be seen that each cargo container has fittings at each of the eight corners of the cargo container, as well as center upper, center lower, center left, and center right fittings on both the front and rear ends of the cargo container, much like the example cargo container 100 of FIGS. 1A-1B. The longer cargo containers (in this example, cargo containers 20' and longer) also have additional fittings in the length-wise direction at substantially regular intervals. For example, in the example family of cargo containers 800, the cargo containers have additional fittings in the length-wise direction approximately every 10 feet. It can be appreciated that cargo containers can have more additional fittings (e.g., every 5 feet), or fewer additional fittings (e.g., every 20 feet).

The next few figures will demonstrate one example of how containers can be connected to one another.

Figure 10:
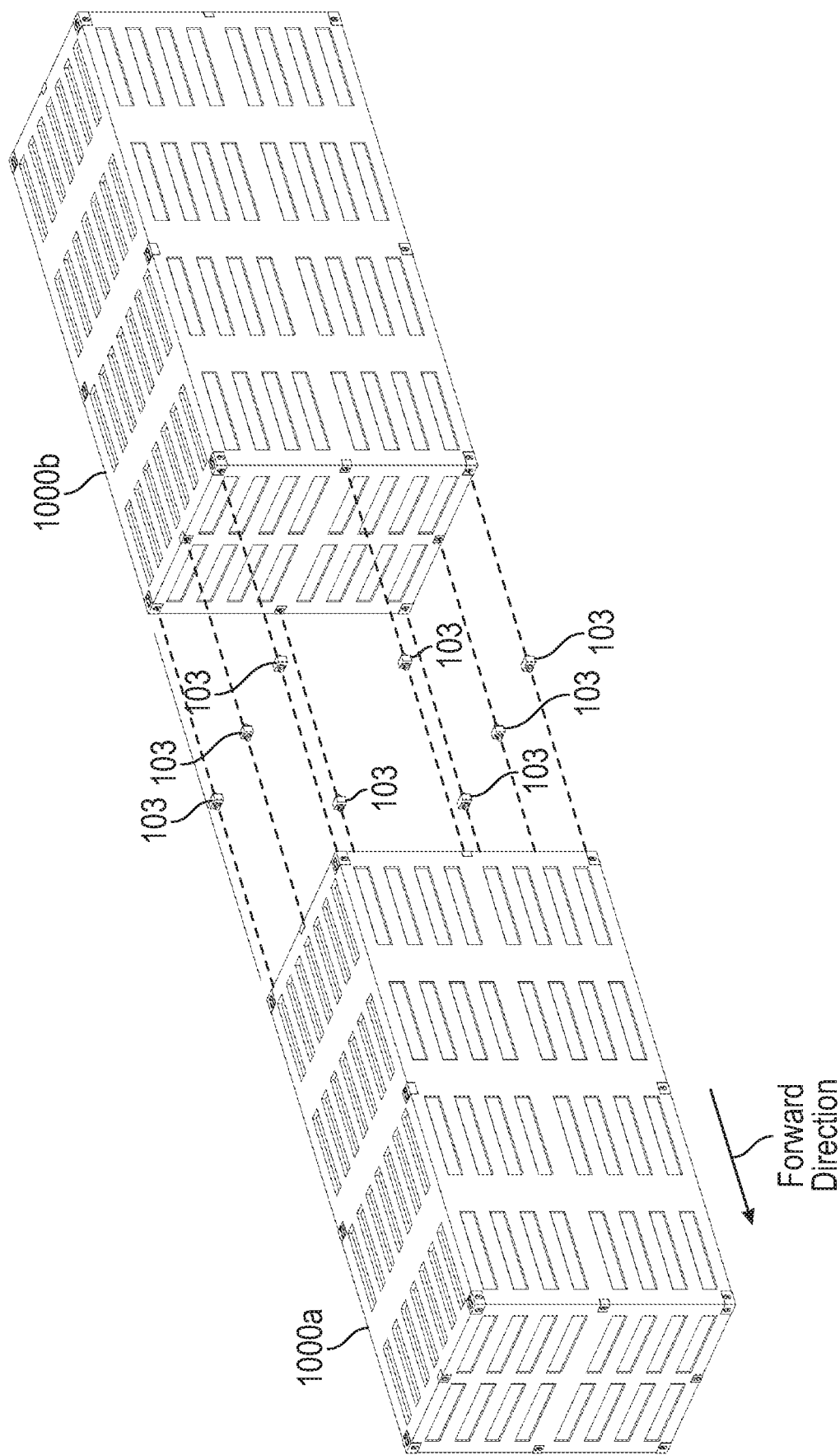
FIG. 10 depicts an exploded perspective view of two cargo containers being connected together in the front-to-back direction, according to an embodiment of the present disclosure.

FIG. 10 is an exploded perspective view showing how two containers 1000a, 1000b can be attached structurally in the front-to-back (i.e., length-wise) direction, in accordance with an embodiment of the present disclosure. In the example shown in FIG. 10, each cargo container 1000a, 1000b is essentially identical to the cargo container 100 of FIGS. 1A-1B and also the 20' cargo container 806 of FIG. 8. In this example scenario, each fitting on a rear or rear surface of the first cargo container 1000a is connected to each fitting on a front surface of the second cargo container 1000b using an appropriate fitting connector. In this example scenario, it is assumed that the front-to-back (i.e., length-wise) fitting connectors 103, 403, 503 are identical (i.e., each front-to back fitting connector is the front-to-back fitting connector 103 of FIG. 2). However, in other embodiments, different front-to-back fitting connectors may have different dimensions such that different front-to-back fitting connectors would be needed for different fittings.

Each fitting connector 103 is inserted into openings on two corresponding fittings on the cargo containers 1000a, 1000b (one fitting in cargo container 1000a and one fitting in cargo container 1000b) while the fitting connector 103 is in an unlocked position, and then, once inserted, rotating members of the fitting connector 103 are rotated into a locked position to secure the two corresponding fittings together. While the example in FIG. 10 shows eight fittings being secured together, it is anticipated that in certain embodiments, only the four corner fitting connections would be needed, but more connections are shown and can be utilized if needed for structural requirements.

Figure 11:
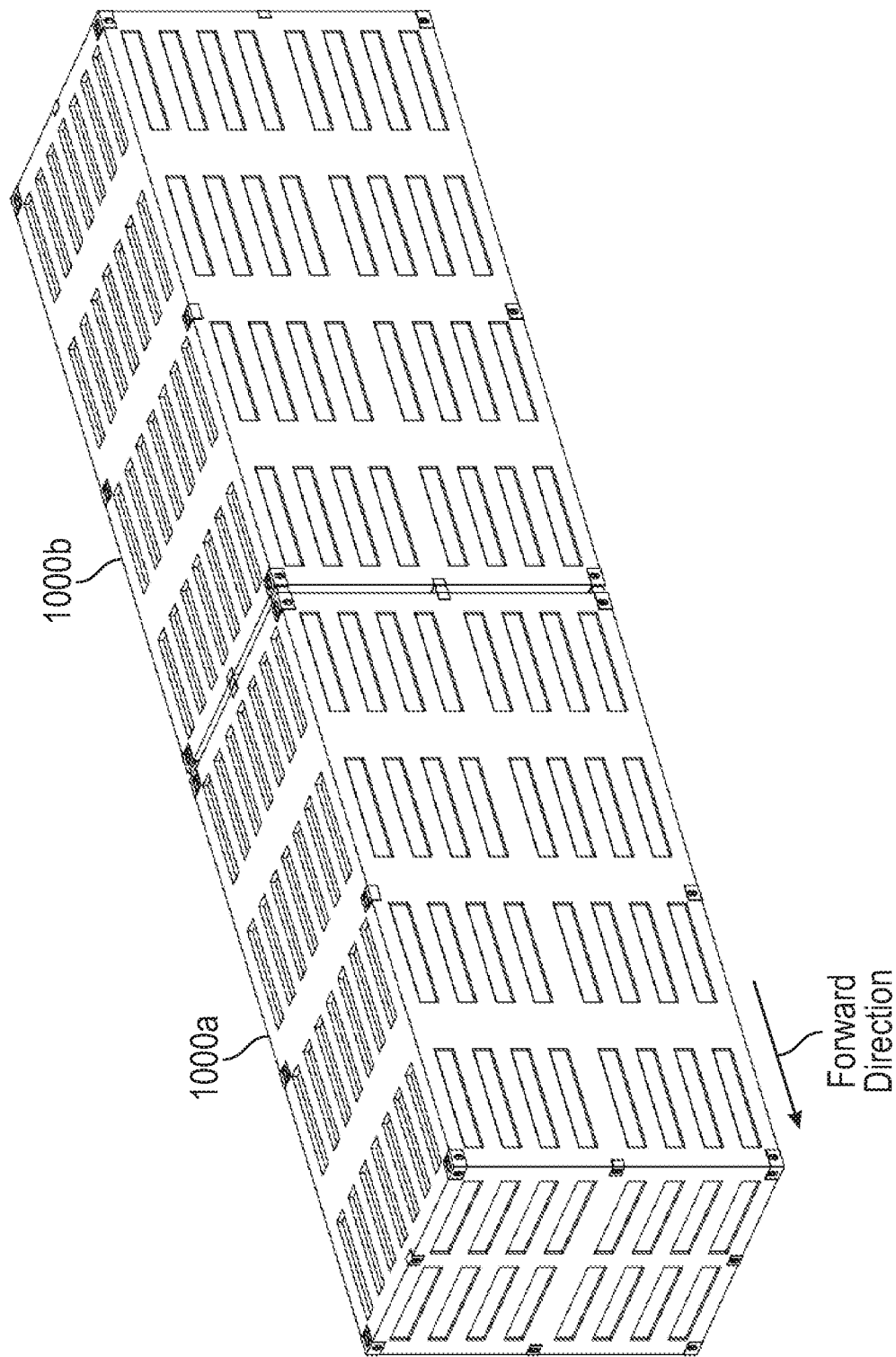
FIG. 11 depicts a perspective view of two cargo containers connected together in the front-to-based direction, according to an embodiment of the present disclosure.

FIG. 11 shows the two containers 1000a, 1000b connected in the front-to-back (i.e., length-wise) direction, in accordance with an embodiment of the present disclosure.

Figure 12:
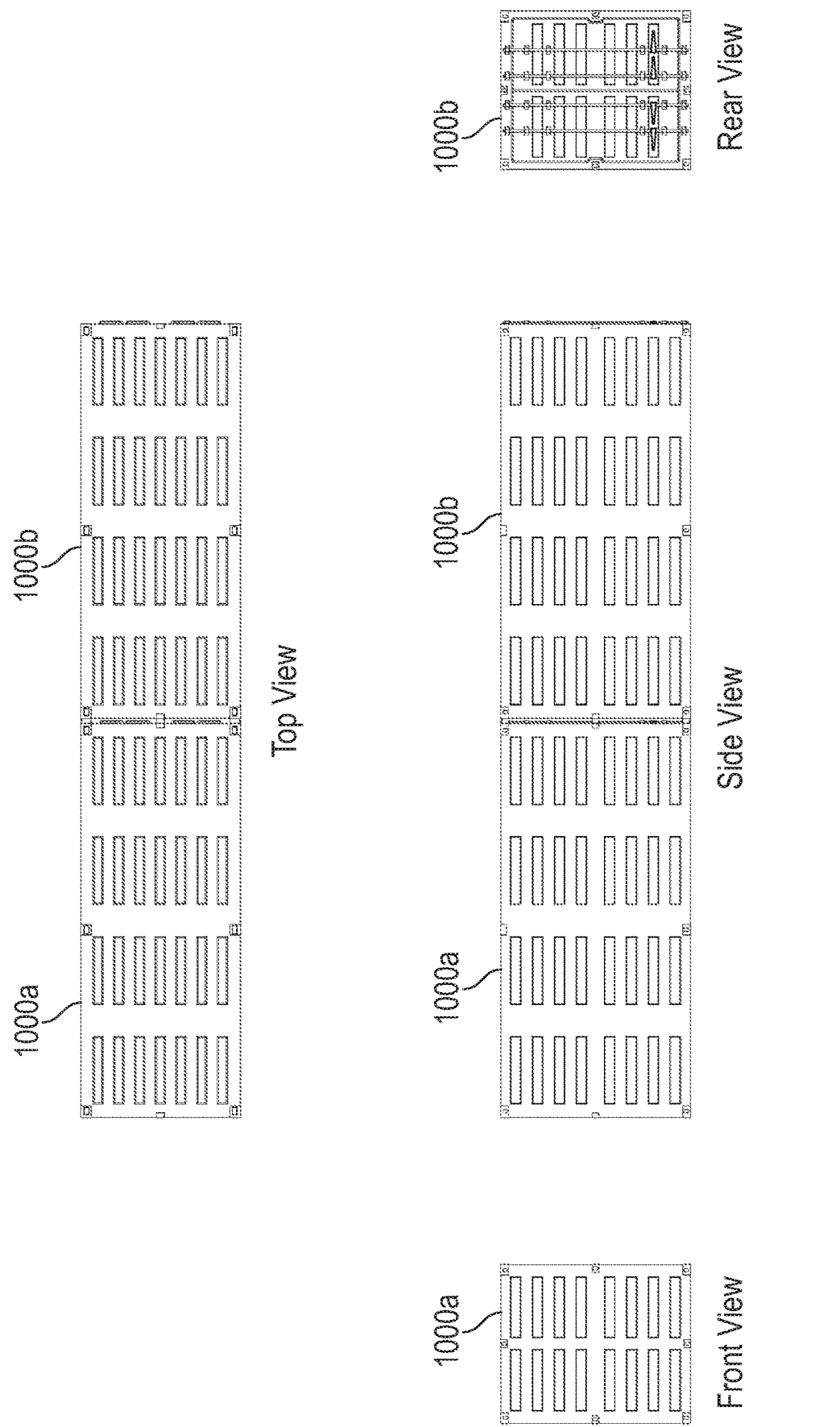
FIG. 12 depicts front, side, rear, and top plan views of the two connected cargo containers of FIG. 11.

FIG. 12 provides side, top, front, and back views of the two containers 1000a, 1000b connected in the front-to-back (i.e., length-wise) direction and the gap that is developed from the assembled system, in accordance with an embodiment of the present disclosure. In various embodiments, the two 20' cargo containers 1000a, 1000b fit into the same space as a 40' cargo container (e.g., cargo container 808 of FIG. 8).

Figure 13:
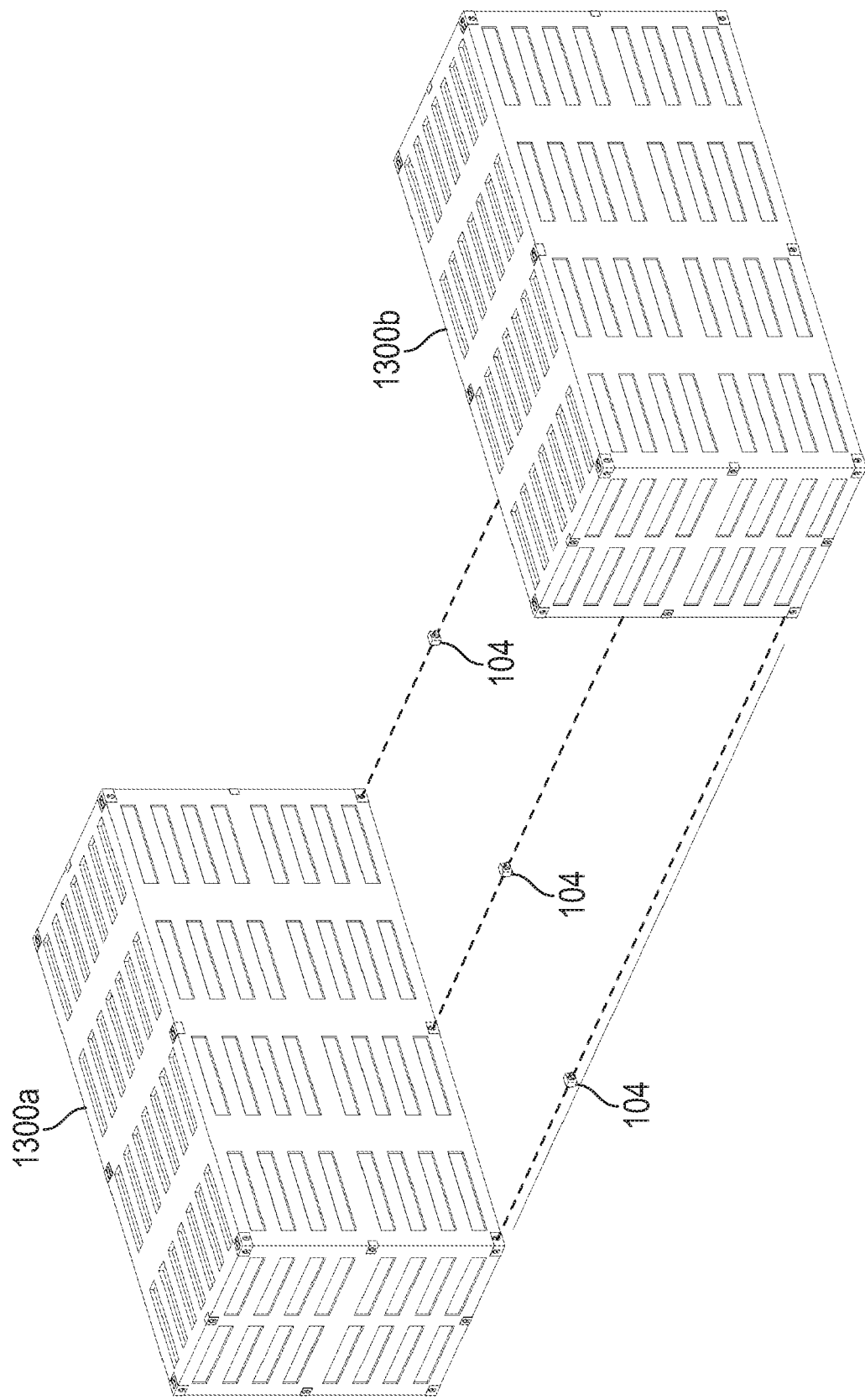
FIG. 13 depicts an exploded perspective view of two cargo containers being connected together in the side-to-side direction, according to an embodiment of the present disclosure.

FIG. 13 is an exploded perspective view showing how two containers 1300a, 1300b can be connected in the side-to-side (i.e., width-wise) direction, in accordance with an embodiment of the present disclosure. In the example shown in FIG. 13, each cargo container 1300a, 1300b is essentially identical to the cargo container 100 of FIGS. 1A-1B and also the 20' cargo container 806 of FIG. 8. In this example scenario, it is assumed that the side-to-side (i.e., width-wise) fitting connectors 104, 304 are identical (i.e., each side-to-side fitting connector is the side-to-side fitting connector 104 of FIG. 2).

In this particular configuration, there are no top side-to-side connections. This may be because, in certain embodiments, the top fittings on the containers 1300a, 1300b could be connected to a spine (e.g., on an aircraft being used to transport the containers) or to a second stack of containers, either of which could take the containers' upper side-to-side loads. This can assist in minimizing the number of connections required and still have a functional, structurally sound system. However, it should be appreciated that additional connections can be made if required.

Figure 14:
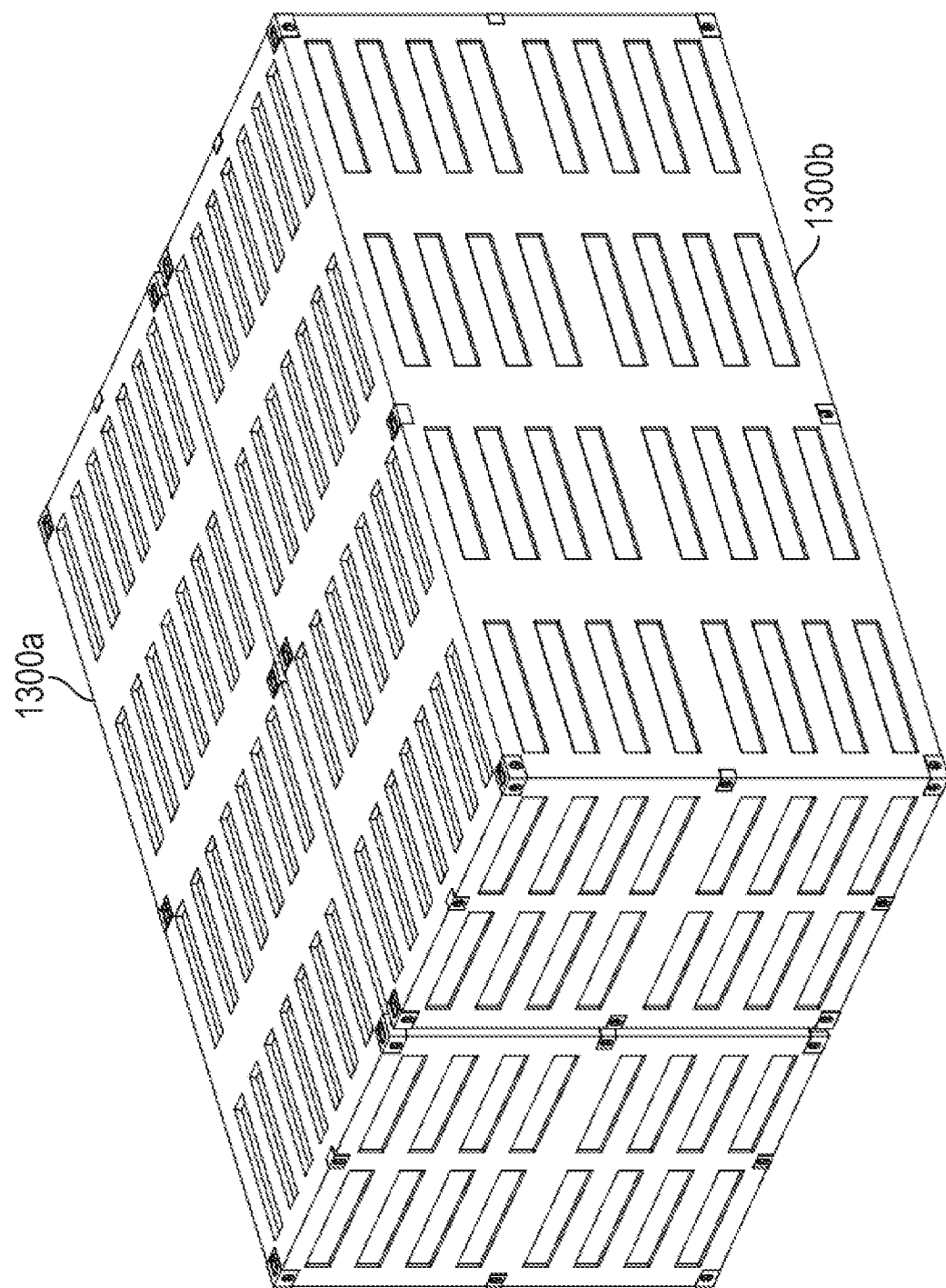
FIG. 14 depicts a perspective view of two cargo containers connected together in the side-to-side direction, according to an embodiment of the present disclosure.

FIG. 14 shows the two containers 1300a, 1300b connected in the side-to-side (i.e., width-wise) direction, in accordance with an embodiment of the present disclosure.

Figure 15:
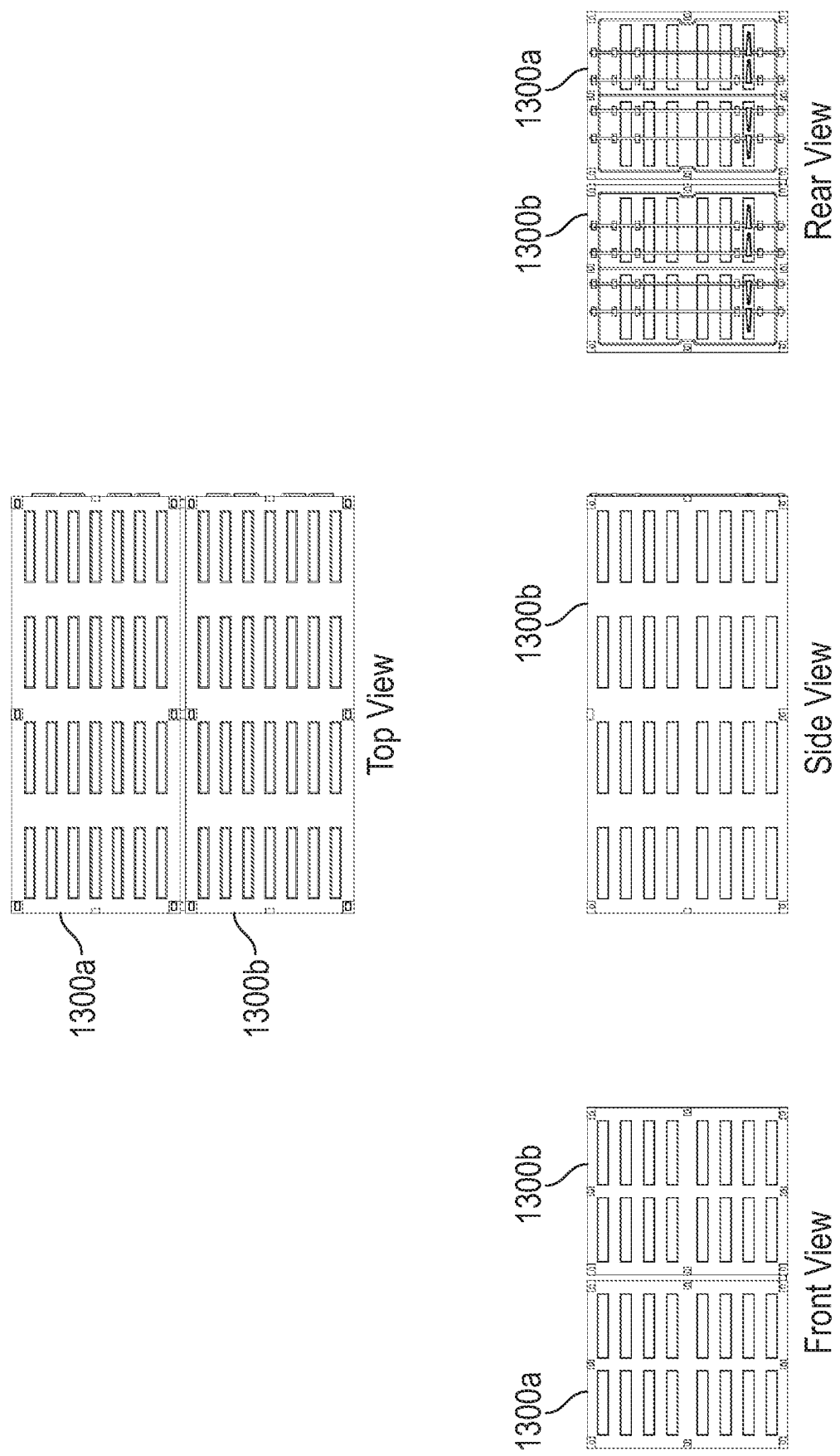
FIG. 15 depicts front, side, rear, and top plan views of the two connected cargo containers of FIG. 14.

FIG. 15 provides side, top, front, and back views of the two containers 1300a, 1300b connected in the side-to-side (i.e., width-wise) direction and the gap that is developed due to the fitting connector 104's thickness, in accordance with an embodiment of the present disclosure.

Figure 16:
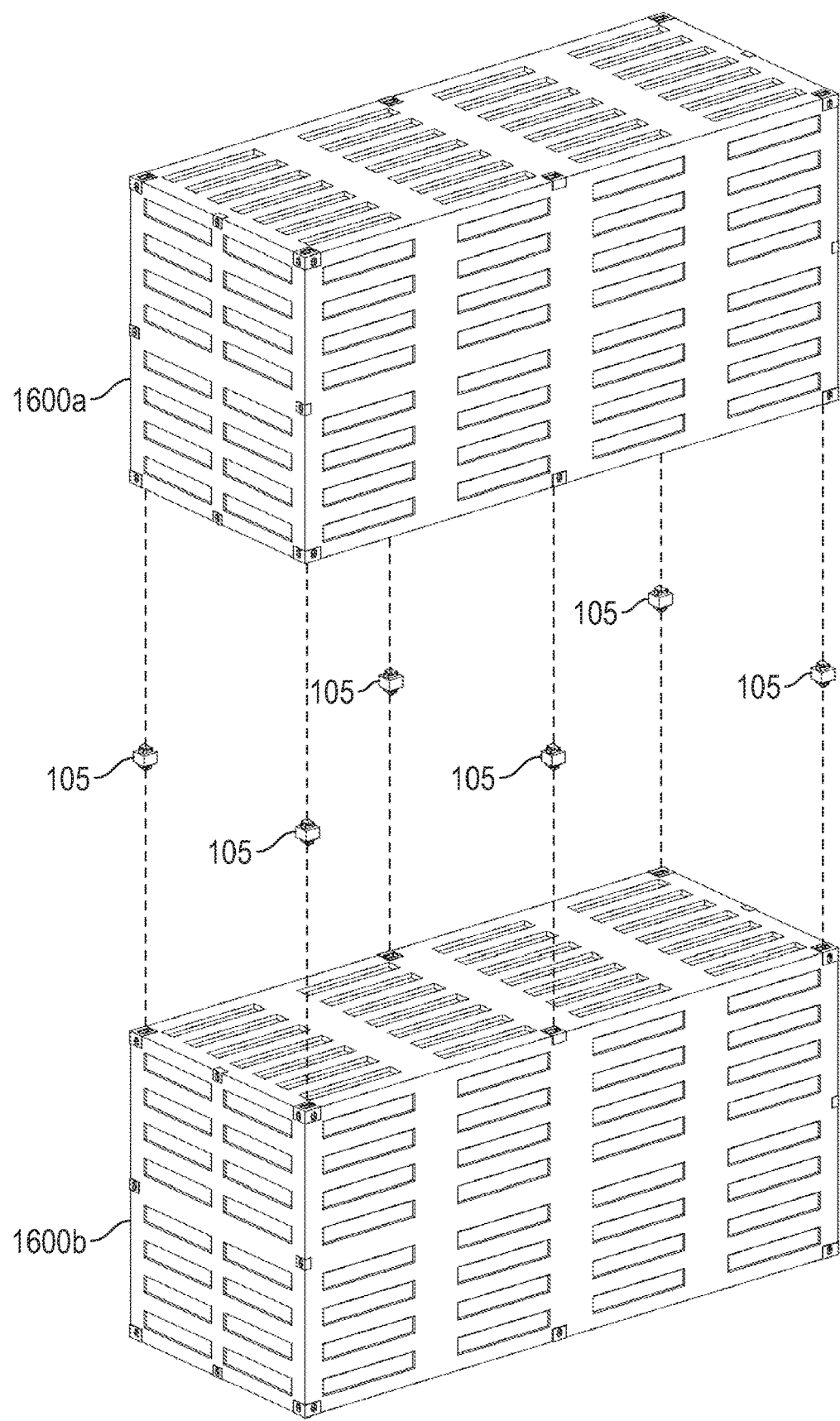
FIG. 16 depicts an exploded perspective view of two cargo containers being connected together in the top-to-bottom direction, according to an embodiment of the present disclosure.

FIG. 16 is an exploded perspective view showing how two containers 1600a, 1600b can be connected in the top-to-bottom (i.e., height-wise) direction, in accordance with an embodiment of the present disclosure. In the example shown in FIG. 16, each cargo container 1600a, 1600b is essentially identical to the cargo container 100 of FIGS. 1A-1B and also the 20' cargo container 806 of FIG. 8. In this example scenario, it is assumed that the top-to-bottom (i.e., height-wise) fitting connectors 105, 305, 605 are identical (i.e., each top-to-bottom fitting connector is the top-to-bottom fitting connector 105 of FIG. 2).

In this particular configuration, there are no top-to-bottom connections made using the front lower width-wise intermediate fitting and the rear lower width-wise intermediate fitting. This may be because, in certain embodiments, the containers 1600a, 1600b are only 8' wide, and do not require these fittings to connect in the top-to-bottom direction for structural integrity. This can assist in minimizing the number of connections required and still have a functional, structurally sound system. However, it should be appreciated that additional connections can be made if required and fittings can be modified as appropriate.

Figure 17:
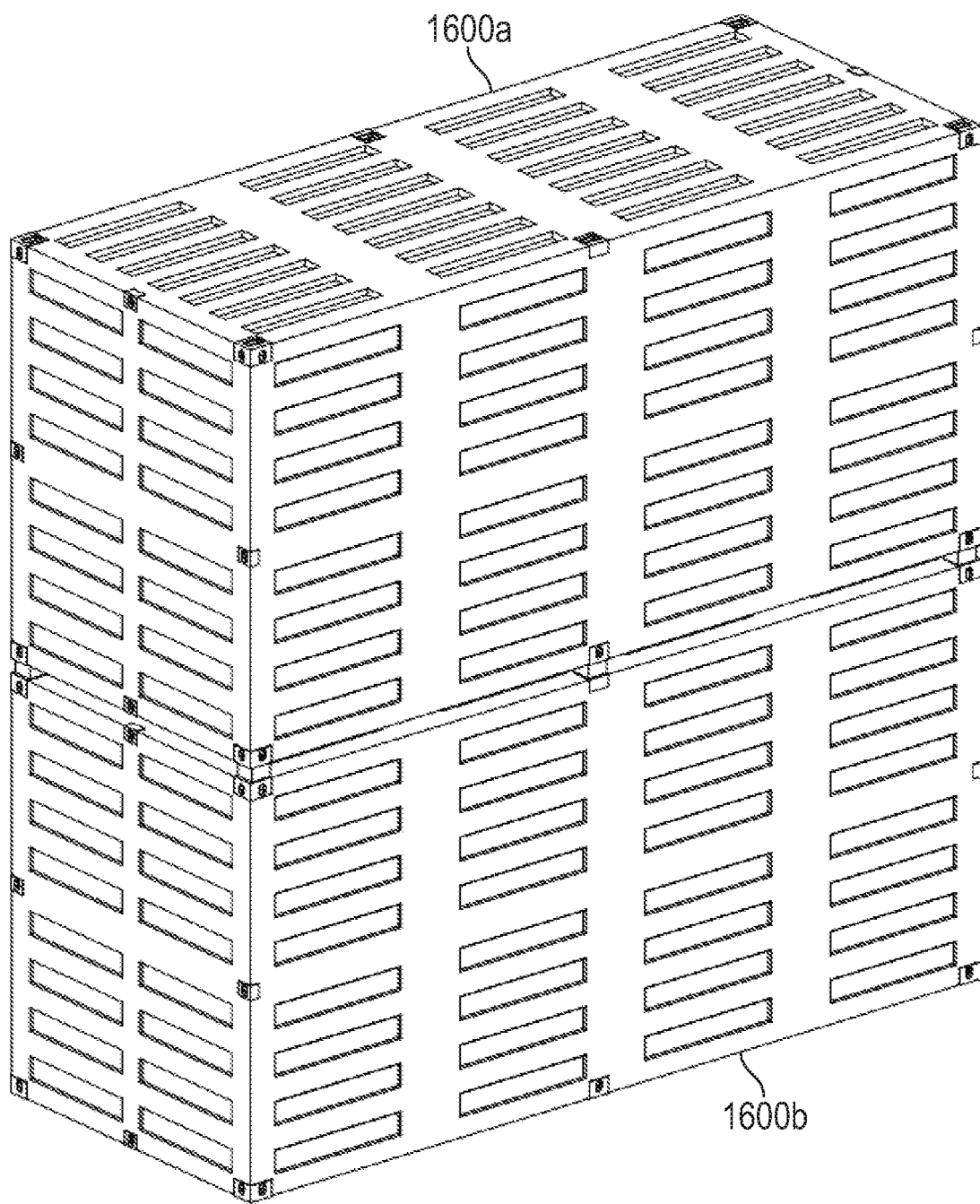
FIG. 17 depicts a perspective view of two cargo containers connected together in the top-to-bottom direction, according to an embodiment of the present disclosure.

FIG. 17 shows the two containers 1600a, 1600b connected in the top-to-bottom (i.e., height-wise) direction, in accordance with an embodiment of the present disclosure.

Figure 18:
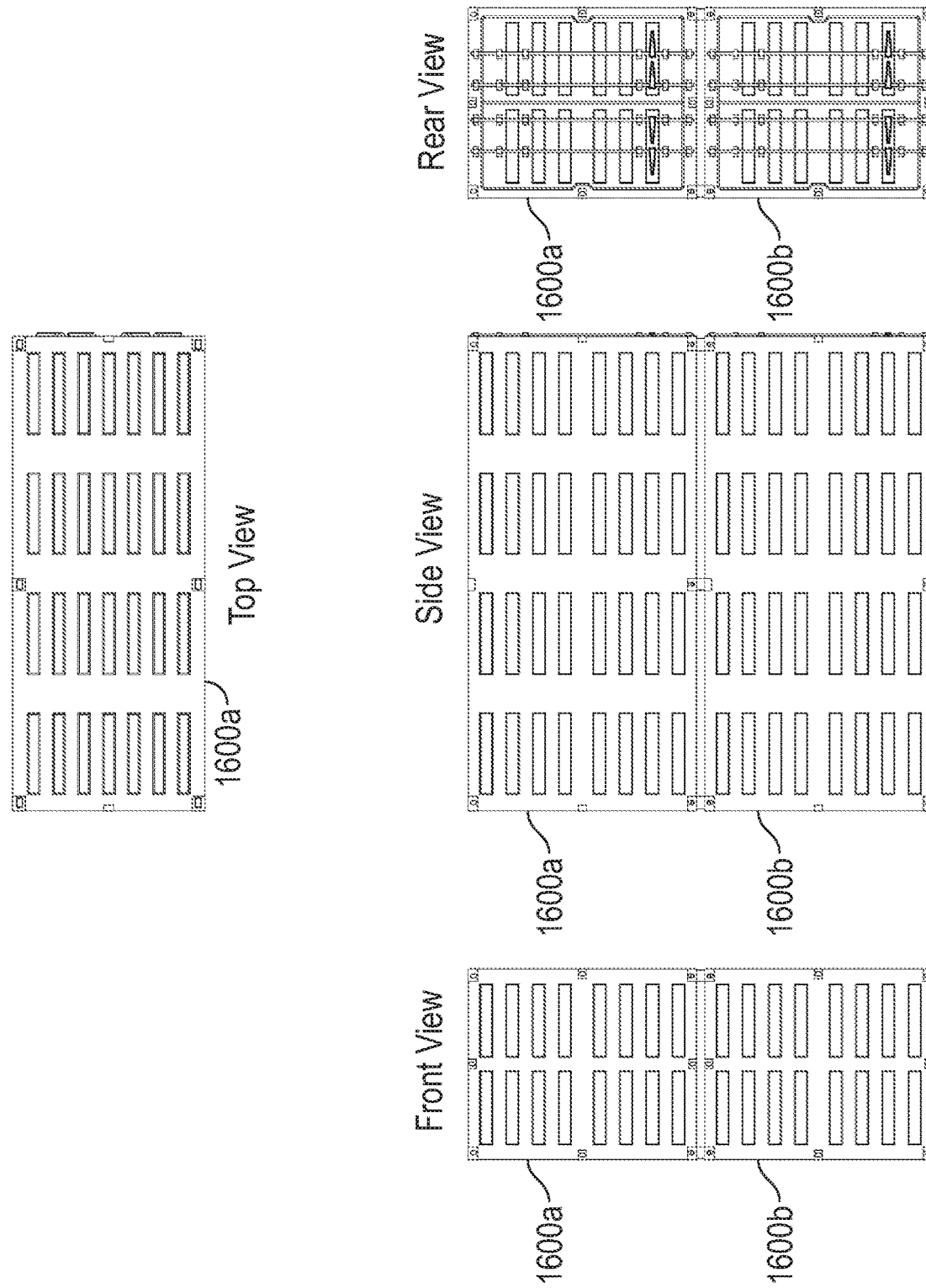
FIG. 18 depicts front, side, rear, and top plan views of the two connected cargo containers of FIG. 17.

FIG. 18 provides side, top, front, and back views of the two containers 1600a, 1600b connected in the top-to-bottom (i.e., height-wise) direction and the gap that is developed due to the fitting connector 105's thickness, in accordance with an embodiment of the present disclosure.

Figure 19:
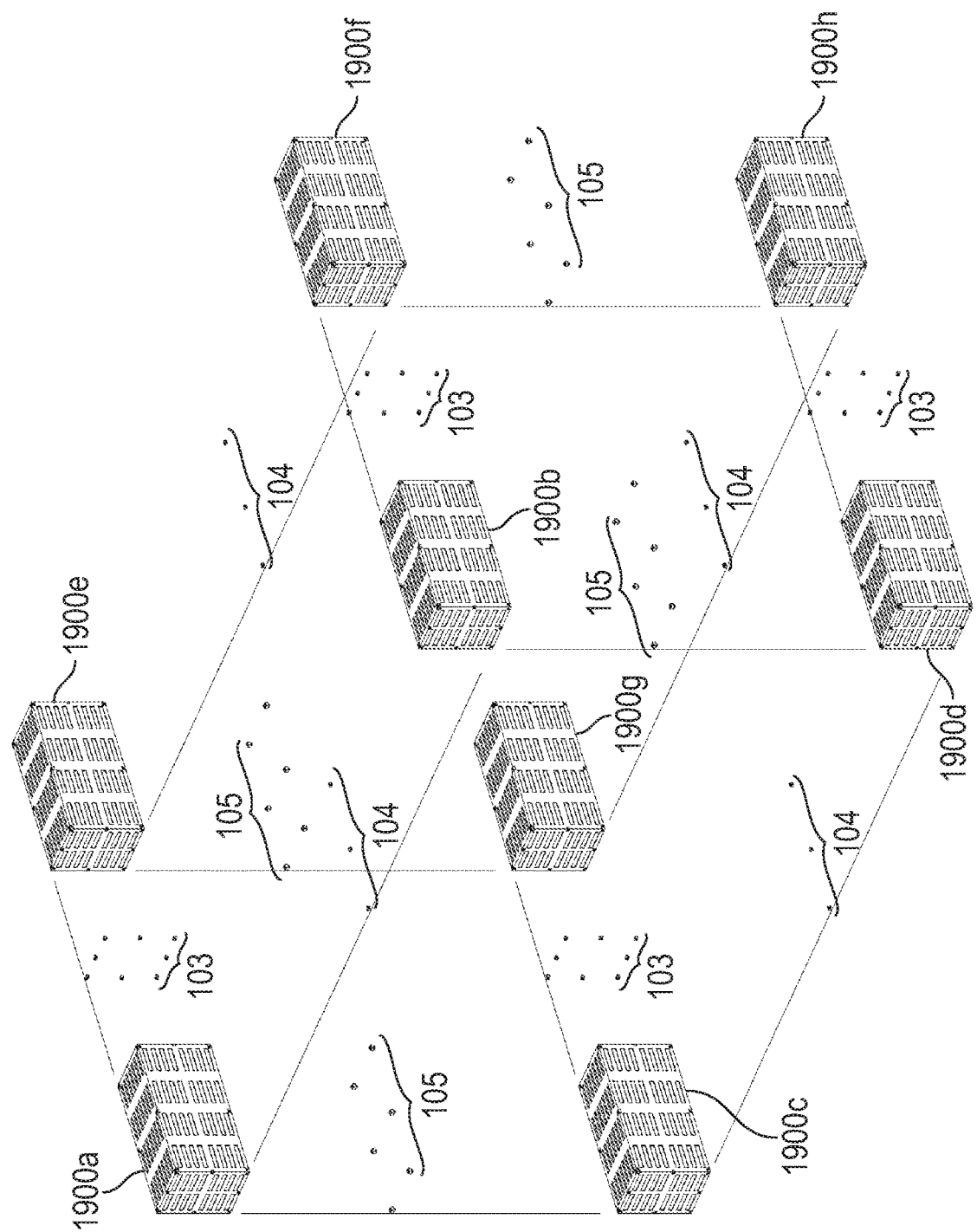
FIG. 19 depicts an exploded perspective view of eight cargo containers being connected together in the top-to-bottom, front-to-back, and side-to-side directions, according to an embodiment of the present disclosure.

FIG. 19 combines all the previous combinations from FIGS. 10-18 to show how eight containers 1900a-h can be combined, in accordance with an embodiment of the present disclosure.

Figure 20:
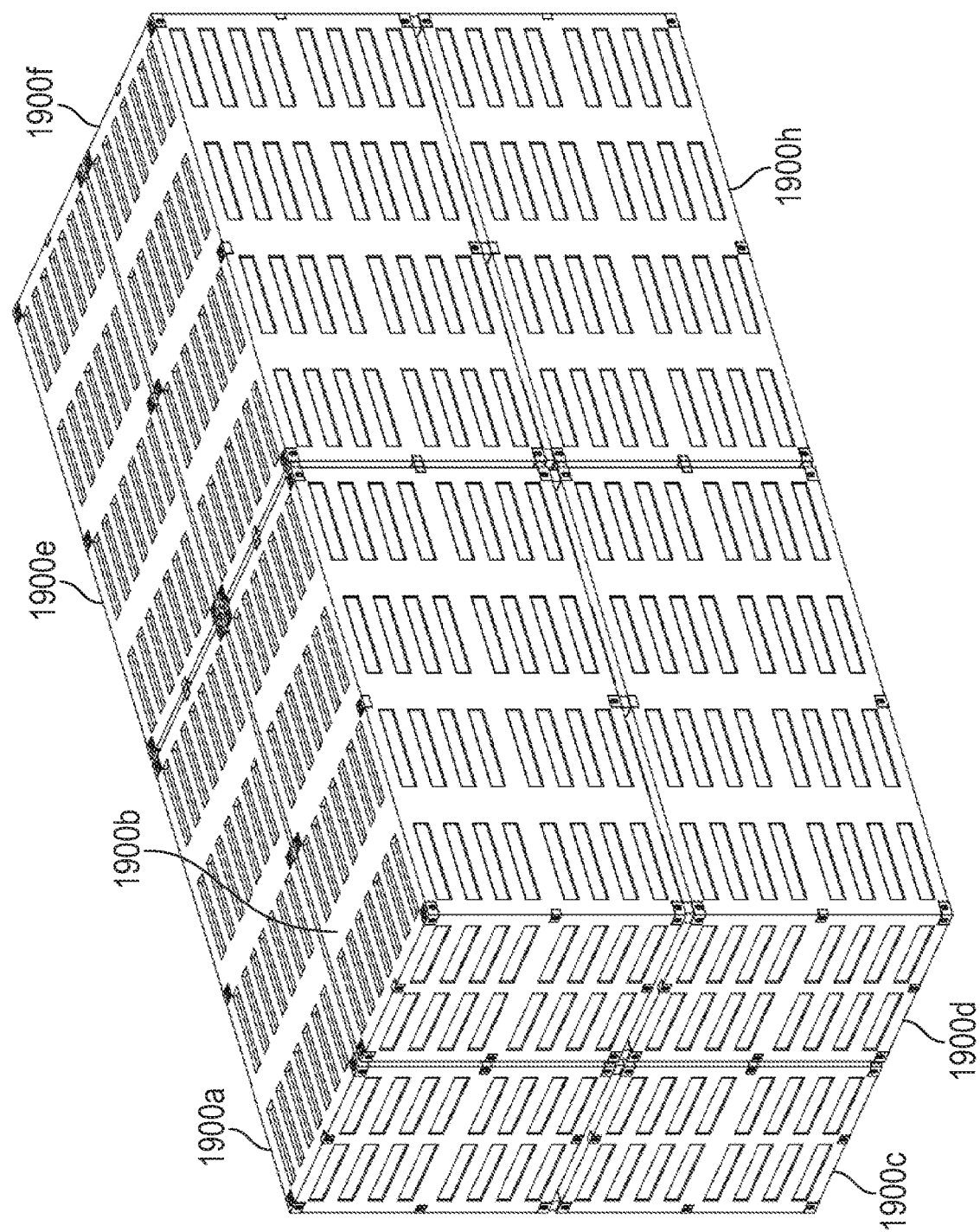
FIG. 20 depicts a perspective view of the eight cargo containers of FIG. 19 connected together.

FIG. 20 is a final, assembled eight container assembly, in accordance with an embodiment of the present disclosure.

Figure 21:
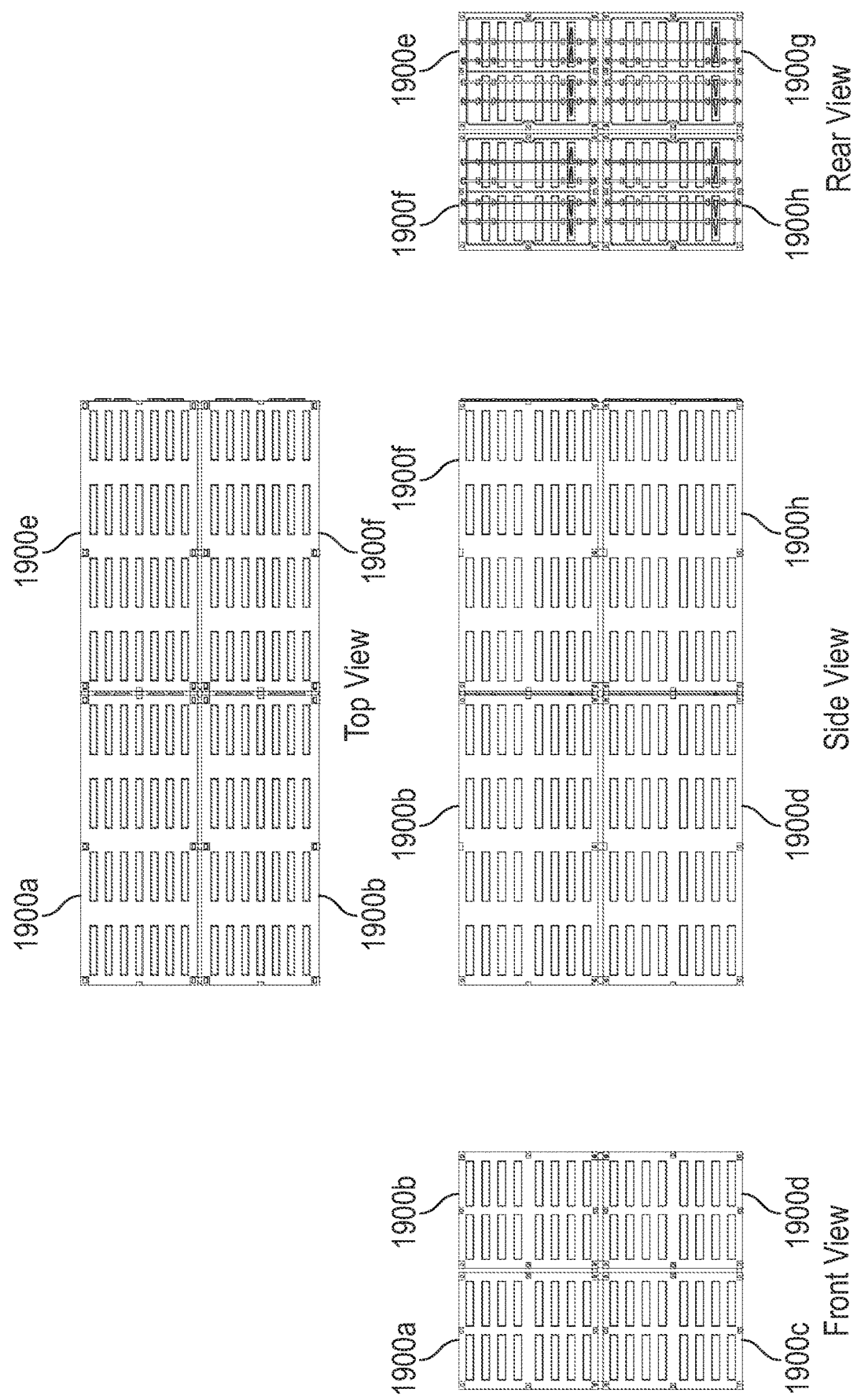
FIG. 21 depicts front, side, rear, and top plan views of the eight connected cargo containers of FIG. 20.

FIG. 21 provides, side, top, front, and back views of the eight-container assembly and shows the gaps of an assembled eight container assembly, in accordance with an embodiment of the present disclosure. As discussed gaps in the assembly may be provided so as to allow an automatic or manual reach actuation system to lock and/or unlock each fitting connector 103, 104, 105.

Figure 22:
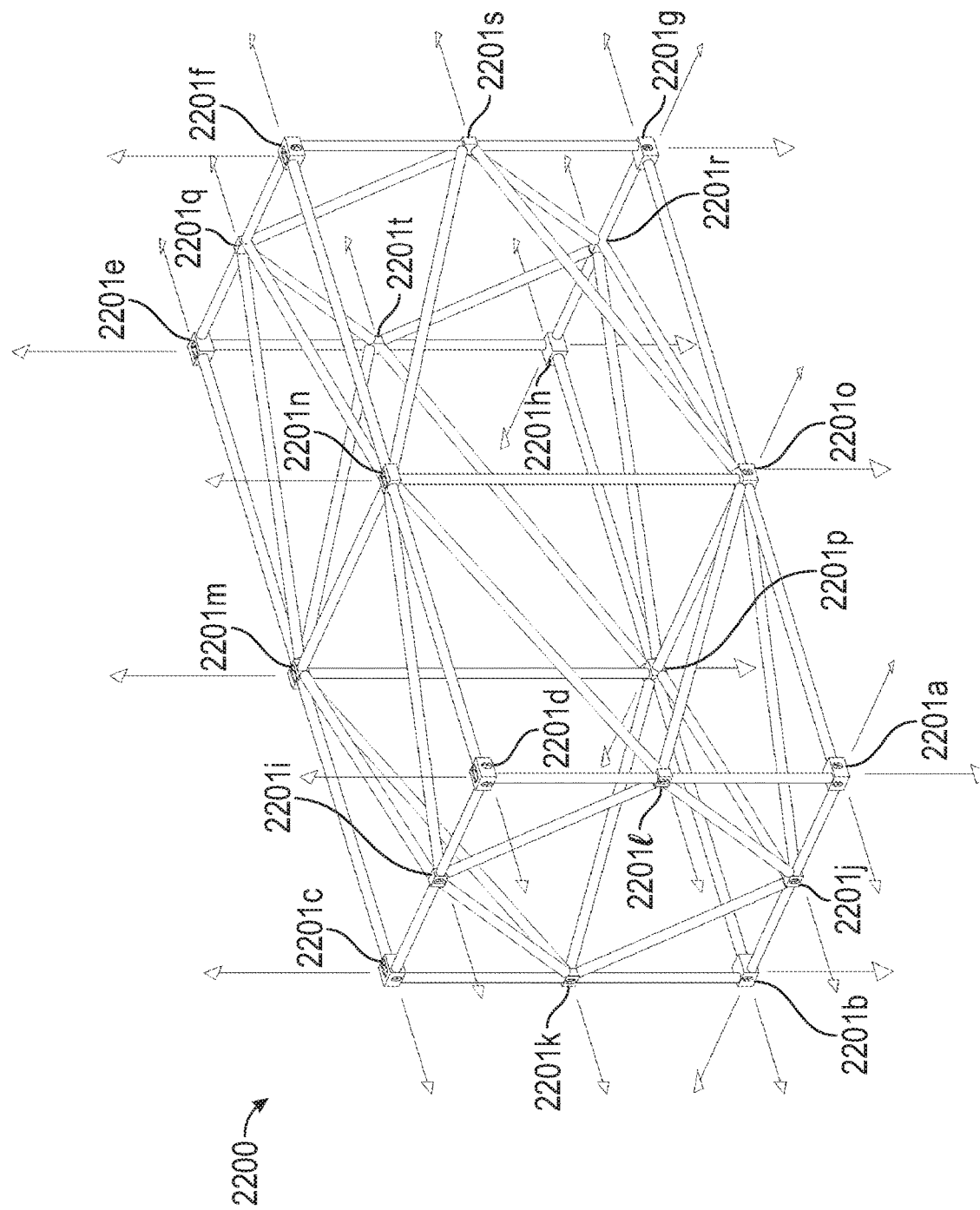
FIG. 22 depicts a perspective view of a truss-type cargo container, according to an embodiment of the present disclosure.

FIG. 22 is a perspective view of a cargo container 2200, according to an embodiment of the present disclosure. The cargo container 2200 represents an alternative embodiment to the cargo container 100 of FIGS. 1A-1B. Rather than having solid walls enclosing the cargo container, the cargo container 2200 has support beams between a plurality of fittings 2201a-t. The plurality of fittings 2201a-t are substantially identical to the fittings 101a-t of FIGS. 1A-1B. As was described with respect to the embodiments disclosed above, in certain embodiments, spine-to-container connections and container-to-container connections may occur only at discrete connection locations, i.e., fittings 101a-t or 2201a-t. This means that the space between the fittings can be anything in terms of geometries, structures, materials, etc., as long as the loads between the fittings and fitting connectors are transferred adequately. It should be understood that fittings, cross-members, and/or support beams can be added as needed based on container size and the cargo to be transported.

Figure 23:
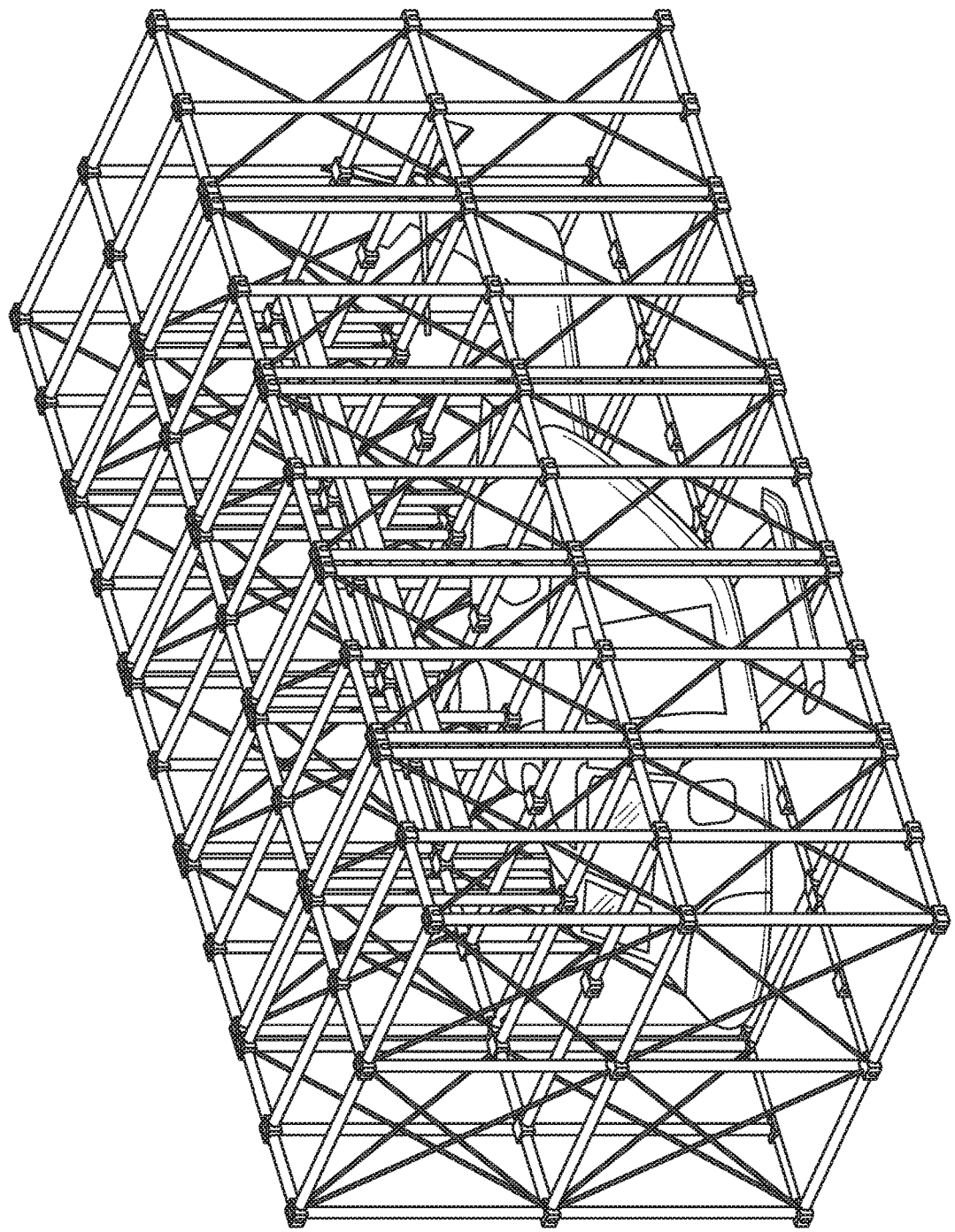
FIG. 23 depicts a perspective view of an example scenario in which a plurality of truss-type cargo containers are combined together and modified to fit an irregularly shaped, large payload, according to an embodiment of the present disclosure.

FIG. 23 depicts an example scenario in which twenty cargo containers have been connected together in a double-wide, double-high configuration in order to fit a helicopter 2304. Support beams connecting the various fittings of the cargo containers have been arranged such that the twenty cargo containers define an inner cavity within which the helicopter can fit. FIGS. 22 and 23 show the flexibility of the system, which includes double-wide and/or double-high container assemblies with one or more center walls or support structures (e.g., support beams) that can be removed. As long as the spine connection locations are met, the container structure and geometry can be almost anything.

This is an advantageous concept, as today's aircraft do not have this ability. By decoupling the payload fuselage section from the aircraft and transmitting all loads via the fittings and fitting connectors, it opens up the ability to customize the structure to a particular payload requirement without affecting the transport vehicle spine.

For instance, consider an example scenario of a transport system (e.g., a cargo aircraft) which has a 120' long spine (such as the spine 2502 of FIG. 25) which has 13 rows of mounts (i.e., fittings, connections, connection points, etc.) and is able to carry twelve 40' containers in a two wide and two tall configuration. If the transport system has a payload capacity of 360,000 lbs., this means that each row of mounts can carry 27,682 lbs. of payload. A tank that weighs 120,000 lbs. would need to connect to (120,000/17,681=4.33) 5 rows of spine mounts. Since, in our example design so far, 13 rows=120', then 5 rows=50'. Thus, a tank that will be carried by our example spine will need a container that spreads its load among 5 rows of mounts. And since a tank may be too wide for one container, it may need to take the entire row of double-wide container mounts/fittings/connections. By decoupling the fuselage load carrying portion of the aircraft (or other transport vehicle), the present disclosure provides for a system where unlimited customization can occur at the container level. No longer will a company have to design an entire aircraft to handle a particular heavy or large load, but instead, they can send a container to a company for modification or even design a new container as long as the connection location can match the spine fitting locations and the loads can be carried from fitting to fitting on the new container design. And since containers are designed to be transported by all land, sea, and air intermodal systems, it is easy to move containers around to be modified. In all cases, air safety factors could be taken into account.

Figure 24:
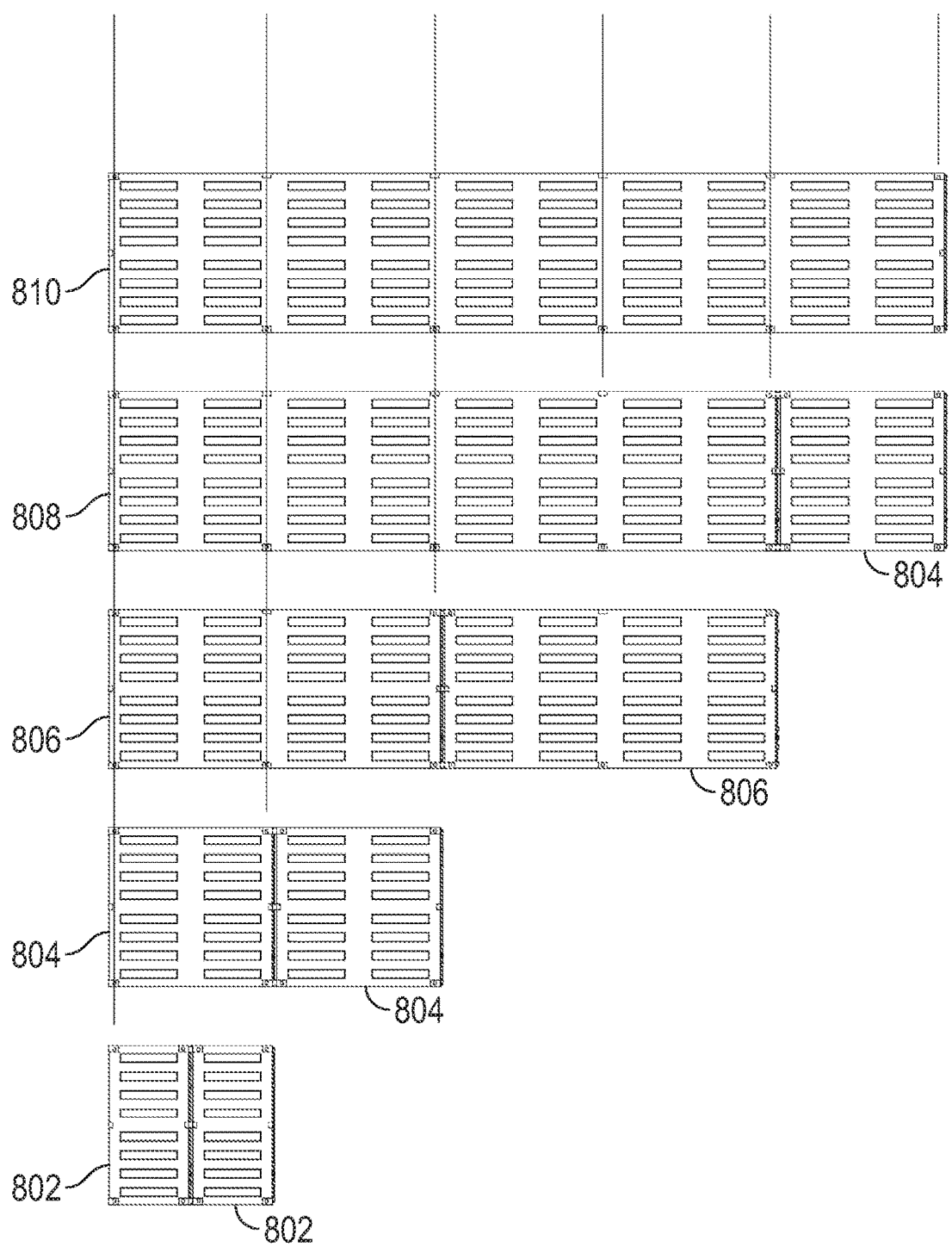
FIG. 24 depicts a side plan view of various configurations of a family of containers having dimensions and connections that allow different sized containers in the family to be connected to each other and to a matching spine, according to an embodiment of the present disclosure.

FIG. 24 depicts a side plan view of various configurations of the family of containers 800 of FIG. 8 connected to one another and to a transport vehicle spine, according to an embodiment of the present disclosure. FIG. 24 shows how a family of different length containers can be connected to each other and to a transport vehicle spine, in accordance with an embodiment of the present disclosure. The depicted embodiment shows a 50' segment of a spine with six rows of mounts (or fittings) located at 0", 109.75", 230.5", 351.25", 472", and 592.75". In other words, spine mounts (or spine fittings, or spine connections) are approximately 10' apart. Each row of mounts can be configured to be secured to corresponding fittings on a container assembly. It should be appreciated that the mount locations depicted in this embodiment, and all other embodiments disclosed herein, represent the location of a center-line with an added tolerance (e.g., a tolerance of +/−0.20" or a tolerance of +/−0.50", etc.). Furthermore, it should be appreciated that the mount locations depicted in the present disclosure are exemplary only, and mount locations can, in various embodiments, be modified without departing from the scope of the present disclosure. In the example embodiment, the spine can accommodate any combination of containers from 0' to 50', such as, for example a family of containers having containers with lengths of 5', 10', 20', 40', and 50' (such as the family of containers 800 of FIG. 8). A top row of FIG. 24 shows a 50' container 810 having six rows of fittings located 10' apart. A second row of FIG. 24 shows a 40' container 808 connected to a 10' container 804 to form a container assembly having the same length as the 50' container 810. A third row of FIG. 24 shows two 20' containers 806 connected to one another to form a container assembly having the same length as the 40' container 808. A fourth row of FIG. 24 shows two 10' containers 804 connected to one another to form a container assembly that has the same length as a 20' container 806. The final row of FIG. 24 shows two 5' containers 802 connected to one another to form a container assembly that has the same length as a 10' container 804. In the depicted example scenario, when a 5' container is used, two of them may need to be connected to emulate a 10' container, since a single 5' container by itself can only connect on one side to the spine.

Figure 25:
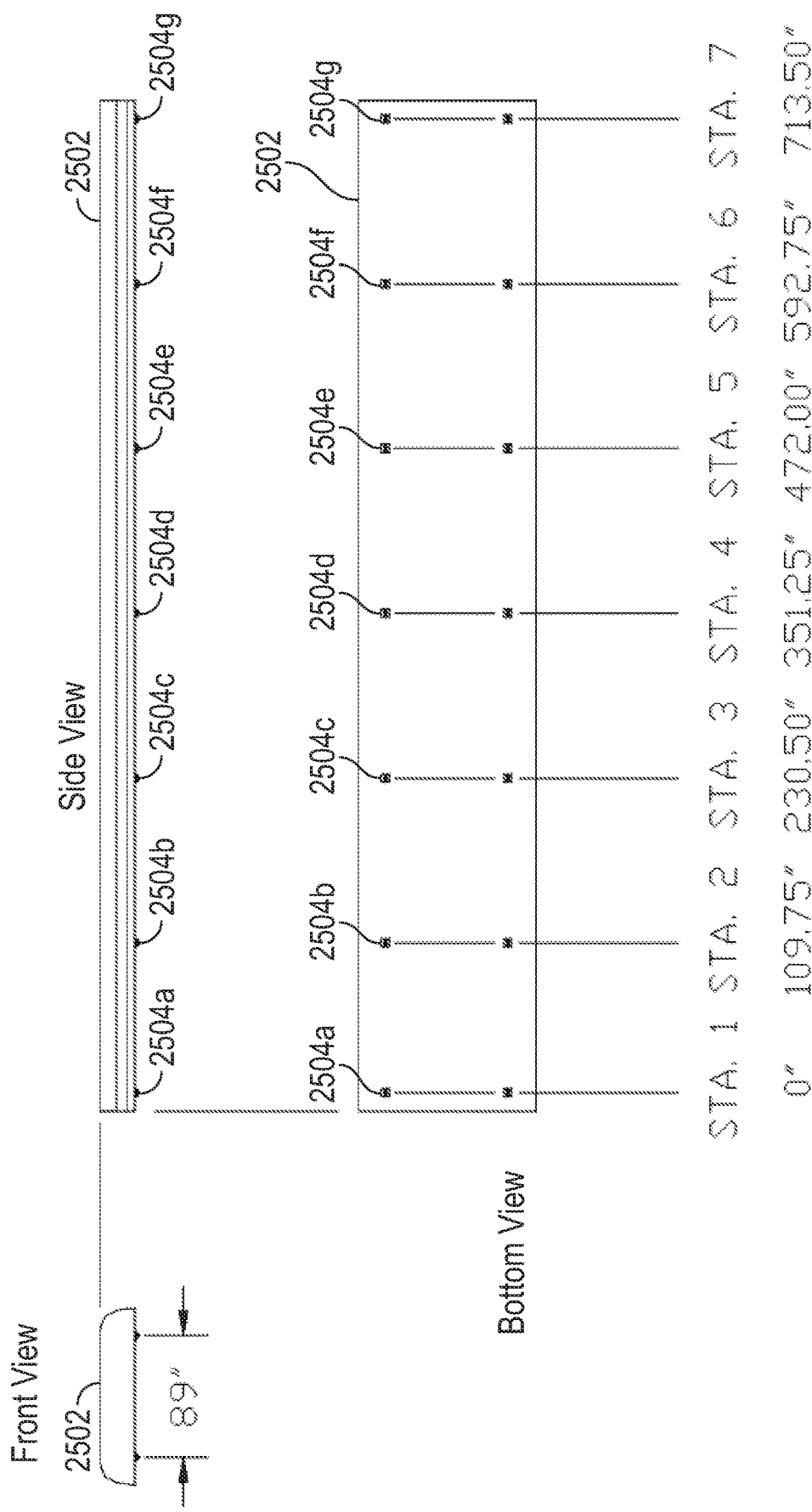
FIG. 25 depicts front, side, and bottom plan views of a single-width transport vehicle spine that matches the connections of the containers in FIG. 24, according to an embodiment of the present disclosure.

FIG. 25 depicts front, side, and bottom plan views of a transport vehicle spine 2502, according to an embodiment of the present disclosure. The spine 2502 may, in certain embodiments, be a 60' segment of a longer spine. The spine 2502, and any other spines, spine assemblies, or spine segments disclosed herein, can, in various embodiments, be incorporated into a transport vehicle, such as an aircraft, a boat, a train, and/or truck, to secure and transport a container assembly comprising one or more containers. As mentioned above, various embodiments of spine cargo transport systems are described in U.S. Pat. No. 7,261,257, issued on Aug. 28, 2007 and entitled CARGO AIRCRAFT; U.S. Pat. No. 7,699,267, issued on Apr. 20, 2010 and entitled CARGO AIRCRAFT; U.S. Pat. No. 8,608,110, issued on Dec. 17, 2013 and entitled CARGO AIRCRAFT SYSTEM; U.S. Pat. No. 8,708,282, issued on Apr. 29, 2014 and entitled METHOD AND SYSTEM FOR UNLOADING CARGO ASSEMBLY ONTO AND FROM AN AIRCRAFT; U.S. Pat. No. 9,493,227, issued on Nov. 15, 2016 and entitled METHOD AND SYSTEM FOR UNLOADING CARGO ASSEMBLY ONTO AND FROM AN AIRCRAFT; and U.S. Patent Publication No. 2014/0217230, filed on Feb. 5, 2013 and entitled DRONE CARGO HELICOPTER, each of which are incorporated by reference as if fully set forth herein.

The spine 2502 is 60' feet long and has seven rows of mounts 2504a-g, spaced approximately 10' apart. The spine 2502 is configured to receive cargo containers in a one-container wide configuration. In other words, each row of mounts 2504a-g has two mounts which are 89" apart from each other. Each mount is designed to align with a fitting on a top surface of a cargo container, such as fittings 101d, 101c, 101n, 101m, 101e, 101f of the cargo container 100 of FIGS. 1A-1B. In certain embodiments each mount may be configured to receive a fitting connector, such as a fitting connector 105 of FIG. 2, in order to be secured to a corresponding fitting on a top surface of a cargo container. In certain embodiments, each mount may be shaped substantially similarly to one half of a fitting connector, such as the vertical fitting connector 105, so that the mount itself can be inserted directly into a corresponding fitting on a top surface of a cargo connector. Certain example embodiment of spine mounts connected to cargo containers can be found in FIGS. 4A-4B of U.S. Pat. No. 8,608,110, issued on Dec. 17, 2013 and entitled CARGO AIRCRAFT SYSTEM.

In certain embodiments, spines can have additional rows of so that cargo containers can be moved, for example, forwards or backwards, to meet center of gravity requirements. In this way, instead of loads having to be adjusted inside the individual cargo containers, entire cargo containers can be moved forwards or backwards by a few feet or even a few inches in order to adjust center of gravity for an entire transport vehicle. As such, there is much more flexibility to adjust the entire container assembly in relation to the spine. In certain embodiments, spines can have many mounts, and any mounts that are not in use can be retracted. Certain embodiments can include spine mounts on a track that can be adjusted forward and/or backwards to move cargo containers in relation to the spine. Other embodiments can have spine mounts arranged symmetrically such that an entire container assembly (potentially comprising a plurality of containers) can be moved a set amount forward or backwards along a spine.

Figure 26:
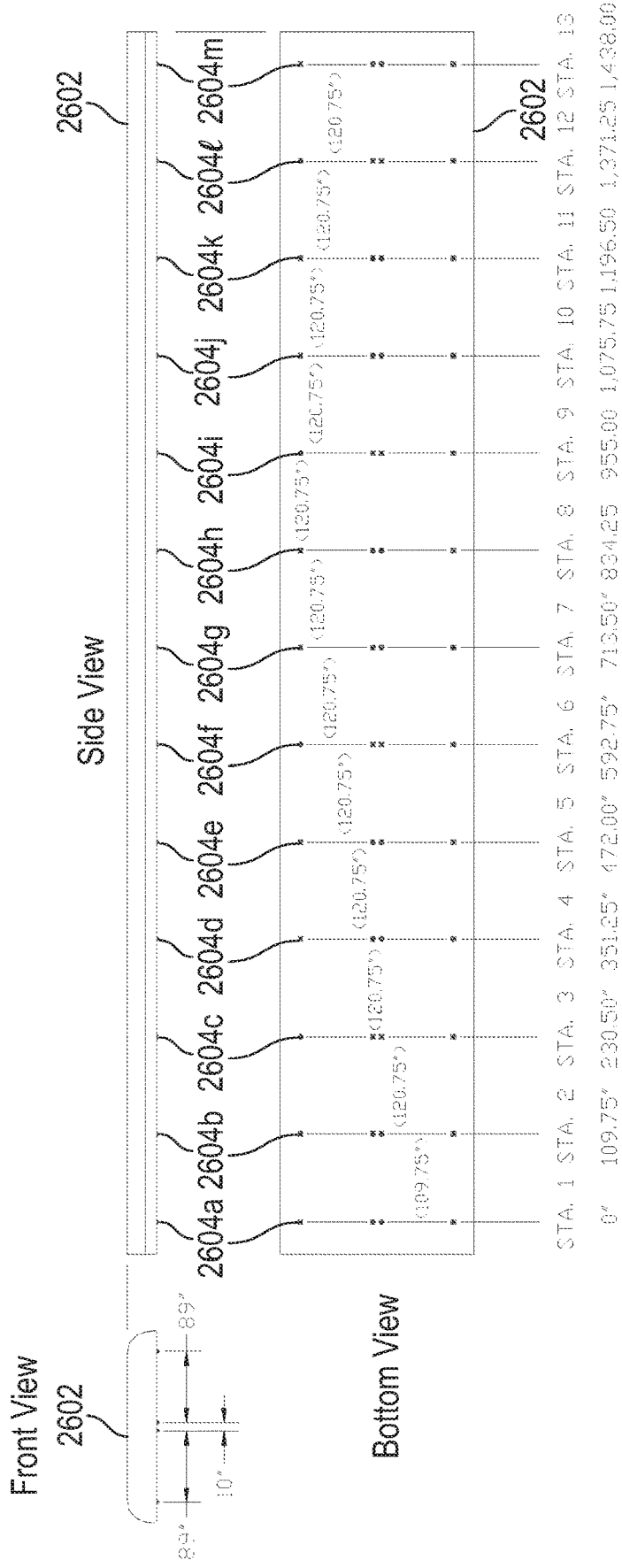
FIG. 26 depicts front, side, and bottom plan views of a double-width transport vehicle spine that connects to the containers of FIG. 24, according to an embodiment of the present disclosure.

FIG. 26 depicts front, side, and bottom plan views of a transport vehicle spine 2602, according to an embodiment of the present disclosure. The spine 2602 is 120' feet long and has thirteen rows of mounts 2604a-m, spaced approximately 10' apart. The spine 2602 is configured to receive cargo containers in a double-wide configuration. In other words, each row of mounts 2604a-m has two pairs of mounts (4 mounts in each row). Each pair of mounts are 89" apart from each other (to match the width of an ISO cargo container). There is a 10" spacing between adjacent pairs of mounts in a single row, which is based on a 3" thick side-to-side fitting connector 104 and the container corner fittings attachment locations. This spine configuration can accommodate, for example, twelve 40' containers (e.g., containers 808 of FIG. 8) in a two wide by two stack configuration three containers long.

Figure 27:
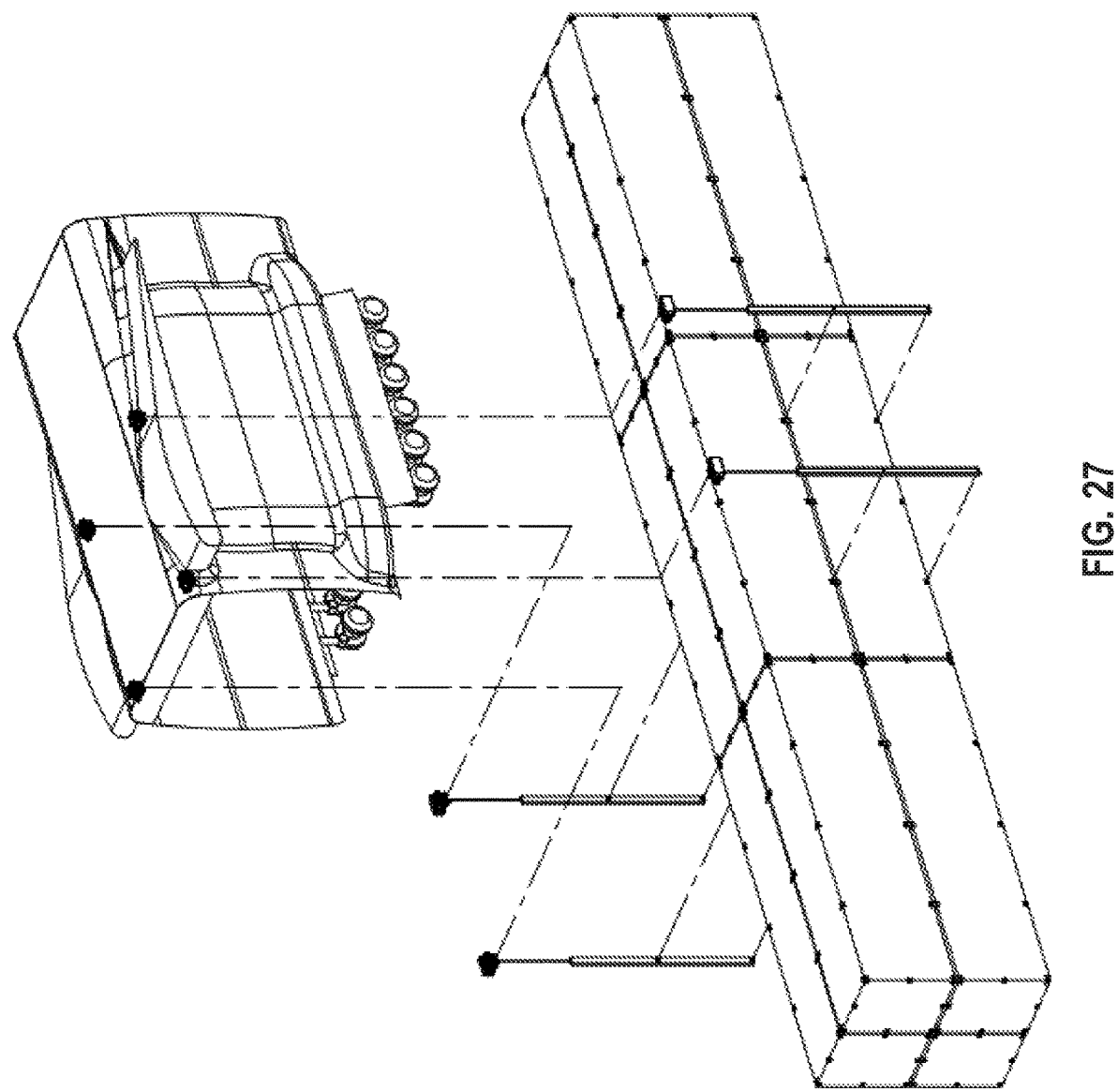
FIG. 27 depicts a perspective view of a container assembly being lifted by a winch assembly, according to an embodiment of the present disclosure.

As there may be scenarios where there is no ground equipment, FIG. 27 shows how a set of winches structurally connected to a center wing box structure can raise or lower a container assembly, in accordance with an embodiment of the present disclosure. The winch system shown in FIG. 27 is shown to engage with two fittings on the container assembly, one on a bottom container and one on an upper container. However, in other embodiments, it may be the case that a single fitting can be engaged. Thus, simple winch systems can be used to lower and raise containers to the spine. For example, if a container assembly is attached to a spine, the winch system can attach to the container assembly, and then unlock the spine mounts securing the container assembly to the spine. The winch system could then lower the containers to the ground. The winch system could then release from the container assembly and retract, and the aircraft can roll way from the container assembly. In the case of a single container on the ground or on a truck, the spine-based aircraft could roll over the container, lower the winch system and attach it to the container. The winch could then raise the container and secure it to the spine of the aircraft. In certain embodiments, the spine can include side tracks that could move the container assembly to the correct position on the spine before locking it in place. In this scenario, the container to container fitting connectors could be on arms that extend from the spine and connect to a first container prior to a second container being loaded on board. Winch locations can vary depending on landing gear configurations and additional ground extendable support structure.

Figure 28:
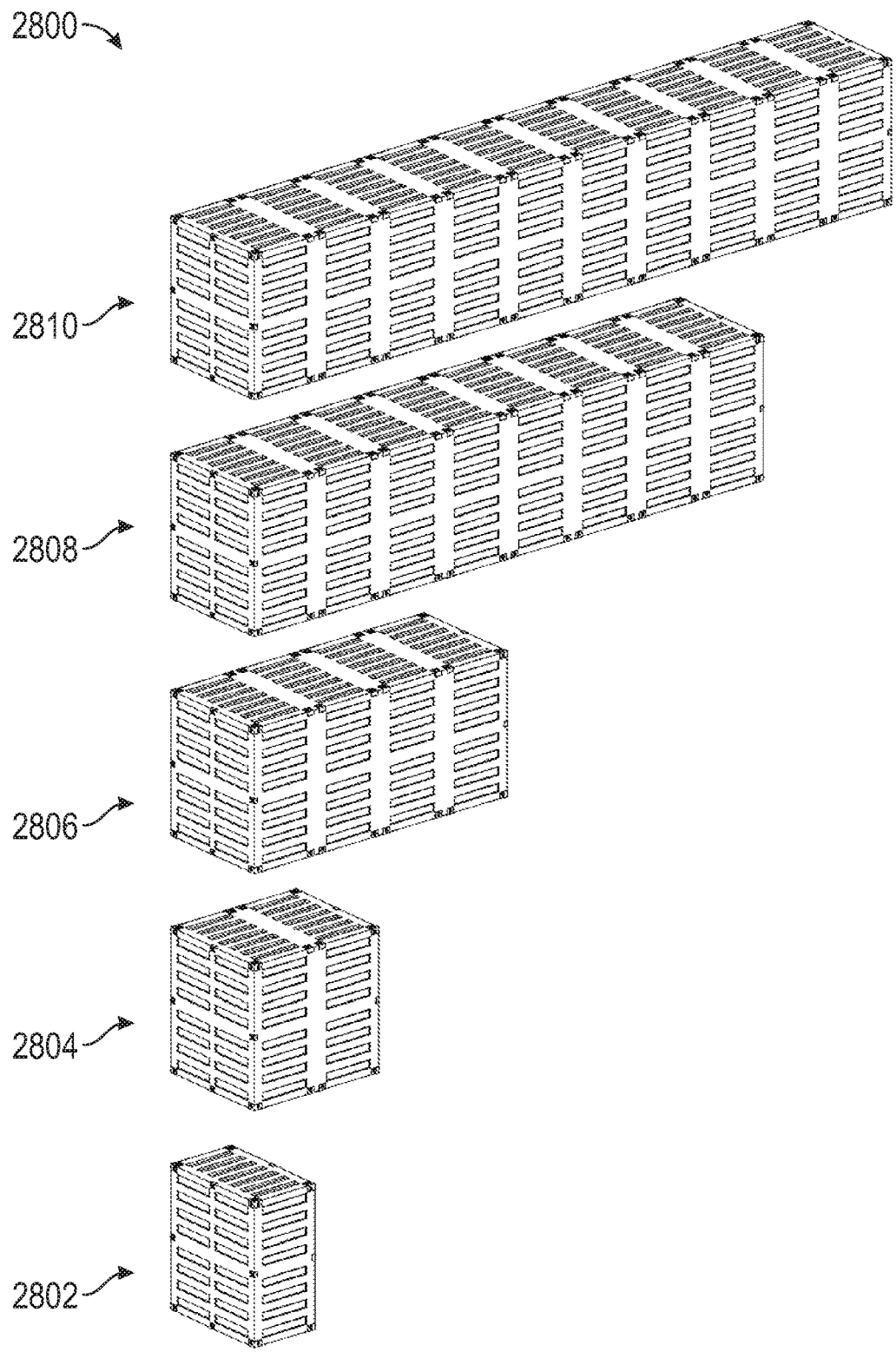
FIG. 28 depicts perspective views of a family of cargo containers with additional fittings, according to an embodiment of the present disclosure

FIG. 28 provides perspective views of a family of cargo containers 2800, according to an embodiment of the present disclosure. The family of cargo containers 2800 includes a 5' container 2802, a 10' container 2804, a 20' container 2806, a 40' container 2808, and a 50' container 2810. It can be seen that the family of cargo containers 2800 are substantially similar to the family of cargo containers 800 of FIG. 8, but each cargo container other than the 5' container 2802 includes additional fitting locations along the length of the cargo container. This design increases redundancy in case of failure of any fitting. This design will also allow a single 5' container 2802 to be connected on both front and back ends to the spine or to other containers.

Figure 29:
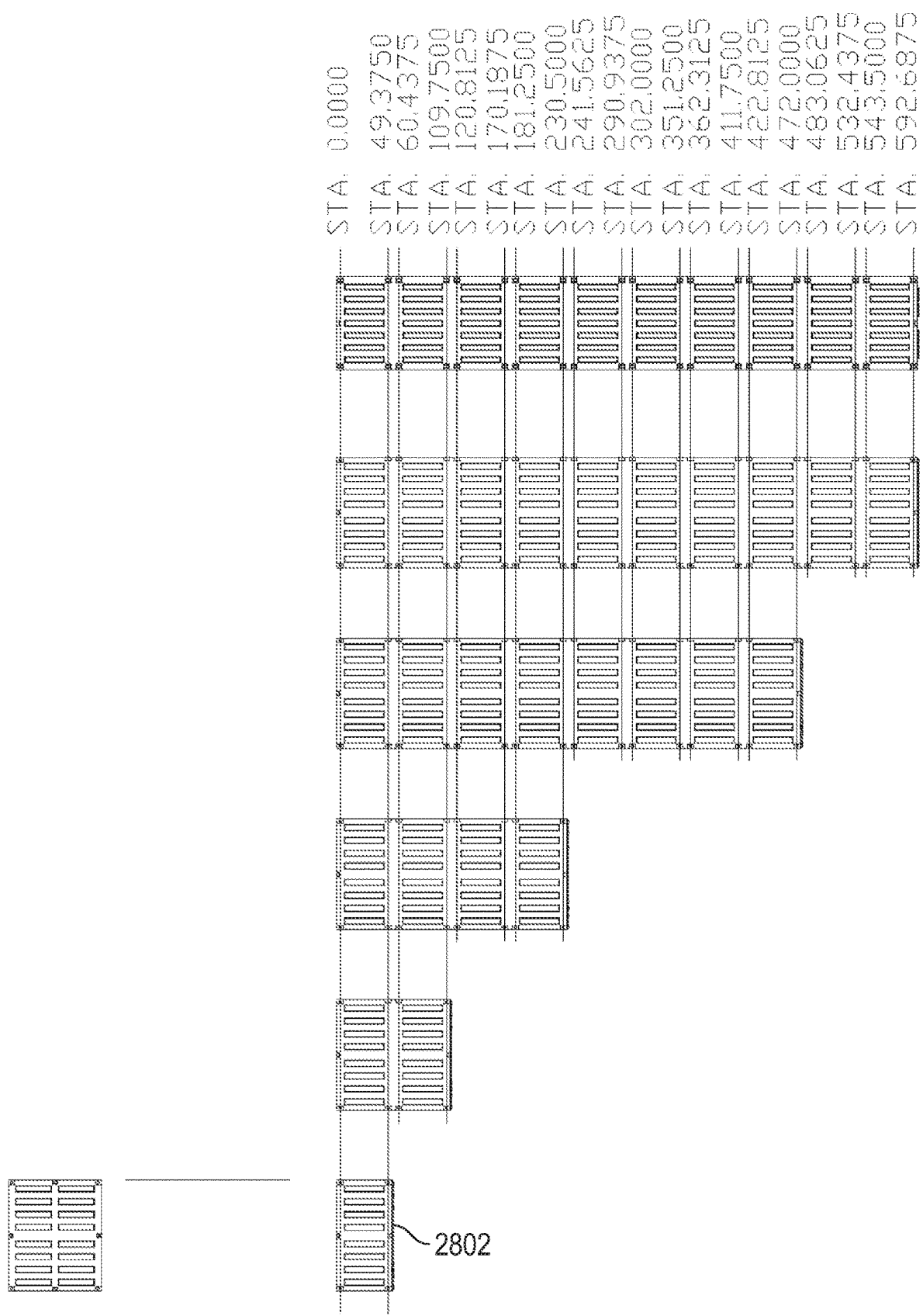
FIG. 29 depicts a side plan view of various configurations of a family of containers connected to one another and to a transport vehicle spine, according to an embodiment of the present disclosure.

FIG. 29 depicts a side plan view of various configurations of the family of containers 2800 of FIG. 28 connected to one another and to a transport vehicle spine, according to an embodiment of the present disclosure. The depicted embodiment shows a 50' spine, similar to FIG. 24. However, rather than having only six rows of mounts 10' apart, the 50' spine in FIG. 29 has 20 rows of mounts. Again, this higher density configuration (1) increases redundancy in case of failure of any fitting, and (2) allows for a single 5' container 2802 to be connected on both front and back ends to the spine or to other containers, among other related advantages.

Figure 30:
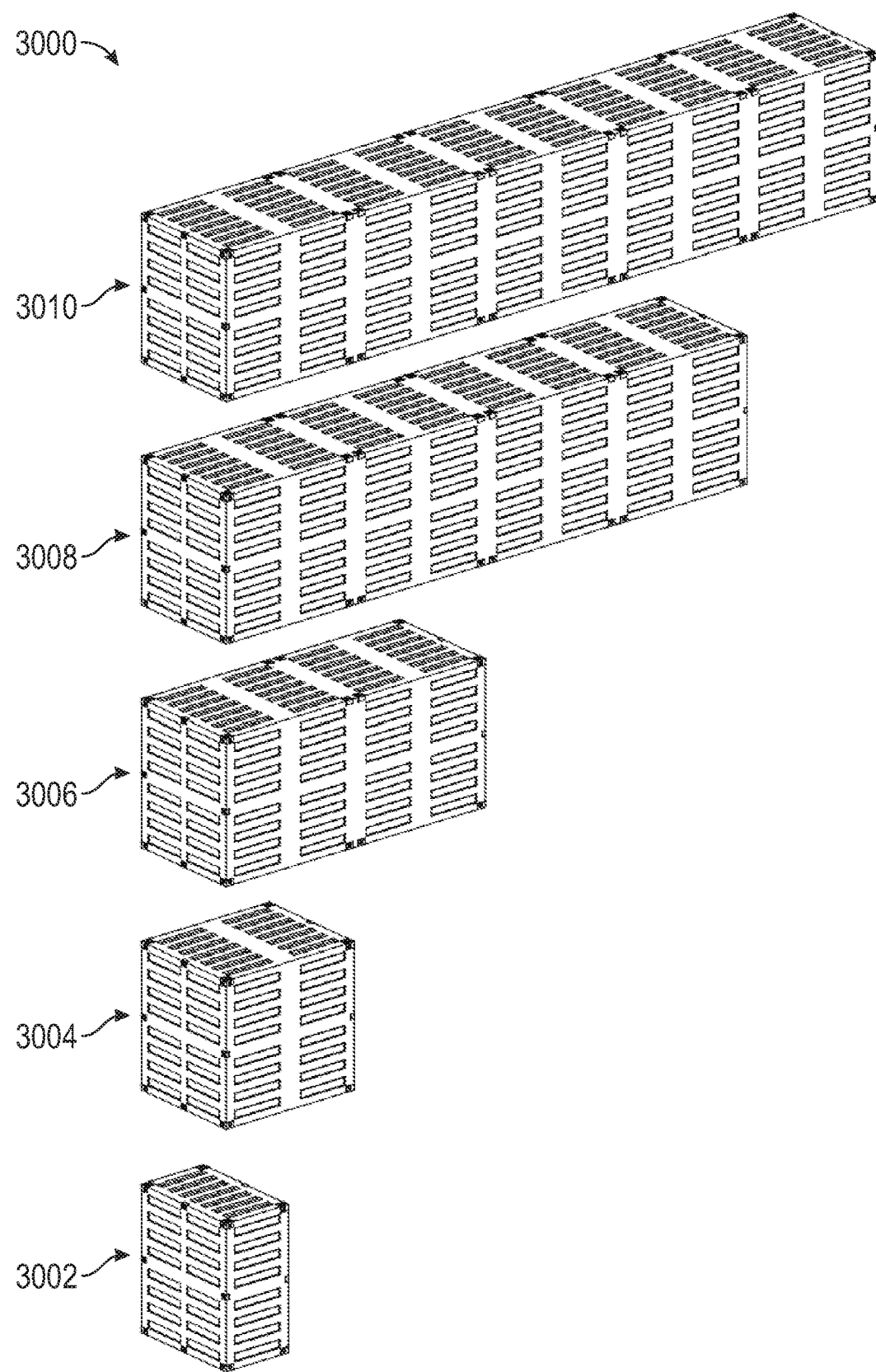
FIG. 30 depicts perspective views of a family of cargo containers, according to an embodiment of the present disclosure

FIG. 30 provides perspective views of a family of cargo containers 3000, according to an embodiment of the present disclosure. The family of cargo containers 3000 includes a 5' container 3002, a 10' container 3004, a 20' container 3006, a 40' container 3008, and a 50' container 3010. It can be seen that the family of cargo containers 3000 are substantially similar to the family of cargo containers 800 of FIG. 8 and the family of cargo containers 2800 of FIG. 28, but the cargo containers 3000 have a greater density of fittings than the cargo containers 800, and a lower density of fittings than the cargo containers 2800.

Figure 31:
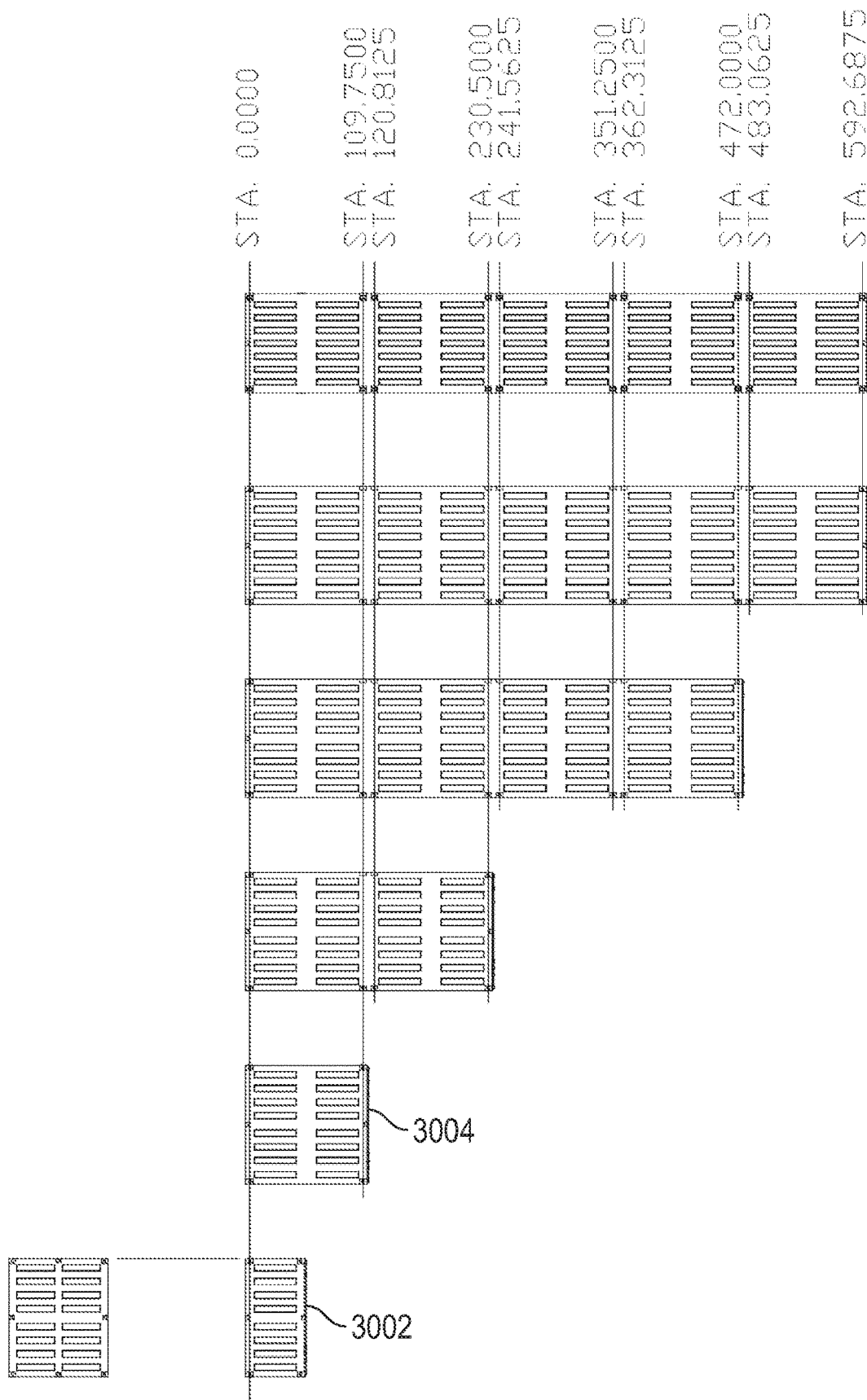
FIG. 31 depicts a side plan view of various configurations of a family of containers connected to one another and to a transport vehicle spine, according to an embodiment of the present disclosure.

FIG. 31 depicts a side plan view of various configurations of the family of containers 3000 of FIG. 30 connected to one another and to a transport vehicle spine, according to an embodiment of the present disclosure. Once again, the depicted embodiment shows a 50' spine, similar to FIGS. 24 and 28. However, rather than having only six rows of mounts 10' apart such as FIG. 24, or 20 rows of mounts such as FIG. 28, the embodiment shown in FIG. 31 has 10 rows of mounts. Similar to the embodiment shown in FIG. 24, this embodiment still requires two 5' containers 3002 to be connected together to form the equivalent of a 10' container, but increases redundancy compared to that equivalent. This, for example, increases redundancy in case of failure of any fitting.

Figure 32:
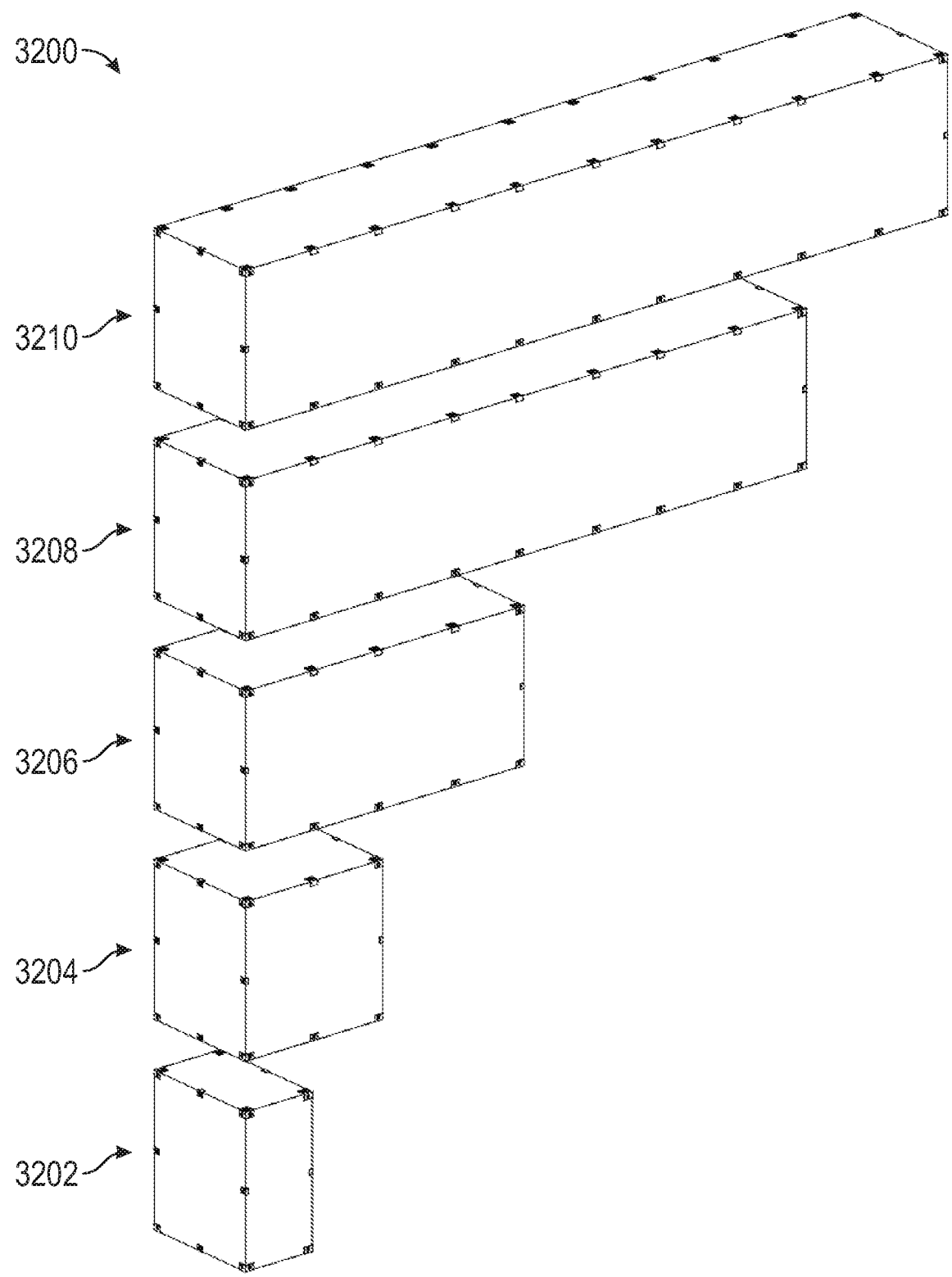
FIG. 32 depicts perspective views of a family of cargo containers, according to an embodiment of the present disclosure
Figure 33:
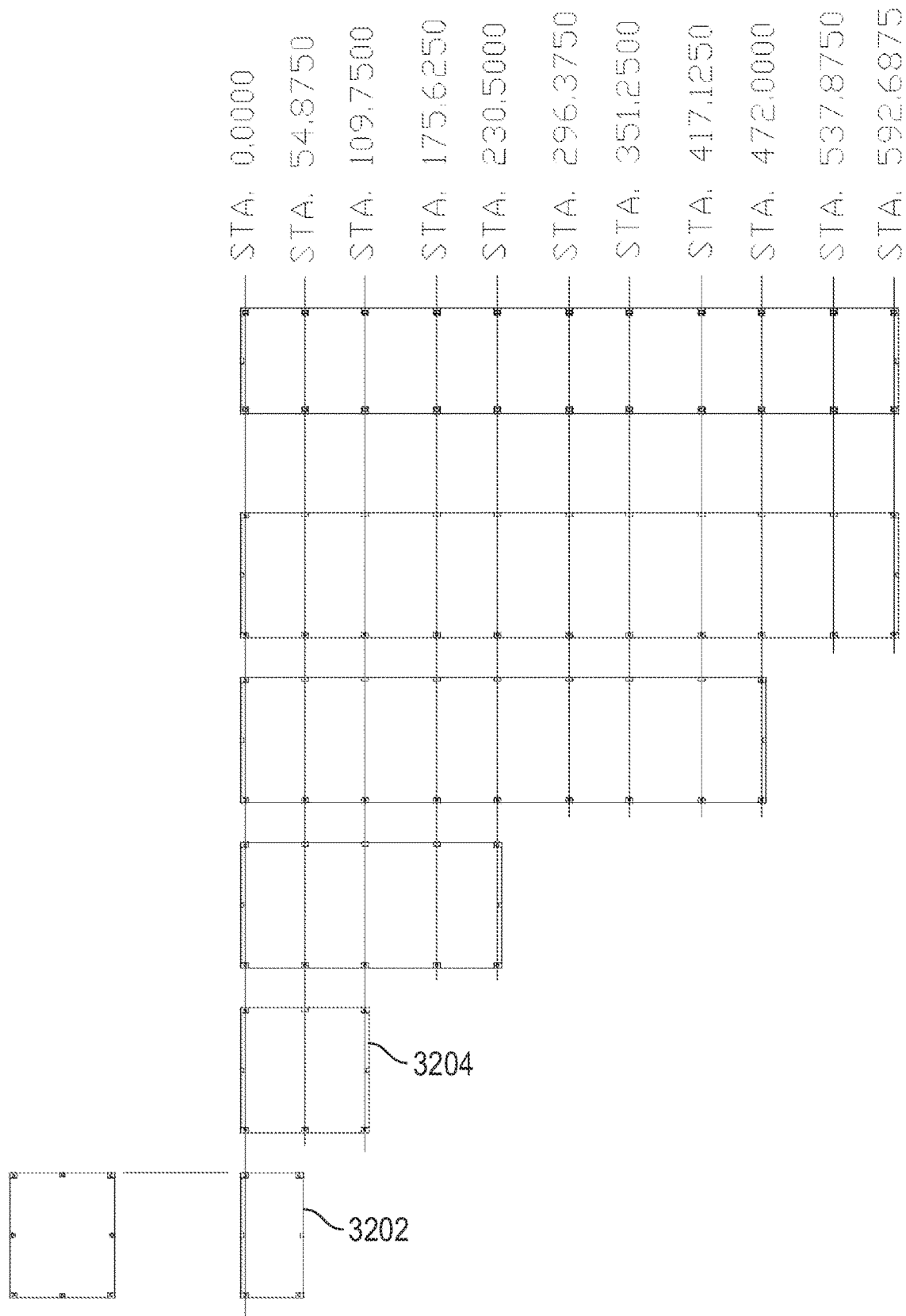
FIG. 33 depicts a side plan view of various configurations of a family of containers connected to one another and to a transport vehicle spine, according to an embodiment of the present disclosure.

FIGS. 32 and 33 illustrate another family of containers 3200 and corresponding fitting locations for a 50' spine to facilitate the family of containers 3202, according to an embodiment of the present disclosure.

Now that it has been demonstrated how cargo containers can be connected together, various example scenarios are presented in which containers with some walls removed can be connected together to provide a larger payload area, e.g., two containers wide and two containers tall. Different length containers can be created by attaching different types to containers, such as a 40' long container and a 20' long container to make a 60' long combined container. In certain embodiments, containers may have additional connections between them and bracing in their structure to account for missing/removed walls.

Figure 34A:
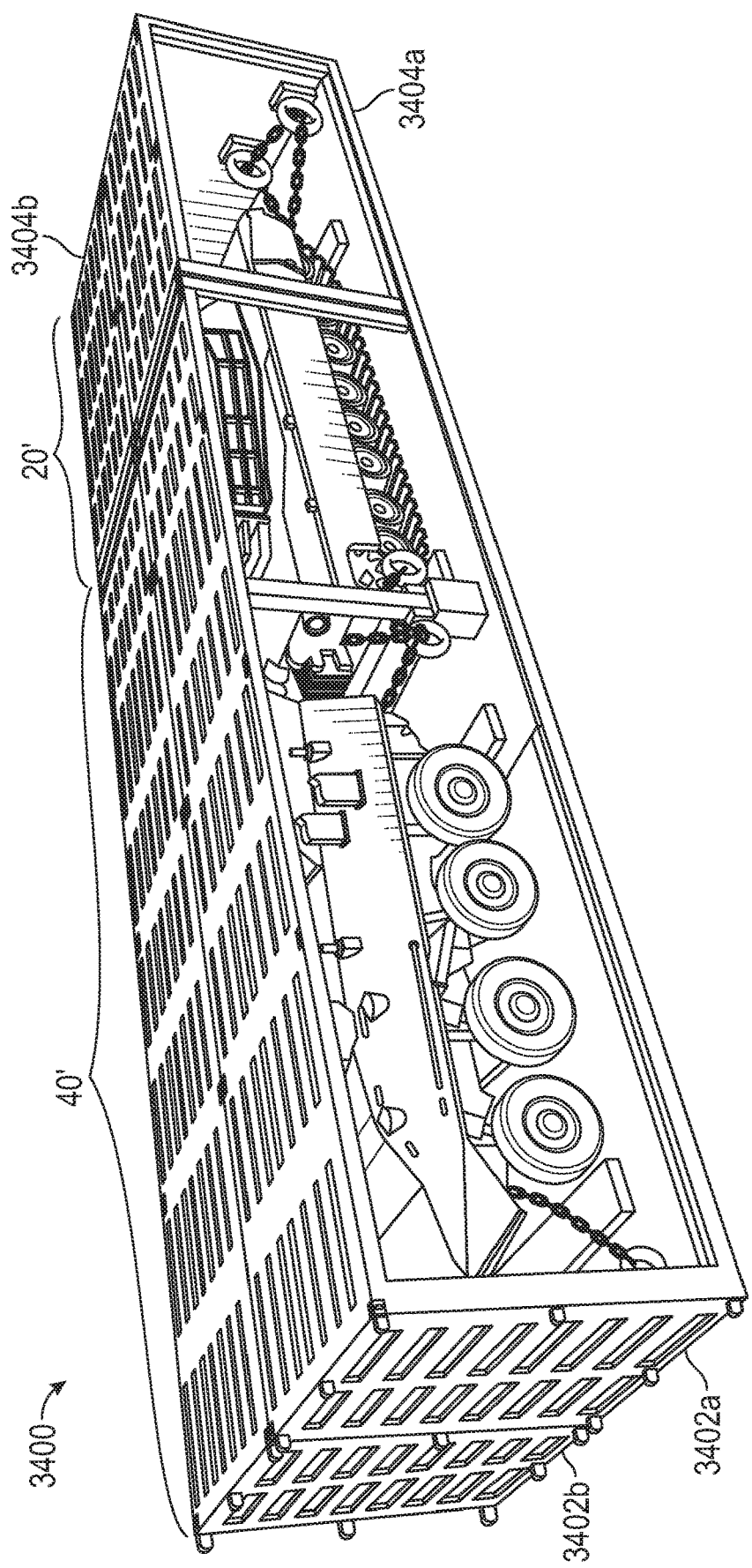
FIGS. 34A and 34B depict perspective views of an example scenario in which a container assembly houses oversized cargo with one set of sidewalls removed to allow a clearer view of the cargo, according to an embodiment of the present disclosure.
Figure 34B:
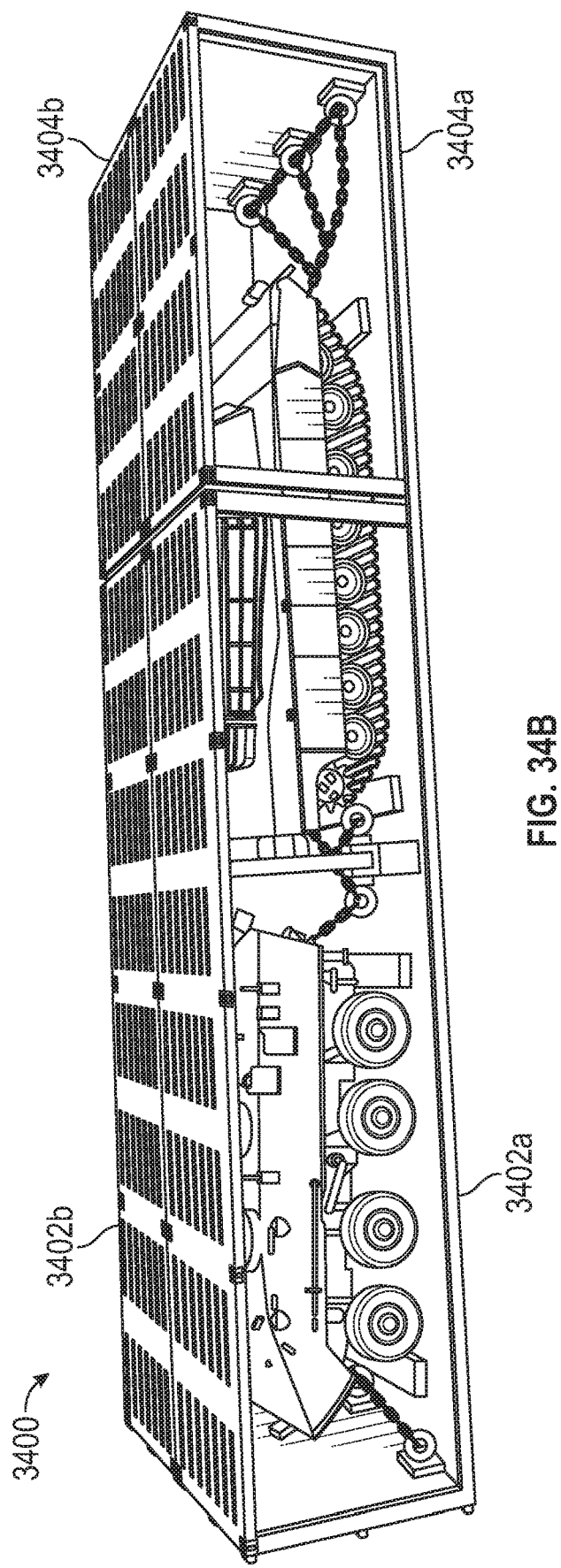

FIGS. 34A and 34B depict an example scenario including a specially constructed container assembly 3400, in accordance with an embodiment of the present disclosure. The container assembly 3400 has been constructed by combining two 40' containers 3402a-b and two 20' containers 3404a-b. Each container 3402a-b, 3404a-b is 9'6" high and 8' wide. All of the interior walls have been removed in order to create an interior cavity measuring 60'×16'×9'6". One set of exterior walls have been removed in the figures in order to depict the contents of the container assembly 3400. In this case, an M1A1 Abram tank and a USMC LAV-R system are shown loaded and ready to transport.

Figure 35A:
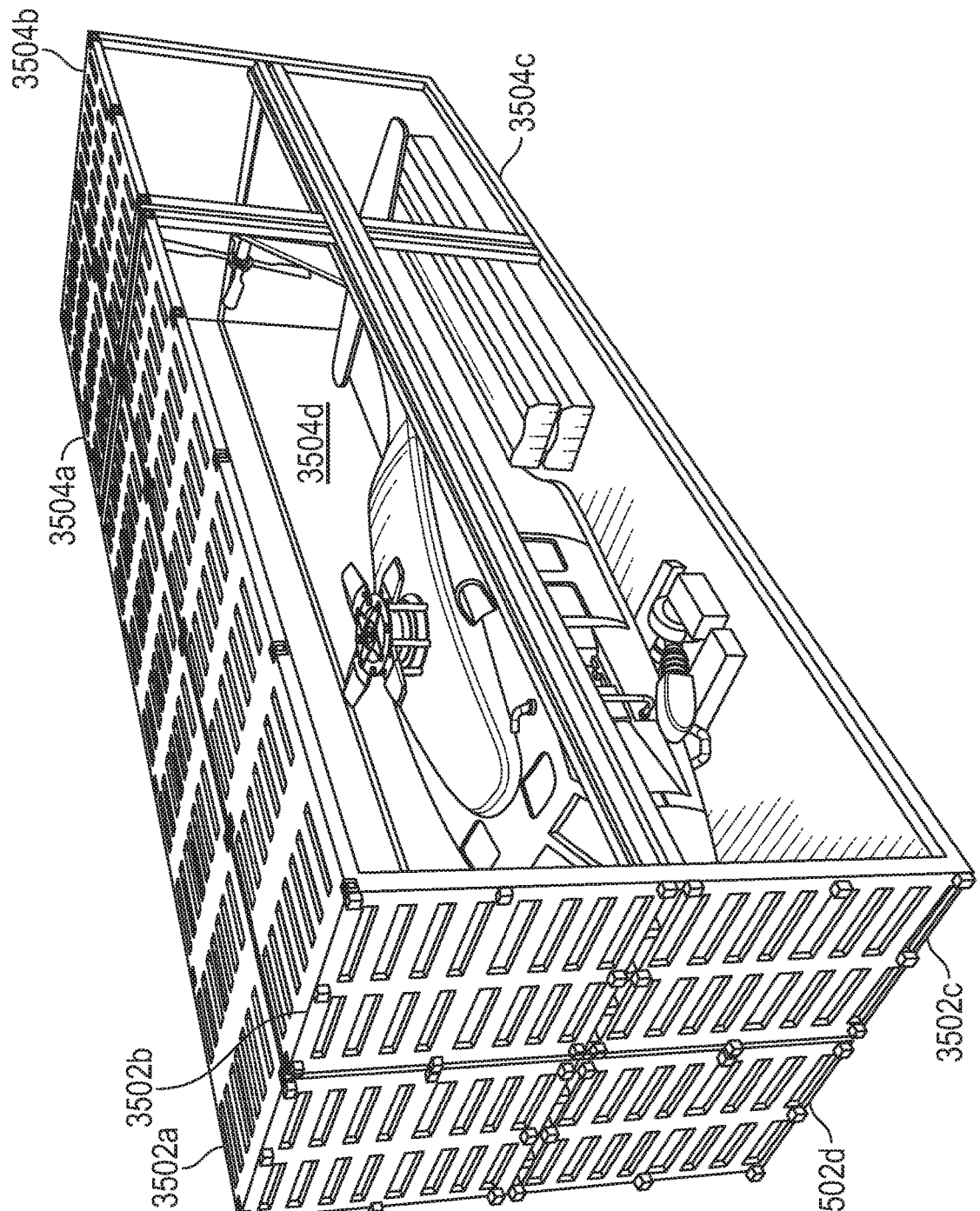
FIGS. 35A and 35B depict perspective views of an example scenario in which a container assembly houses oversized cargo with one set of sidewalls removed to allow a clearer view of the cargo, according to an embodiment of the present disclosure.
Figure 35B:
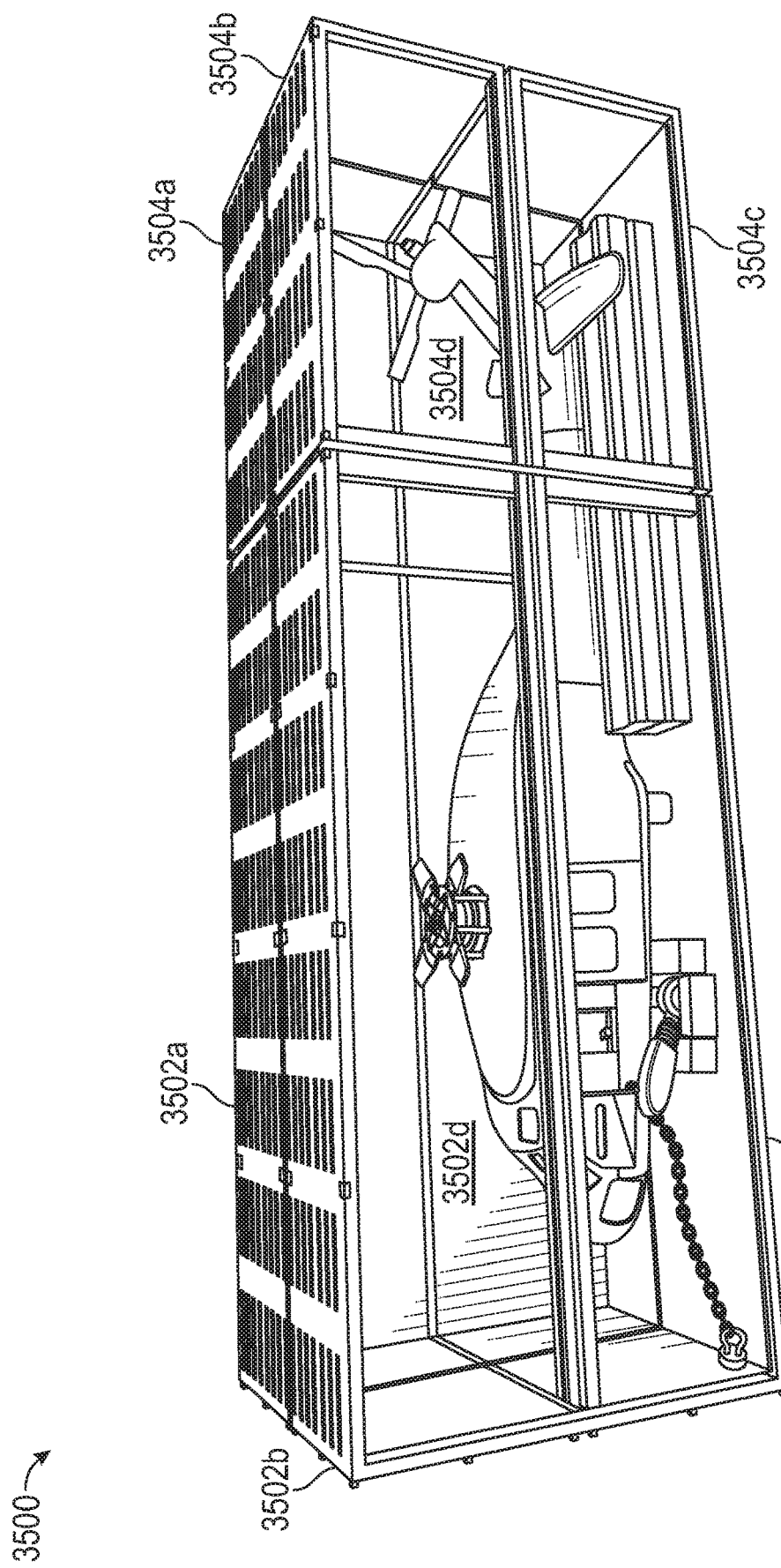

FIGS. 35A and 35B depict an example scenario including a specially constructed container assembly 3500, in accordance with an embodiment of the present disclosure. The container assembly 3500 includes four 40' containers 3502a-d and four 20' containers 3504 a-d joined together. The container assembly 3500 is equivalent to two of the container assemblies 3400 of FIGS. 34A-34B stacked on top of one another to create a double high, double wide, 60' long container. Once again, all interior walls have been removed in order to create an interior cavity measuring 60'×16'×19'. One set of exterior walls have been removed in the figures in order to more clearly depict the contents of the container assembly 3500. The container assembly 3500 is holding a UH-60 Blackhawk helicopter, again demonstrating the flexibility of this system compared to today's existing aircraft technology.

Figure 36A:
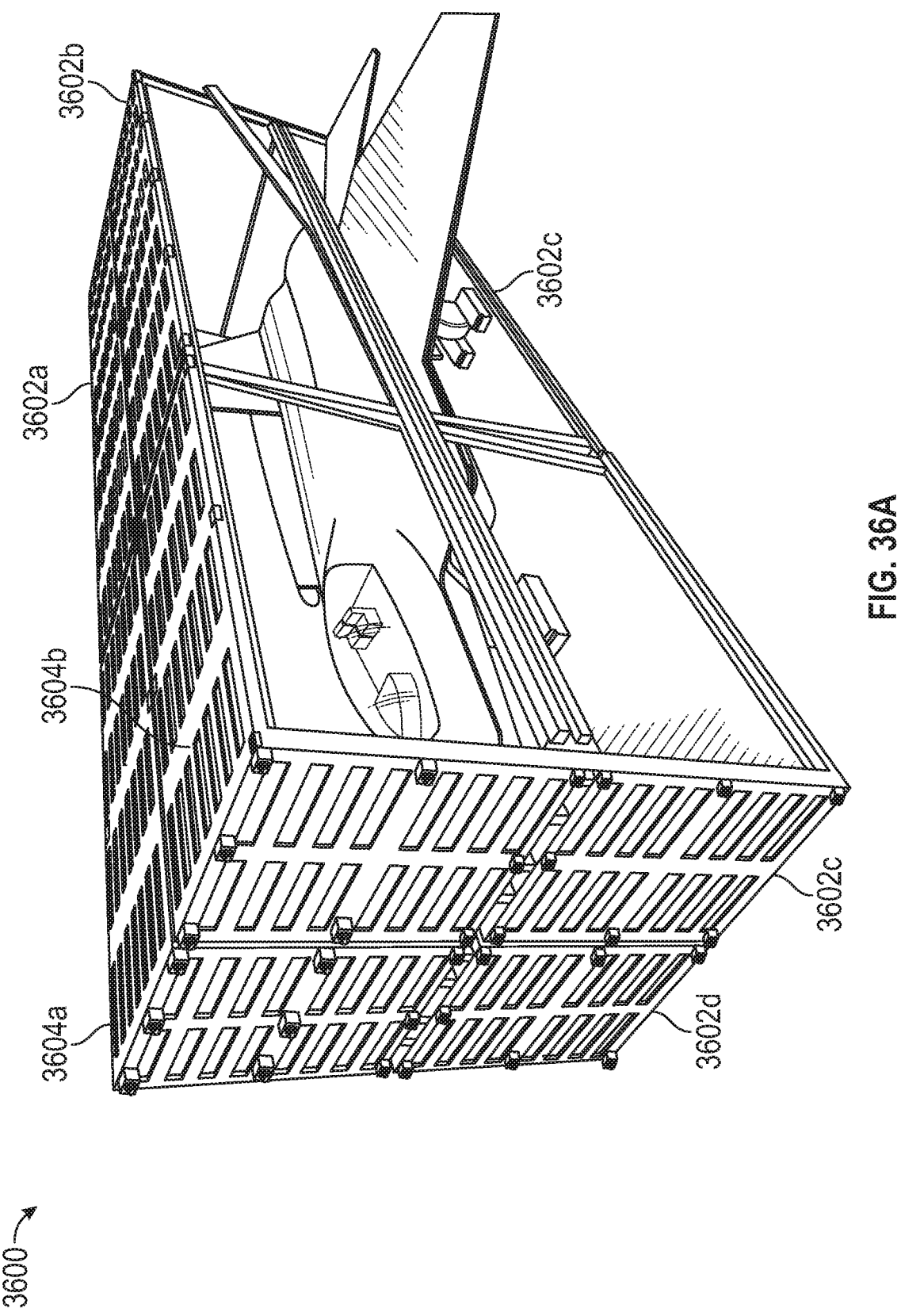
FIGS. 36A and 36B depict perspective views of an example scenario in which a container assembly houses oversized cargo with one set of sidewalls removed to allow a clearer view of the cargo, according to an embodiment of the present disclosure.
Figure 36B:
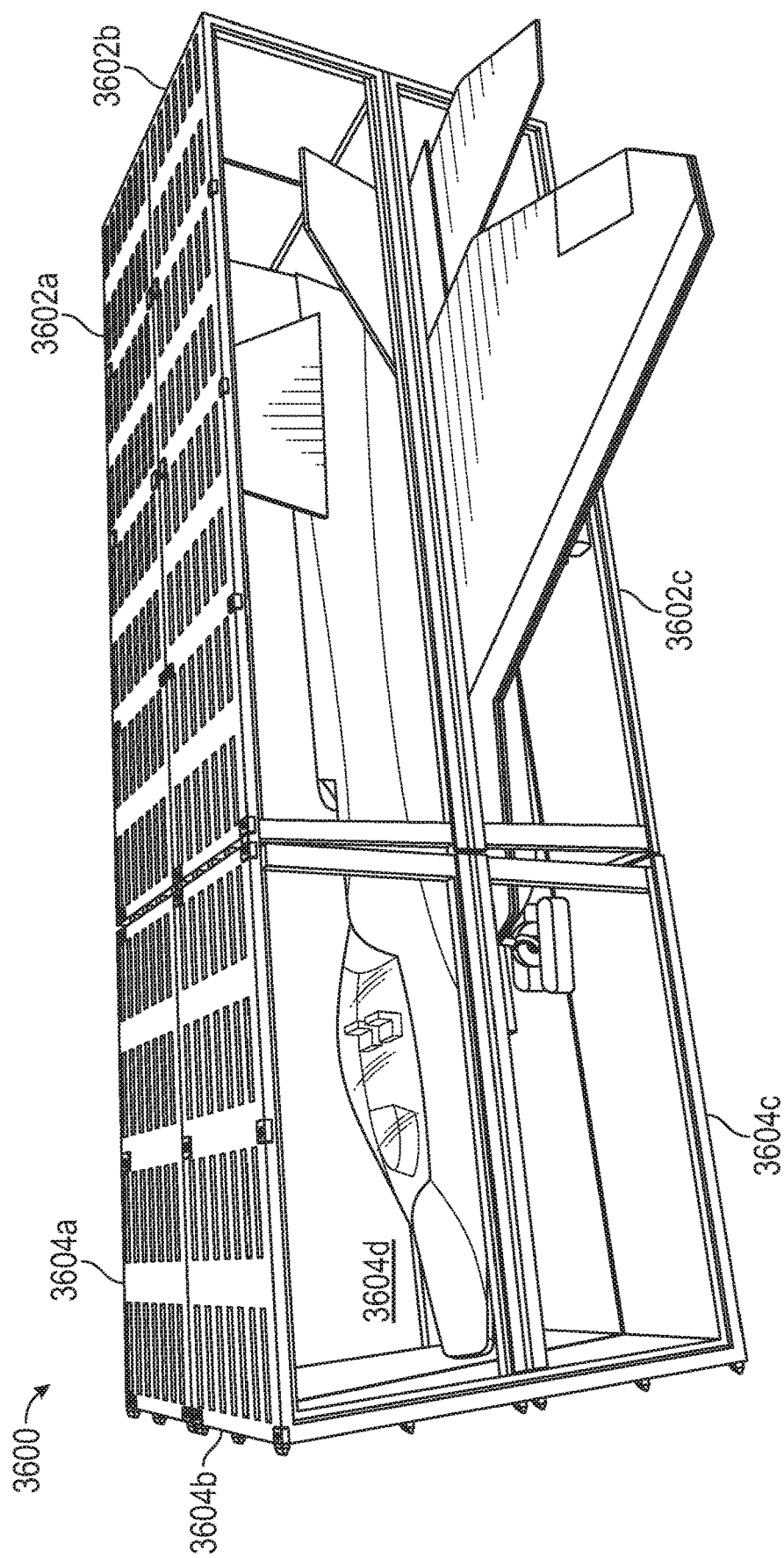

FIGS. 36A and 36B depict an example scenario including a specially constructed container assembly 3600, in accordance with an embodiment of the present disclosure. The container assembly 3600 includes four 40' containers 3602a-d and four 20' containers 3604 a-d joined together. The container assembly 3600 is equivalent to the container assembly 3500 of FIGS. 35A-35B. Once again, all interior walls have been removed in order to create an interior cavity measuring 60'×16'×19'. The container assembly 3600 is housing an F-22 Jet fighter to demonstrate an oversized payload with wings extending outside the container assembly 3600. Any oversized load can be accommodated as long as the parts that extend outside the fuselage do not interfere with transport (e.g., do not interfere with landing gear structure on a transport aircraft). In certain embodiments, any protruding portion of the payload that extends outside of the container can be covered by an aerodynamic fairing or other covering. For example, in the case of the F-22 fighter shown in FIGS. 36A AND 36B, a fairing may act not only to provide some cover and protection to the payload, but also to prevent any lift added by the protruding wing.

In various embodiments, spines can be made for fixed wing systems, rotary wing systems, and multi-rotor systems. In various embodiments, spines can also be made for non-aircraft transport, such as ships, trucks, and/or trains. Containers can even be developed to become drone mother ships, or specialized truck bodies, or any other requirement.

As the disclosed containers are standardized to existing intermodal infrastructures, full logistics capabilities are available. Products can ship via any mode of transportation (including ground, sea, and air) including switching en route between any of the modes, essentially, finding the cheapest cost and fastest delivery via all combinations of available intermodal capacities.

For civilian markets, the presently disclosed technology opens up the ability to go point to point instead of hub and spoke by allowing the use of cross-docking technology instead of requiring gigantic sorting and fulfillment centers. Whereas today, a letter shipped from Los Angeles to Seattle may have to travel to a sorting facility in Memphis, the presently disclosed technology would allow multiple transfers if necessary between different modes of transportation without requiring the need to visit a sorting facility. In addition, training of personnel with containers is greatly reduced and as automation continues to expand, automated filling and emptying of standard containers would be significantly improved compared to conventional approaches.

Various embodiments of the present disclosure also provide for the ability to have electrical and data communication connections between the various spine systems and container systems to expand the functionality of modular containers. For example, using the power and/or data connections on a container and/or a spine, the container could become a radar system of an aircraft, and a separate container could become an air to air weapon system of the aircraft, or a container could be heated, cooled, or pressurized, etc. Thus, different containers within a single container assembly and/or attached to the same spine assembly can have different environmental conditions on the same aircraft.

In certain embodiments, spines configured to connect to one or more containers may be configured with the ability to connect to individual containers via one or more power and/or data probes. In the figures discussed below, an example of a single wide spine design is demonstrated with the addition of separate power and data connection systems. In this case, the power and data probes/connections from the spine can extend into one or more connected containers as needed. Thus, containers that do not need any power or data connections do not need to have their associated probes extended from the spine. Some containers may need just a data connection while others may need just power connections while others may need both power and data connections. Examples of containers requiring only data connections may include temperature sensors or pressure sensors or similar sensors that a customer has requested records on during a particular flight segment. A container that may require only a power connection may be a specialized unit for which a company owning the container has specified no other requirements. In certain embodiments, spines can be configured to house fuel, electrical equipment, controls, and data distribution systems, among others.

Figure 37:
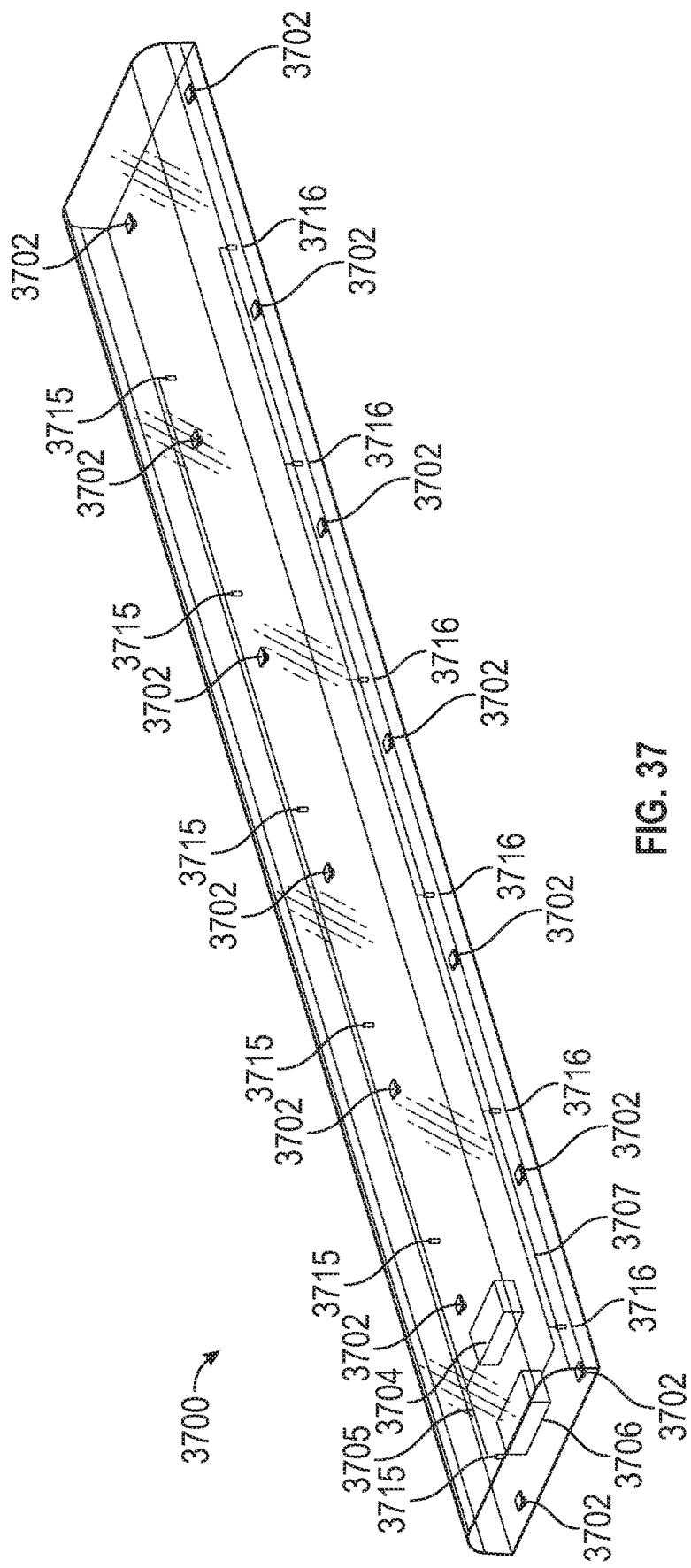
FIG. 37 depicts a perspective view of an example single container wide spine assembly, according to an embodiment of the present disclosure.

FIG. 37 depicts a spine 3700, according to an embodiment of the present disclosure. The spine 3700 is similar to that shown in FIG. 25, essentially a one container wide spine that is 60' feet long with seven rows of mounts spaced approximately 10' apart. The spine 3700 includes seven rows of mounts, with each row comprising a pair of mounts 3702. Each mount 3702 is configured to be inserted into a corresponding fitting on a top surface of a container, and then rotate into a locked position to secure the container to the spine 3700. In certain embodiments, each mount 3702 can be rotated between a locked position and an unlocked position via electronic controls installed in the spine 3700 to secure and release containers.

The spine 3700 includes a data distribution system 3704, a plurality of data probes 3715, and a data transmission line 3705 for transmitting instructions between the data distribution system 3704 and the plurality of data probes 3715. The spine 3700 also includes a power distribution system 3706, a plurality of power probes 3716, and a power transmission line 3707 for transmitting power between the power distribution system 3706 and the plurality of power probes 3716. In certain embodiments, each data probe 3715 and power probe 3716 can be retractable and/or extendable so that only a selected subset of containers are connected to the data and/or power distribution systems 3704, 3706. Data and power distribution systems in the spine may be implemented using wire, fiber optics, or even integrated in the materials of the spine or any other media that can provide the function of the power and or data distribution systems. In various embodiments, a spine can have a number of power probes and a number of data probes equal to a maximum number of containers that can be connected to the spine. For example, the spine 3700 has seven rows of mounts, and can connect to a maximum of six containers. As such, the spine 3700 has six data probes 3715 and six power probes 3716.

In certain embodiments, once a container assembly is mated to the spine, data can either be entered, transmitted, and/or programmed into an aircraft's flight or mission parameters and the spine can extend the necessary probes into the containers of the container assembly. Automated checks can be performed to assure proper connections have occurred and that systems are functional.

Figure 38:
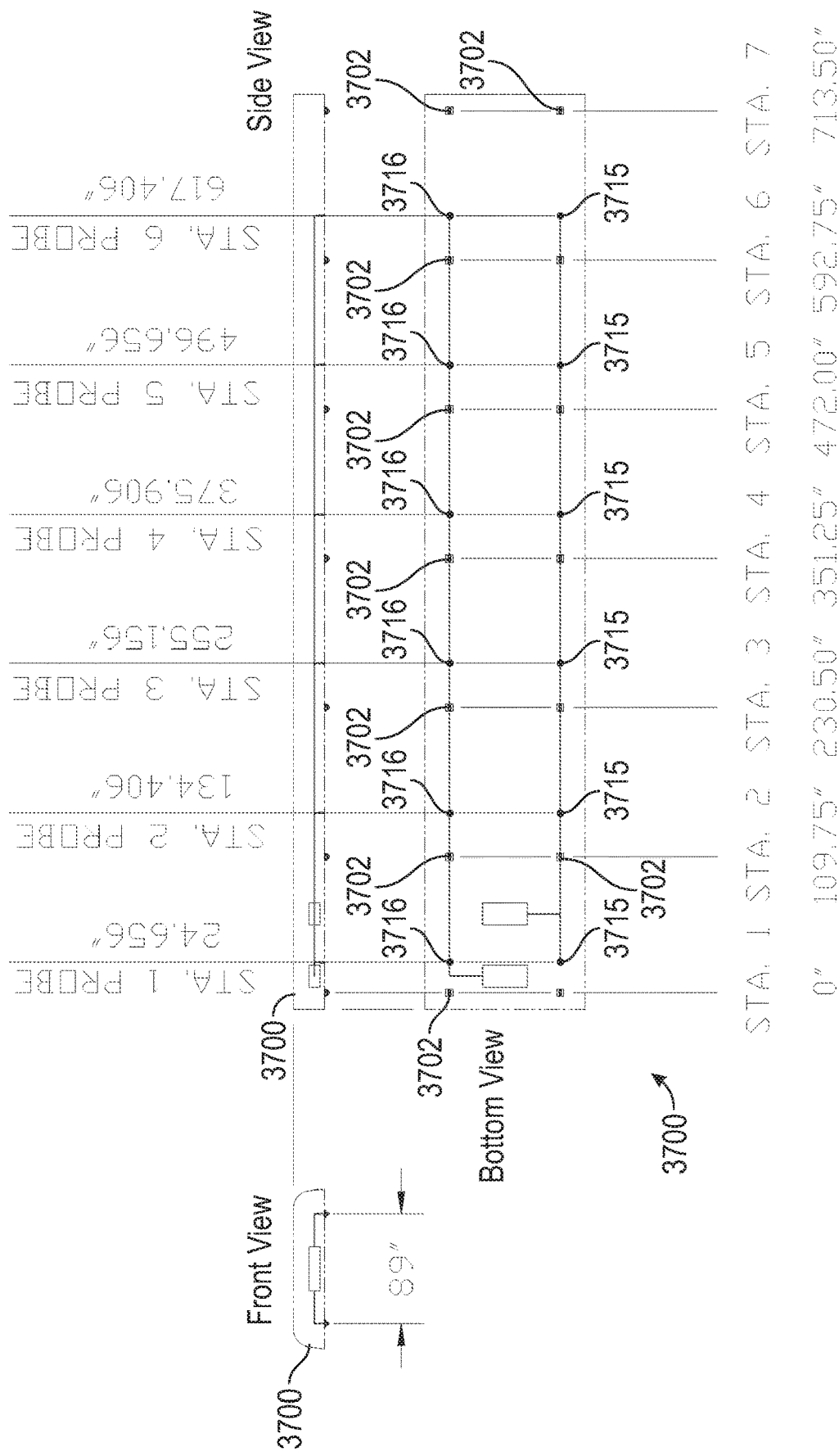
FIG. 38 depicts front, side, and bottom profile views of the spine assembly of FIG. 37, according to an embodiment of the present disclosure.

FIG. 38 provides front, side, and bottom profile views of the spine 3700, according to an embodiment of the present disclosure. FIG. 38 more clearly depicts the positions of the mounts 3702, the data probes 3715, and the power probes 3716. In this example embodiment, the data network runs on one side of the spine 3700 and the power network runs on the opposite side.

Figure 39:
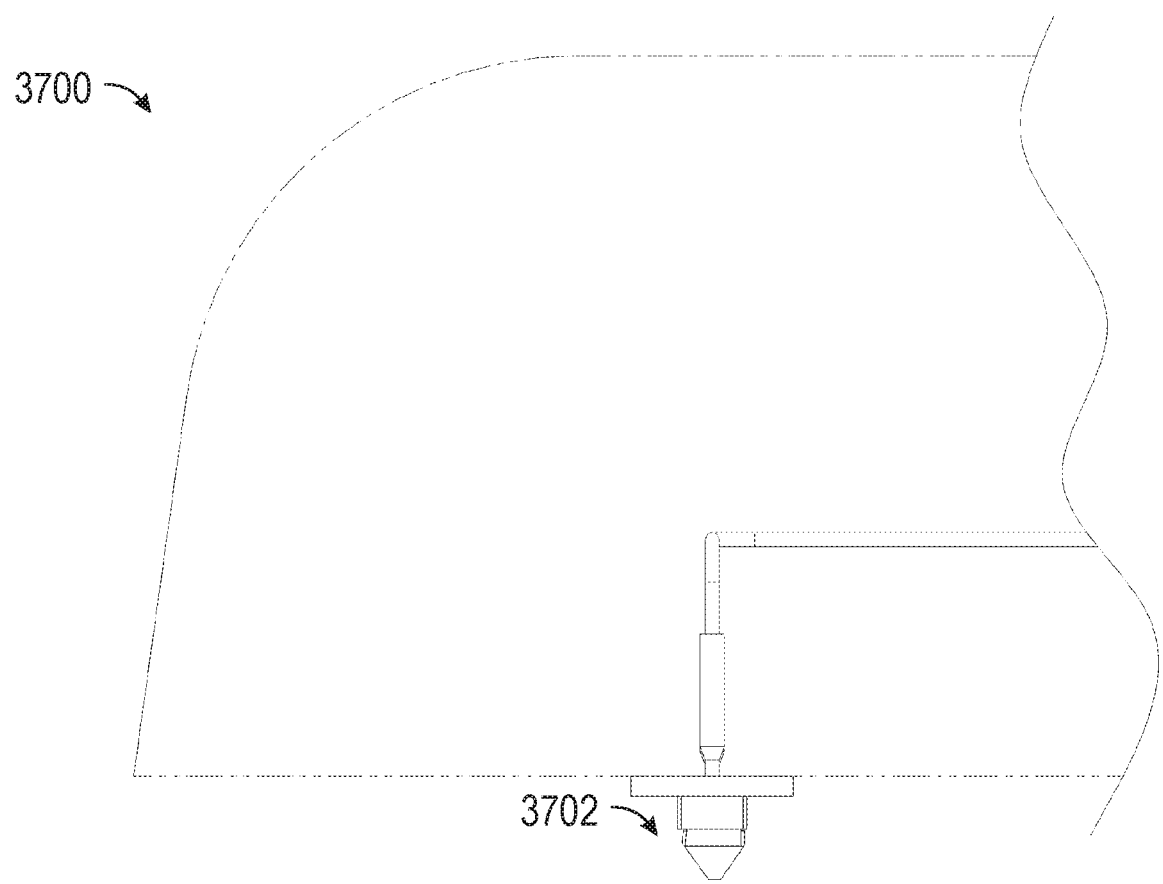
FIG. 39 depicts a close-up view of a data transmission and/or power probe of the spine assembly of FIG. 37, according to an embodiment of the present disclosure.

FIG. 39 demonstrates how the probes, both power and data, can extend below and retract above the spine-container mating surface, according to an embodiment of the present disclosure. In certain embodiments, the probes can also be in-line with the fitting connectors on the spine 3700 so that the probes match corresponding receptacles on attached containers. In other embodiments, the probes can extend and connect on the side of the containers to avoid having upper surfaces that may have a tendency to collect foreign object matter.

In various embodiments, each container in a container assembly can connect to at least one other container in the container assembly via data and/or electronic probes. Containers in a container assembly may also be daisy chained with one another such that data and/or power can be transmitted from one container to another, and containers can communicate with one another. Furthermore, in addition to direct connections between containers, containers may be connected through the spine, such that damage to any container or container connections can be circumvented by transmitting power or data through the spine. For example, in scenarios in which there is in-flight damage, data and power connections can be re-routed between container-to-container and/or container-to-spine.

Figure 40:
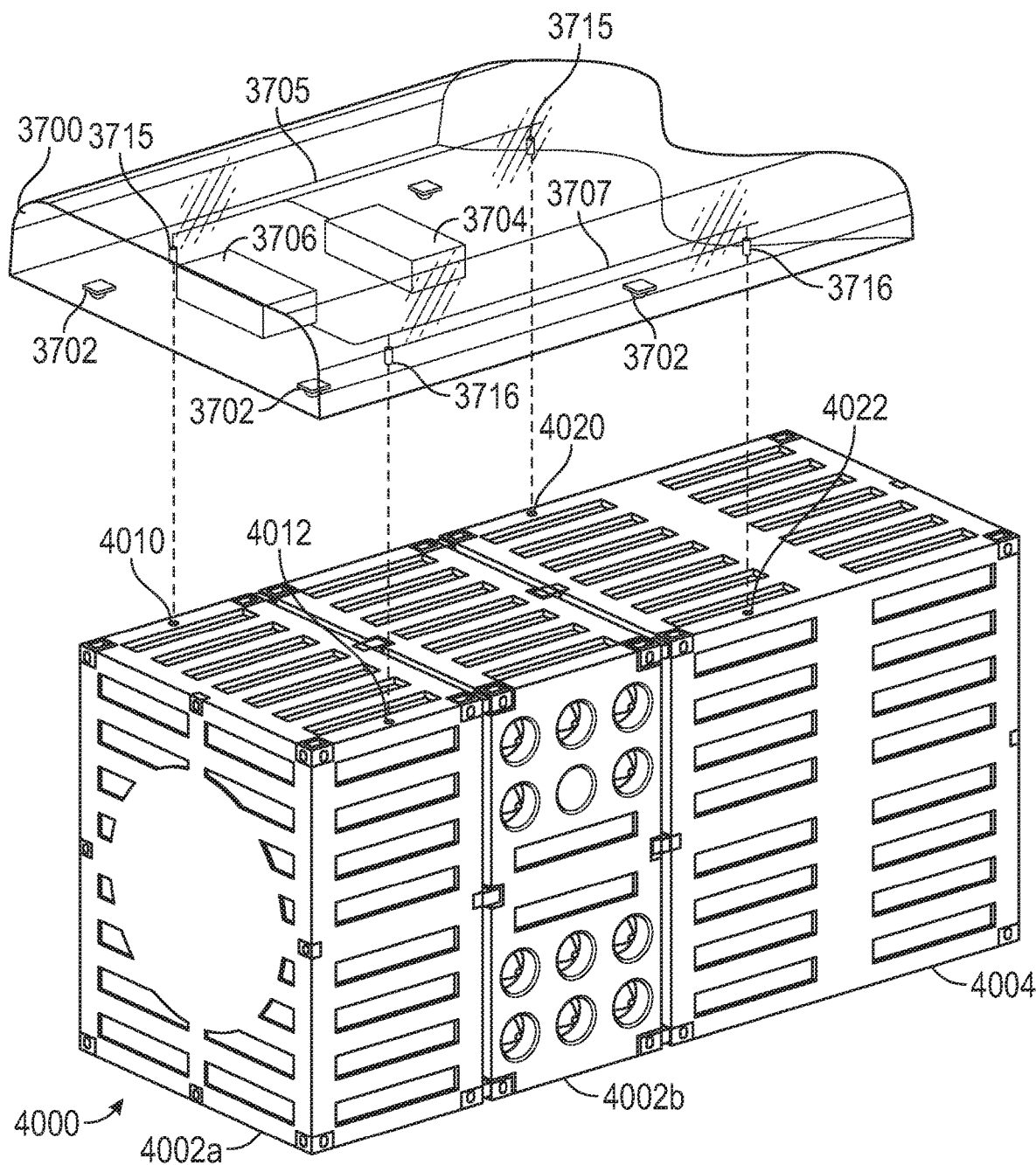
FIG. 40 depicts a perspective view of an example scenario in which a single container wide spine assembly is being connected to a container assembly, according to an embodiment of the present disclosure.

FIG. 40 depicts an example scenario in which the spine 3700 is being connected to a container assembly 4000, according to an embodiment of the present disclosure. The container assembly 4000 includes a first 5' container 4002a, a second 5' container 4002b, and a 10' container 4004. A first data probe 3715 of the spine 3700 connects to a data receptacle 4010 on the container 4002a. Similarly, a first power probe 3716 of the spine 3700 connects to a power receptacle 4012 on the container 4002a. A second data probe 3715 of the spine 3700 connects to a data receptacle 4020 on the container 4004. Similarly, a second power probe 3716 of the spine 3700 connects to a power receptacle 4022 on the container 4004. The second 5' container 4002b is not connected to any data or power probe on the spine 3700. In one embodiment, the container 4002b may receive data and/or power via data and/or power connections with the container 4002a.

Figure 41A:
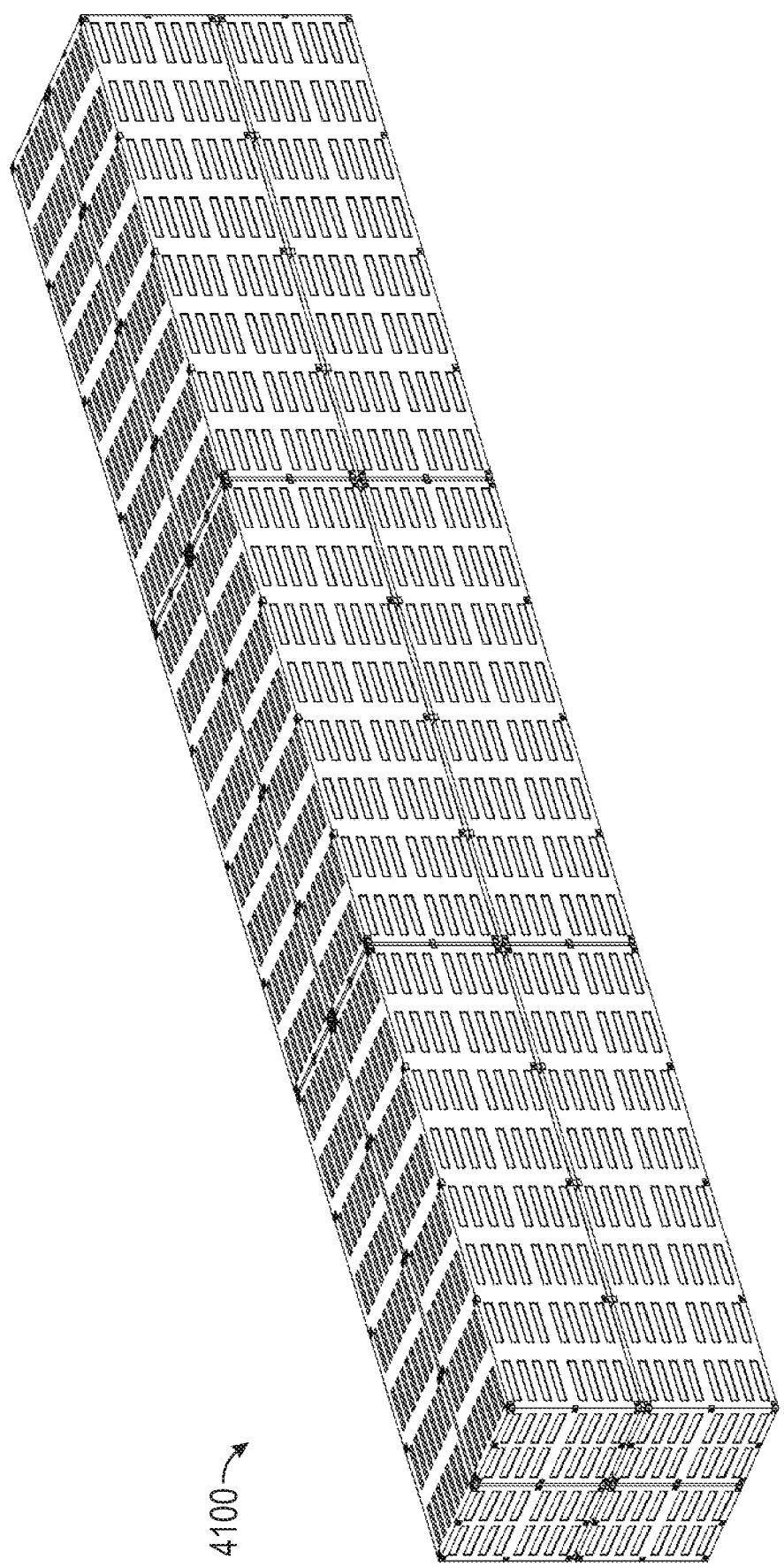
FIGS. 41A and 41B depict perspective, front, side, and rear views of a 12 container assembly mating with a spine assembly, according to an embodiment of the present disclosure.
Figure 41B:
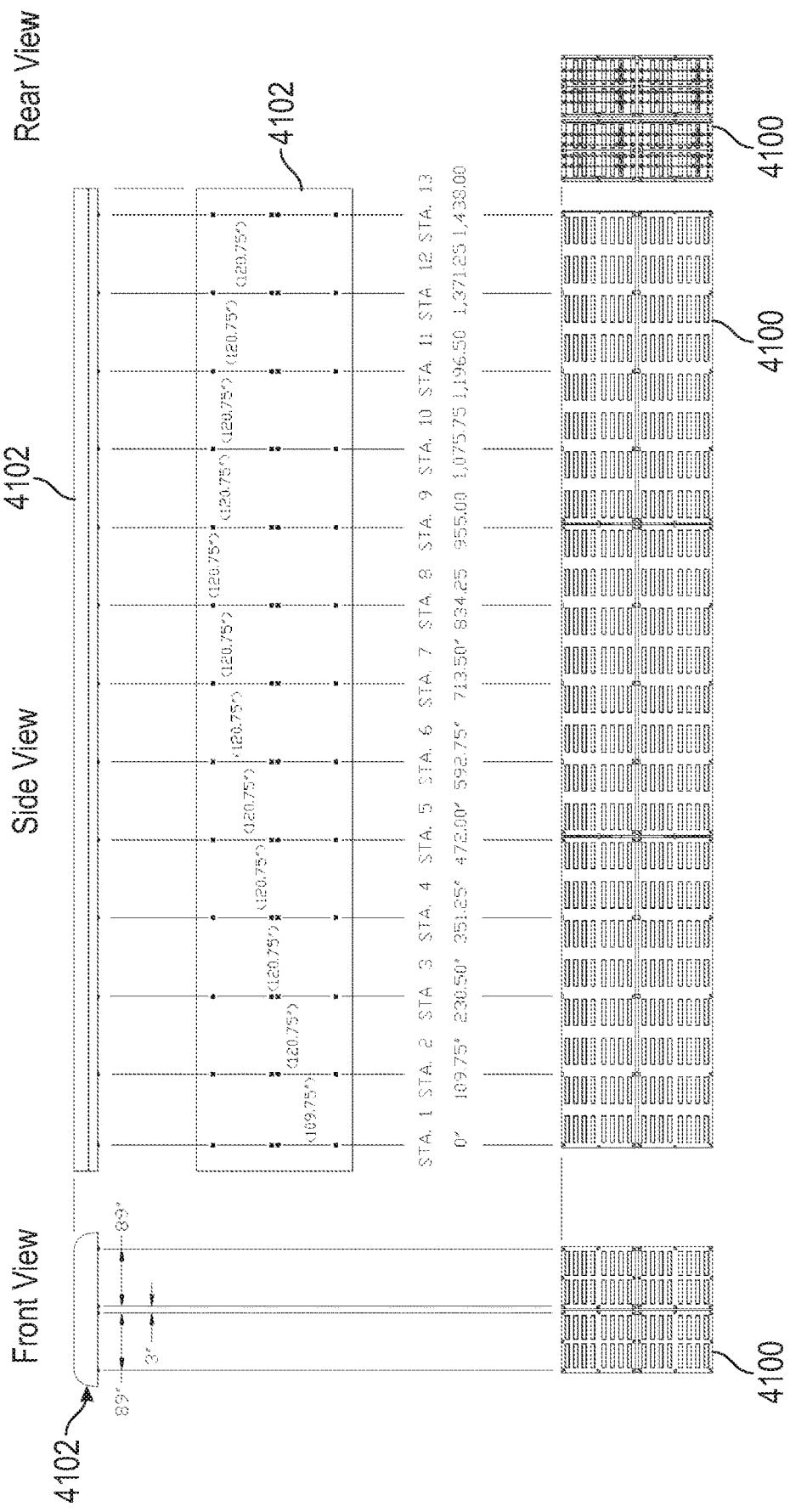

FIGS. 41A and 41B demonstrates how a 12×40' container assembly 4100 mates with a spine assembly 4102, according to an embodiment of the present disclosure. This system could also replicate the data and power connections demonstrated and discussed above. Any containers directly connected to the spine 4102 can receive power and/or data directly from the spine, whereas other containers may receive power and/or data through connections with other containers.

One advantage of the disclosed technology is the ability to allow containers to be connected to different sized spines. The disclosed technology also allows containers to be sent to vendors for modifications instead of sending an entire aircraft. Once a container is customized, it can fit many platforms. For example, a container that has been fitted with a radar and missile platform can now be fitted on any spine systems. The container is no longer simply a container, but the actual weapon system. As long as the container structure can carry the required fittings loads, it can be configured endlessly and be made from an almost unlimited material types.

Figure 42A:
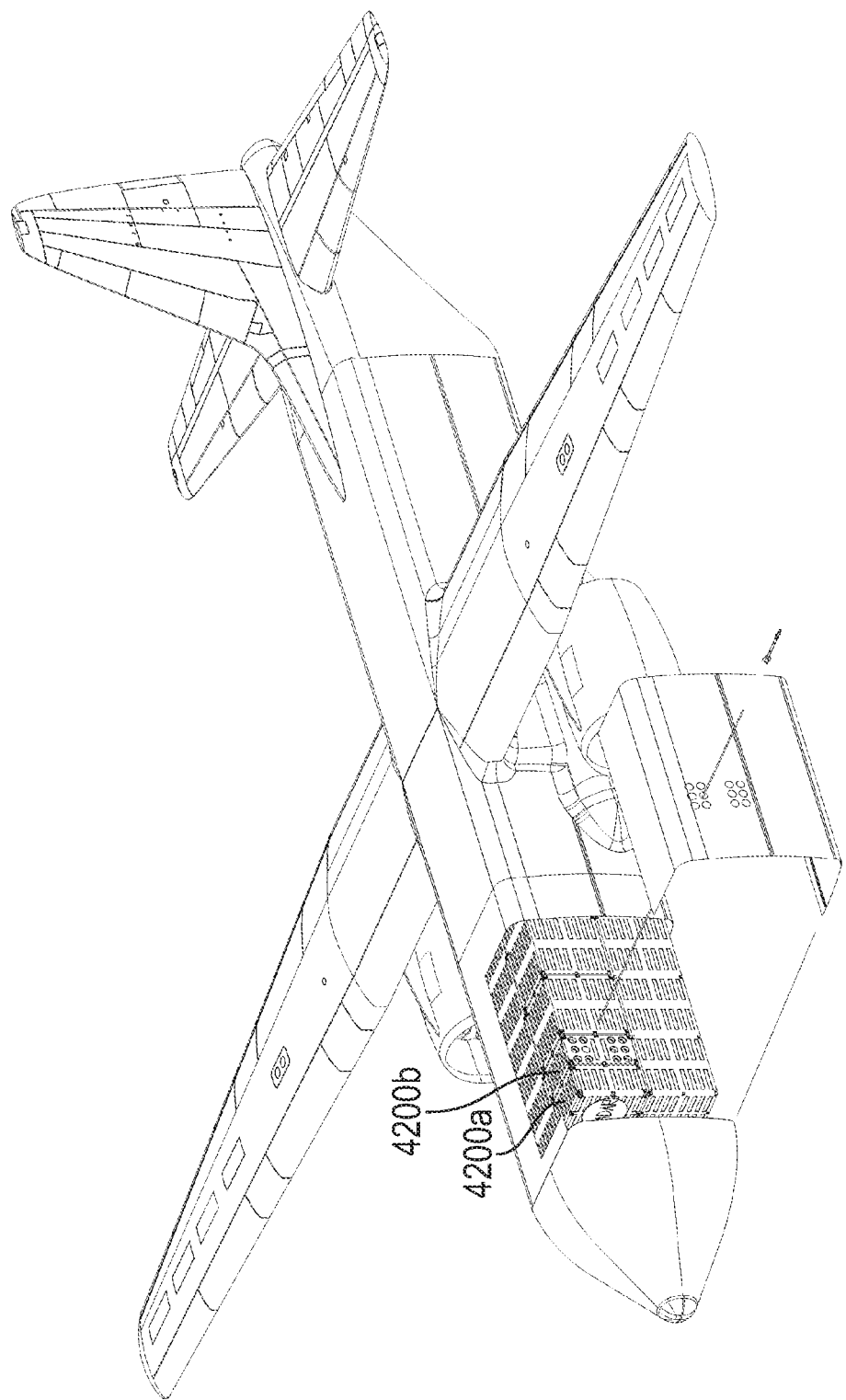
Figure 42B:
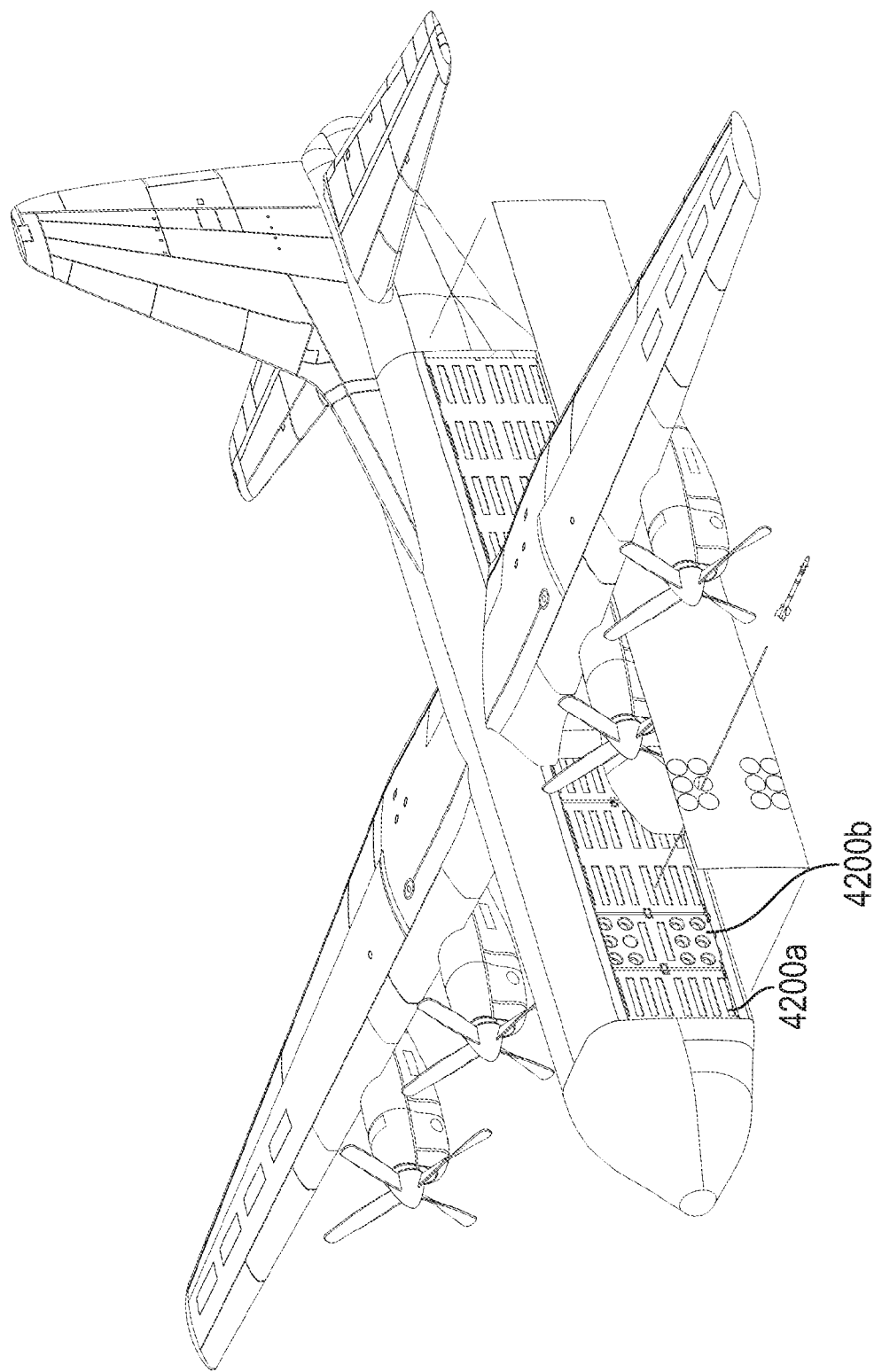
Figure 42D:
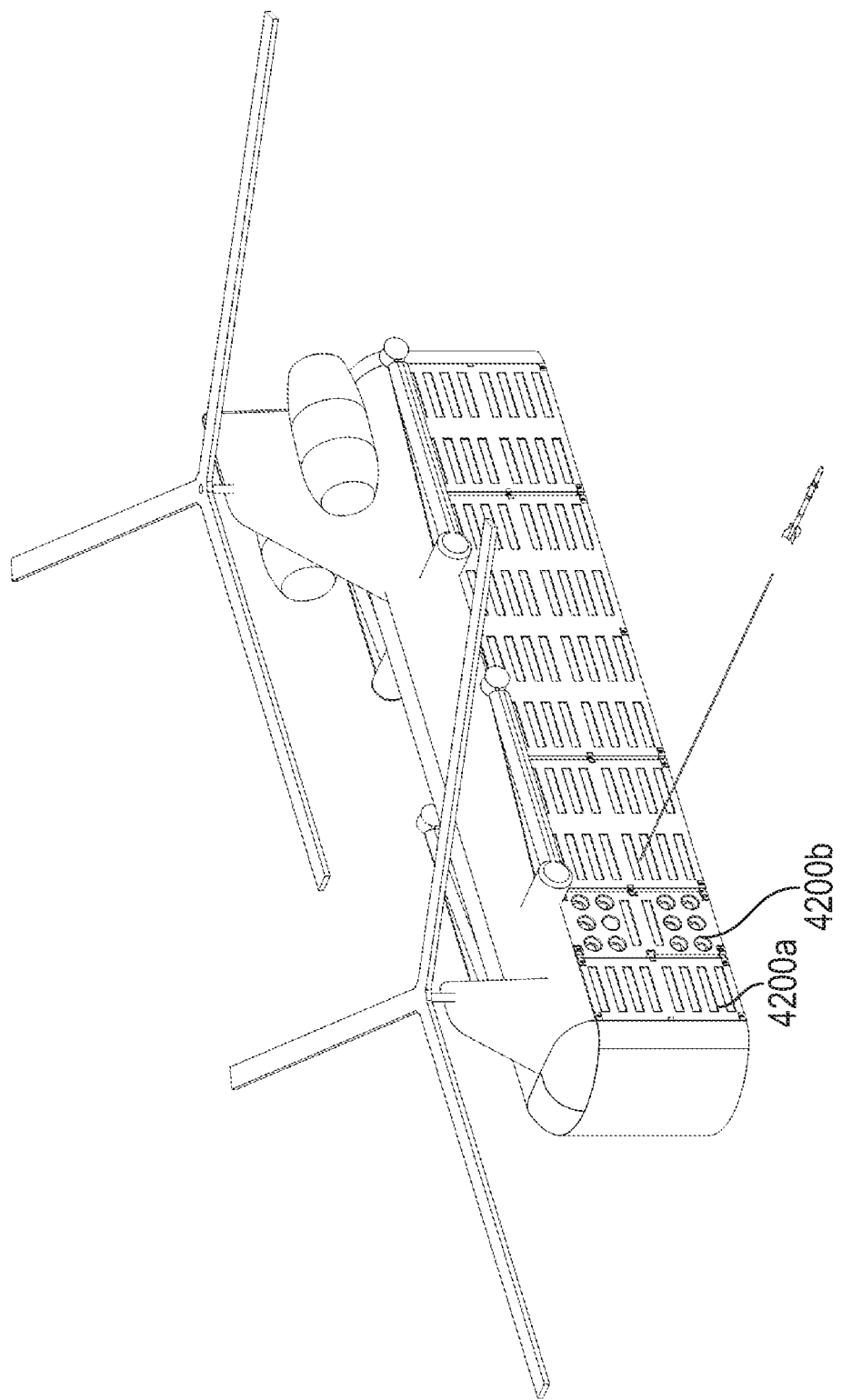

FIG. 42A shows a weaponized wide body cargo jet system in which a radar system 4200a and a missile launch system 4200b have been secured to a spine of a wide body cargo jet. In certain embodiments, the radar system 4200a and/or the missile launch system 4200b may be connected to data and/or power distribution systems implemented in the spine of the jumbo cargo jet. FIGS. 42B-42D show the same radar system 4200a and missile launch system 4200b secured as containers to spines of various other aircraft systems. It should be appreciated that these are simply example embodiments, and weaponized systems (e.g., radar system 4200a and missile launch system 4200b) can be attached as containers to any spine transport system, including spine transport systems implemented on ships, trucks, trains, or any other transport vehicle. This can, for example, help military logistics transports protect themselves instead of having to have expensive escorts.

The disclosed technology has demonstrated how the cargo fuselage part of an aircraft system can be decoupled from the rest of the airframe while continuing to be compatible with existing ground and ocean intermodal modular cargo systems. In addition, the cost of customizing a particular application has been greatly reduced due to the ability to customize the container, rather than having to customize an entire aircraft or other transport vehicle, and to be able to send a container so easily across existing logistics infrastructures for modification. The ability for the airframe or other transport vehicle to provide power and data capability greatly increases the applications of this technology.

For purposes of explanation, numerous specific details are set forth in order to provide a thorough understanding of the description. It will be apparent, however, to one skilled in the art that embodiments of the disclosure can be practiced without these specific details. Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A cargo transport system comprising:
   a spine assembly comprising
      a rigid spine, and
      a plurality of mounts arranged on the rigid spine in a plurality of mount rows; and
   a container assembly comprising a plurality of containers secured to the spine assembly using at least a subset of the plurality of mounts;
   wherein each container of the plurality of containers comprises a plurality of fittings for securing the container to at least one of the spine assembly and another container of the plurality of containers;
   wherein each mount row of the plurality of mount rows extends along a width of the spine; and
   wherein the plurality of mount rows are spaced apart at regular distance intervals along a length of the spine;
   wherein the spine assembly further comprises a data transmission system for electronic communications with the container assembly;
   wherein the data transmission system comprises a plurality of data probes;
   wherein the container assembly further comprises a plurality of data receptacles for receiving the plurality of data probes; and
   wherein each of the plurality of data probes is retractable into the spine assembly such that each of the plurality of data probes can be selectively inserted into one of the plurality of data receptacles.

2. The cargo transport system of claim 1, wherein the spine assembly further comprises a power transmission system for transmitting power to the container assembly.

3. The cargo transport system of claim 2, wherein:
   the power transmission system comprises a plurality of power probes; and
   the container assembly further comprises a plurality of power receptacles for receiving the plurality of power probes.

4. The cargo transport system of claim 3, wherein each of the plurality of power probes is retractable into the spine assembly such that each of the plurality of power probes can be selectively inserted into one of the plurality of power receptacles.

5. The cargo transport system of claim 1, wherein each of the plurality of data probes of the data transmission system is individually extendable into one of the plurality of data receptacles of the container assembly so that only a subset of the plurality of containers of the container assembly is connected to the data transmission system.

6. The cargo transport system of claim 1, where the plurality of data probes of the data transmission system is equal in number to a maximum number of containers that can be secured to the spine assembly using the plurality of mounts.

7. The cargo transport system of claim 1, wherein each of the plurality of data receptacles of the container assembly is located on top of one of the plurality of containers.

8. The cargo transport system of claim 1, wherein the container assembly further comprises a plurality of container data probes to permit data to be transmitted directly from one container of the plurality of containers to another container of the plurality of containers.

9. The cargo transport system of claim 8, wherein the data transmission system is configured to circumvent damage to one or more of the plurality of containers by routing data through the spine assembly.

10. The cargo transport system of claim 8, wherein the data transmission system is configured to circumvent damage to the spine assembly by routing data through one or more of the plurality of containers.

11. The cargo transport system of claim 1, wherein:
    the spine assembly further comprises a power transmission system for transmitting power to the container assembly;
    the power transmission system comprises a plurality of power probes;
    the plurality of power probes of the power transmission system are located on one side of the rigid spine; and
    the plurality of data probes of the data transmission system are located on an opposite side of the rigid spine.

12. A cargo transport system comprising:
    a spine assembly comprising
       a rigid spine, and
       a plurality of mounts arranged on the rigid spine in a plurality of mount rows; and
    a container assembly comprising a plurality of containers secured to the spine assembly using at least a subset of the plurality of mounts;
    wherein each container of the plurality of containers comprises a plurality of fittings for securing the container to at least one of the spine assembly and another container of the plurality of containers;
    wherein each mount row of the plurality of mount rows extends along a width of the spine; and
    wherein the plurality of mount rows are spaced apart at regular distance intervals along a length of the spine;
    wherein the spine assembly further comprises a power transmission system for transmitting power to the container assembly;
    wherein the power transmission system comprises a plurality of power probes;
    wherein the container assembly further comprises a plurality of power receptacles for receiving the plurality of power probes; and
    wherein each of the plurality of power probes is retractable into the spine assembly such that each of the plurality of power probes can be selectively inserted into one of the plurality of power receptacles.

13. The cargo transport system of claim 12, wherein the spine assembly further comprises a data transmission system for electronic communications with the container assembly.

14. The cargo transport system of claim 13, wherein:
    the data transmission system comprises a plurality of data probes; and
    the container assembly further comprises a plurality of data receptacles for receiving the plurality of data probes.

15. The cargo transport system of claim 12, wherein each of the plurality of power probes of the power transmission system is individually extendable into one of the plurality of power receptables of the container assembly so that only a subset of the plurality of containers of the container assembly is connected to the power transmission system.

16. The cargo transport system of claim 12, where the plurality of power probes of the power transmission system is equal in number to a maximum number of containers that can be secured to the spine assembly using the plurality of mounts.

17. The cargo transport system of claim 12, wherein each of the plurality of power receptacles of the container assembly is located on top of one of the plurality of containers.

18. The cargo transport system of claim 12, wherein the container assembly further comprises a plurality of container power probes to permit power to be transmitted directly from one container of the plurality of containers to another container of the plurality of containers.

19. The cargo transport system of claim 18, wherein the power transmission system is configured to circumvent damage to one or more of the plurality of containers by routing power through the spine assembly.

20. The cargo transport system of claim 18, wherein the power transmission system is configured to circumvent damage to the spine assembly by routing power through one or more of the plurality of containers.

\* \* \* \* \*